United States Patent
Zhang et al.

(10) Patent No.: US 12,328,196 B2
(45) Date of Patent: Jun. 10, 2025

(54) FEEDBACK INFORMATION TRANSMISSION METHOD AND APPARATUS

(71) Applicant: Huawei Technologies Co., Ltd., Shenzhen (CN)

(72) Inventors: Lili Zhang, Beijing (CN); Xingwei Zhang, Lund (SE); Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 583 days.

(21) Appl. No.: 17/587,600

(22) Filed: Jan. 28, 2022

(65) Prior Publication Data

US 2022/0190971 A1    Jun. 16, 2022

Related U.S. Application Data

(63) Continuation of application No. PCT/CN2020/106319, filed on Jul. 31, 2020.

(30) Foreign Application Priority Data

Aug. 1, 2019   (CN) .................. 201910707459.8

(51) Int. Cl.
  *H04L 1/1867*  (2023.01)
  *H04L 1/00*  (2006.01)
  *H04L 5/00*  (2006.01)

(52) U.S. Cl.
  CPC .......... *H04L 1/1896* (2013.01); *H04L 1/0026* (2013.01); *H04L 1/0027* (2013.01); *H04L 5/0053* (2013.01)

(58) Field of Classification Search
  CPC .................................................. H04L 1/0026
  See application file for complete search history.

(56) References Cited

U.S. PATENT DOCUMENTS

| 9,986,551 B2 | 5/2018 | Takeda et al. |
| 10,897,331 B2 | 1/2021 | Guan et al. |

(Continued)

FOREIGN PATENT DOCUMENTS

| CN | 104620654 A | 5/2015 |
| CN | 106357372 A | 1/2017 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 15)," 3GPP TS 36.213 V15.6.0, Jun. 2019, 551 pages.

(Continued)

*Primary Examiner* — Jackie Zuniga Abad
(74) *Attorney, Agent, or Firm* — Slater Matsil, LLP

(57) ABSTRACT

This application may be applied to Internet of Vehicles, for example, V2X, LTE-V, and V2V, or may be used in fields such as intelligent driving and intelligent Internet of Vehicles. A terminal device determines at least one piece of to-be-sent feedback information or at least one piece of to-be-received feedback information in at least one piece of candidate feedback information, where the at least one piece of candidate feedback information includes at least one piece of candidate feedback information that needs to be sent and/or at least one piece of candidate feedback information that needs to be received; and the terminal device sends the at least one piece of to-be-sent feedback information, or receives the at least one piece of to-be-received feedback information.

10 Claims, 6 Drawing Sheets

(56) References Cited

U.S. PATENT DOCUMENTS

| | | | |
|---|---|---|---|
| 11,229,054 | B2 | 1/2022 | Ku et al. |
| 2010/0098006 | A1 | 4/2010 | Golitschek Edler Von Elbwart et al. |
| 2019/0116608 | A1* | 4/2019 | Kim ................. H04W 72/1263 |
| 2019/0260521 | A1 | 8/2019 | Luo et al. |
| 2020/0235848 | A1* | 7/2020 | Nguyen ............... H04L 1/0038 |
| 2020/0329445 | A1* | 10/2020 | Tang ..................... H04L 1/1854 |
| 2021/0021974 | A1* | 1/2021 | Kim ....................... H04W 4/12 |
| 2021/0022116 | A1* | 1/2021 | Lee ....................... H04L 5/0053 |

FOREIGN PATENT DOCUMENTS

| | | |
|---|---|---|
| CN | 108289011 A | 7/2018 |
| CN | 108631967 A | 10/2018 |
| CN | 109716694 A | 5/2019 |
| EP | 3905824 A1 | 11/2021 |
| EP | 3982579 A1 | 4/2022 |
| JP | 2020529164 A | 10/2020 |
| WO | 2013176695 A1 | 11/2013 |
| WO | 2016076301 A1 | 5/2016 |
| WO | 2018071050 A1 | 4/2018 |
| WO | 2018082059 A1 | 5/2018 |
| WO | 2019088779 A1 | 5/2019 |
| WO | 2021013180 A1 | 1/2021 |

OTHER PUBLICATIONS

"3rd Generation Partnership Project; Technical Specification Group Radio Access Network; NR; User Equipment (UE) radio transmission and reception; Part 1: Range 1 Standalone (Release 16)," 3GPP TS 38.101-1 V16.0.0, Jun. 2019, 268 pages.

"3rd Generation Partnership Project; Technical Specification Group Radio Access Network; NR; Multiplexing and channel coding (Release 15)," 3GPP TS 38.212 V15.6.0, Jun. 2019, 101 pages.

"3rd Generation Partnership Project; Technical Specification Group Radio Access Network; NR; Physical layer procedures for control (Release 15)," 3GPP TS 38.213 V15.6.0, Jun. 2019, 107 pages.

"3rd Generation Partnership Project; Technical Specification Group Radio Access Network; NR; Medium Access Control (MAC) protocol specification (Release 15)," 3GPP TS 38.321 V15.6.0, Jun. 2019, 78 pages.

"3rd Generation Partnership Project; Technical Specification Group Radio Access Network; NR; Radio Resource Control (RRC) protocol specification (Release 15)," 3GPP TS 38.331 V15.6.0, Jun. 2019, 519 pages.

Mehravari, N., "On Poisson Contention Resolution Problem with Feedback Based on Conflict Intensity," IEEE Transactions on Communications, vol. 36, Issue: 4, Apr. 1988, 4 pages.

"Considerations on NR V2X Mode 2 Resource Allocation Mechanism," Agenda Item: 7.2.4.2.2, Source: Apple, Document for: Discussion/Decision, 3GPP TSG RAN WG1 #97, R1-1907335, Reno, USA, May 13-17, 2019, 6 pages.

"Feature Lead Summary for Agenda item 7.2.4.5 Physical Layer Procedures for Sidelink," Agenda Item: 7.2.4.5, Source: LG Electronics, Document for: Discussion and decision, 3GPP TSG RAN WG1 #97, R1-1907682, Reno, USA, May 13-17, 2019, 26 pages.

Siyang, L., "Coordinated Multiple Point Transmission and Reception in LTE-Advanced Systems," Telecom Network Technology, Issue 9, Sep. 2009, with English Abstract, 5 pages.

"Discussion on Sidelink Resource Allocation Mechanism," Agenda Item: 7.2.4.2.2, Source: CMCC, Document for: Discussion and Decision, 3GPP TSG RAN WG1 #97, R1-1906515, Reno, USA, May 13-17, 2019, 4 pages.

"Discussion on Physical Layer Procedures for NR Sidelink," Agenda Item: 7.2.4.5, Source: LG Electronics, Document for: Discussion and Decision, 3GPP TSG RAN WG1 Meeting #97, R1-1907018, Reno, USA, May 13-17, 2019, 11 pages.

* cited by examiner

Step 2.1

A terminal device determines that at least one piece of candidate feedback information that needs to be sent and/or at least one piece of candidate feedback information that needs to be received in at least one piece of candidate feedback information corresponds to a same time domain resource Step 2.2

The terminal device determines at least one piece of to-be-sent feedback information and/or at least one piece of to-be-received feedback information in the at least one piece of candidate feedback information Step 2.3

The terminal device sends the at least one piece of to-be-sent feedback information and/or the terminal device receives the at least one piece of to-be-received feedback information

FIG. 2

A First candidate feedback information that needs to be sent

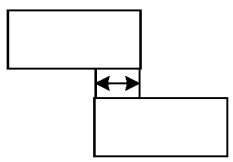

Second candidate feedback information that needs to be sent

B First candidate feedback information that needs to be sent

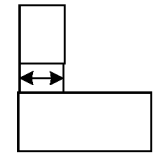

Second candidate feedback information that needs to be sent

C Second candidate feedback information that needs to be sent

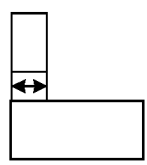

First candidate feedback information that needs to be sent

D First candidate feedback information that needs to be sent

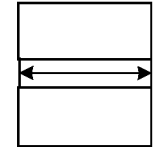

Second candidate feedback information that needs to be sent

↔ Overlapping part

FIG. 3

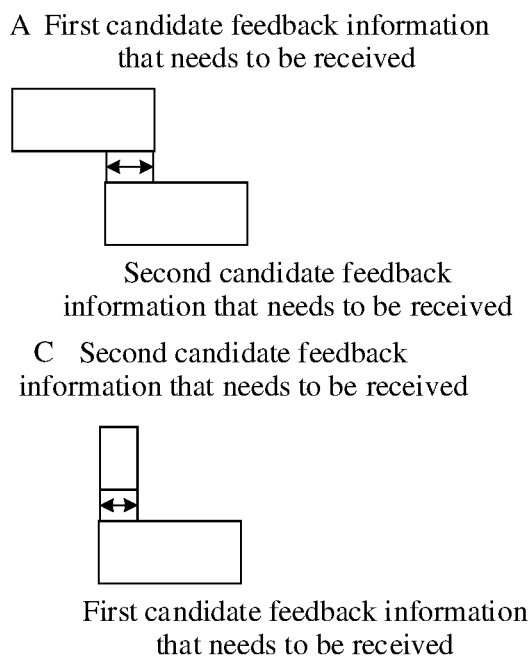
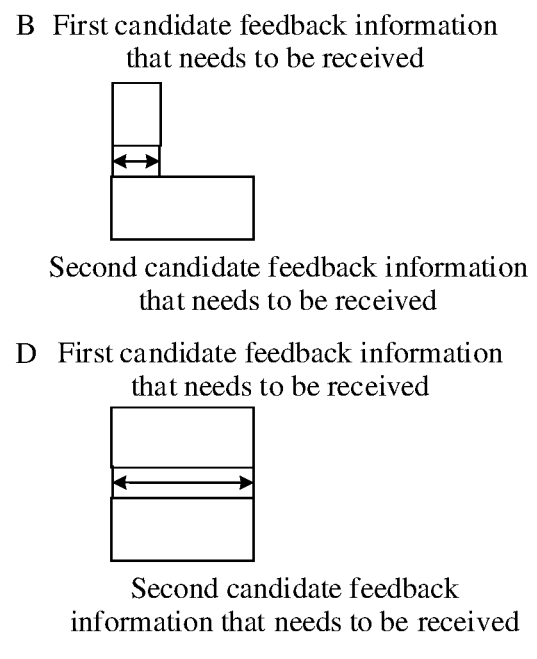
↔ Overlapping part
FIG. 4

FEEDBACK INFORMATION TRANSMISSION METHOD AND APPARATUS

CROSS-REFERENCE TO RELATED APPLICATIONS

This application is a continuation of International Application No. PCT/CN2020/106319, filed on Jul. 31, 2020, which claims priority to Chinese Patent Application No. 201910707459.8, filed on Aug. 1, 2019. The disclosures of the aforementioned applications are hereby incorporated by reference in their entireties.

TECHNICAL FIELD

The present invention relates to the field of wireless communication technologies, and in particular, to a feedback information transmission method and apparatus.

BACKGROUND

Terminal devices may perform direct communication, including device-to-device (Device to Device, D2D) communication and vehicle-to-everything (vehicle to everything, V2X) communication, with each other. The V2X includes vehicle-to-vehicle (Vehicle to Vehicle, V2V) communication, vehicle-to-pedestrian (Vehicle to Pedestrian, V2P) communication, or vehicle-to-infrastructure/network (Vehicle to Infrastructure/Network, V2I/N) communication.

When D2D or V2X transmission is performed, a transmission resource for the terminal device needs to be determined. The V2X is used as an example. There is a periodic service in V2X. Therefore, during the V2X communication, a transmission resource available for a sidelink (SideLink, SL) needs to be configured for a period of time. The sidelink may also be referred to as a secondary link or a sidelink. When a resource is transmitted on an SL, there are usually two modes for resource scheduling. One mode is that a base station schedules the resource, and the other mode is that a terminal device performs automatic detection and uses the resource according to a resource preemption method.

A conclusion drawn at the RAM1 #97 meeting includes the following cases. Case 1: UE sends a physical sidelink shared channel (PSSCH), and receives another PSSCH scheduled by SCI. Respective physical sidelink feedback channels (PSFCH) of the two PSSCHs appear in a same timeslot (or slot). Case 2: UE receives SCI sent by different UEs and PSSCHs scheduled by the SCI. PSFCHs corresponding to these PSSCHs appear in a same timeslot. In the foregoing cases, a collision is caused between feedback information that needs to be sent by the terminal device and/or feedback information that needs to be received by the terminal device.

SUMMARY

The present invention provides a feedback information transmission method and apparatus, to help resolve a problem of a collision between receiving and/or sending of feedback information, thereby ensuring accurate and efficient receiving and/or sending of the feedback information.

According to a first aspect, a feedback information transmission method is provided. The method includes: A terminal device determines at least one piece of to-be-sent feedback information and/or at least one piece of to-be-received feedback information in at least one piece of candidate feedback information, where the at least one piece of candidate feedback information includes at least one piece of candidate feedback information that needs to be sent and/or at least one piece of candidate feedback information that needs to be received, and the at least one piece of candidate feedback information that needs to be sent and/or the at least one piece of candidate feedback information that needs to be received corresponds to a same time domain resource; and the terminal device sends the at least one piece of to-be-sent feedback information, and/or the terminal device receives the at least one piece of to-be-received feedback information.

The terminal device may be a vehicle-mounted device, a device used by a user, a roadside unit, a network device, or the like.

Optionally, a technology used by the terminal device in a data receiving and/or sending process may be a D2D technology, a V2X technology, or the like. For example, the V2X technology may be based on an LTE-V2X technology, an NR-V2X technology, and the like.

If the at least one piece of candidate feedback information that needs to be sent and/or the at least one piece of candidate feedback information that needs to be received corresponds to the same time domain resource, a collision is caused between data that needs to be sent and/or data that needs to be received. The time domain resource includes a slot, a symbol, another time domain granularity, or the like.

For a terminal device without a full-duplex capability, namely, a terminal device with a half-duplex capability, the terminal device may determine the at least one piece of to-be-sent feedback information or the at least one piece of to-be-received feedback information in the at least one piece of candidate feedback information, and then the terminal device sends the at least one piece of to-be-sent feedback information, or receives the at least one piece of to-be-received feedback information.

For a terminal device with a full-duplex capability, the terminal device may alternatively determine the at least one piece of to-be-sent feedback information and the at least one piece of to-be-received feedback information in the at least one piece of candidate feedback information, and then the terminal device simultaneously sends the at least one piece of to-be-sent feedback information and receives the at least one piece of to-be-received feedback information.

For a terminal device with a limited sending capability, the terminal device may determine the at least one piece of to-be-sent feedback information in the at least one piece of candidate feedback information that needs to be sent, and then the terminal device sends the at least one piece of to-be-sent feedback information, where the at least one piece of to-be-sent feedback information does not exceed the sending capability of the terminal device.

For example, if at least one piece of candidate feedback information includes at least one piece of candidate feedback information that needs to be sent, and the at least one piece of candidate feedback information that needs to be sent corresponds to a same time domain resource, the terminal device determines at least one piece of to-be-sent feedback information in the at least one piece of candidate feedback information, and then sends the at least one piece of to-be-sent feedback information.

If at least one piece of candidate feedback information includes at least one piece of candidate feedback information that needs to be received, and the at least one piece of candidate feedback information that needs to be received corresponds to a same time domain resource, the terminal device determines at least one piece of to-be-received feedback information in the at least one piece of candidate feedback information, and then receives the at least one piece of to-be-received feedback information.

If at least one piece of candidate feedback information includes at least one piece of candidate feedback information that needs to be sent and at least one piece of candidate feedback information that needs to be received, and the at least one piece of candidate feedback information that needs to be sent and the at least one piece of candidate feedback information that needs to be received correspond to a same time domain resource, the terminal device determines at least one piece of to-be-sent feedback information in the at least one piece of candidate feedback information, and then sends the at least one piece of to-be-sent feedback information; or the terminal device determines at least one piece of to-be-received feedback information in the at least one piece of candidate feedback information, and then receives the at least one piece of to-be-received feedback information.

If at least one piece of candidate feedback information includes at least one piece of candidate feedback information that needs to be sent and at least one piece of candidate feedback information that needs to be received, the at least one piece of candidate feedback information that needs to be sent corresponds to a same time domain resource, and the at least one piece of candidate feedback information that needs to be received corresponds to a same time domain resource, the terminal device determines at least one piece of to-be-sent feedback information and at least one piece of to-be-received feedback information in the at least one piece of candidate feedback information, and then sends the at least one piece of to-be-sent feedback information and receives the at least one piece of to-be-received feedback information.

When the at least one piece of candidate feedback information that needs to be sent and/or the at least one piece of candidate feedback information that needs to be received corresponds to a same time domain resource, the terminal device may select the at least one piece of to-be-sent feedback information and/or the at least one piece of to-be-received feedback information from the at least one piece of candidate feedback information that needs to be sent and/or the at least one piece of candidate feedback information that needs to be received, and then send the at least one piece of to-be-sent feedback information, and/or receive the at least one piece of to-be-received feedback information. Therefore, this method resolves a collision caused in a receiving and/or sending process of feedback information, and ensures efficient and accurate receiving and/or sending of the feedback information.

In a possible implementation, the at least one piece of candidate feedback information that needs to be sent and/or the at least one piece of candidate feedback information that needs to be received corresponds to a same first time domain resource. The terminal device sends the at least one piece of to-be-sent feedback information on a second time domain resource, and/or the terminal device receives the at least one piece of to-be-received feedback information on the second time domain resource, where the second time domain resource is the same as the first time domain resource, the second time domain resource includes the first time domain resource, or the second time domain resource partially overlaps the first time domain resource.

In a possible implementation, the terminal device may determine the at least one piece of to-be-sent feedback information and/or the at least one piece of to-be-received feedback information in the at least one piece of candidate feedback information in the following several manners:

the terminal device determines the at least one piece of to-be-sent feedback information and/or the at least one piece of to-be-received feedback information based on a quality of service level of data information corresponding to the at least one piece of candidate feedback information;

the terminal device determines the at least one piece of to-be-sent feedback information and/or the at least one piece of to-be-received feedback information based on a first quantity of the at least one piece of candidate feedback information that needs to be sent and/or a second quantity of the at least one piece of candidate feedback information that needs to be received;

the terminal device determines the at least one piece of to-be-sent feedback information and/or the at least one piece of to-be-received feedback information based on a type of data corresponding to the at least one piece of candidate feedback information;

the terminal device determines the at least one piece of to-be-sent feedback information or the at least one piece of to-be-received feedback information based on a feedback period of the at least one piece of candidate feedback information; or the terminal device determines the at least one piece of to-be-sent feedback information and/or the at least one piece of to-be-received feedback information based on a feedback type of the at least one piece of candidate feedback information.

For example, the quality of service level may include a reference value such as a QoS level. A specific QoS level may include a reference value such as a PPPP/5QI, and may further include reference values such as availability, a throughput, a delay, and a packet loss rate. The type of the data may include unicast and groupcast/multicast, include a reservation type and a scheduling type, or include an option 1 feedback and an option 2 feedback. The feedback type may include an acknowledgement feedback and a negative acknowledgement feedback.

Specifically, if the terminal device determines the at least one piece of to-be-sent feedback information and/or the at least one piece of to-be-received feedback information based on the quality of service level of the data information corresponding to the at least one piece of candidate feedback information:

if the at least one piece of candidate feedback information includes the at least one piece of candidate feedback information that needs to be sent, the terminal device determines the at least one piece of to-be-sent feedback information based on the quality of service level of the data information corresponding to the at least one piece of candidate feedback information;

if the at least one piece of candidate feedback information includes the at least one piece of candidate feedback information that needs to be received, the terminal device determines the at least one piece of to-be-received feedback information based on the quality of service level of the data information corresponding to the at least one piece of candidate feedback information; or if the at least one piece of candidate feedback information includes the at least one piece of candidate feedback information that needs to be sent and the at least one piece of candidate feedback information that needs to be received, the terminal device determines, based on the quality of service level of the data information corresponding to the at least one piece of candidate feedback information, the at least one piece of to-besent feedback information and/or the at least one piece of to-be-received feedback information.

Specifically, if the terminal device determines the at least one piece of to-be-sent feedback information and/or the at least one piece of to-be-received feedback information based on the first quantity of the at least one piece of candidate feedback information that needs to be sent and/or the second quantity of the at least one piece of candidate feedback information that needs to be received:

if the at least one piece of candidate feedback information includes the at least one piece of candidate feedback information that needs to be sent, the terminal device determines the at least one piece of to-be-sent feedback information based on the first quantity of the at least one piece of candidate feedback information that needs to be sent;

if the at least one piece of candidate feedback information includes the at least one piece of candidate feedback information that needs to be received, the terminal device determines the at least one piece of to-be-received feedback information based on the second quantity of the at least one piece of candidate feedback information that needs to be received; or if the at least one piece of candidate feedback information includes the at least one piece of candidate feedback information that needs to be sent and the at least one piece of candidate feedback information that needs to be received, the terminal device determines the at least one piece of to-be-sent feedback information and/or the at least one piece of to-be-received feedback information based on the first quantity of the at least one piece of candidate feedback information that needs to be sent and the second quantity of the at least one piece of candidate feedback information that needs to be received.

Specifically, if the terminal device determines the at least one piece of to-be-sent feedback information and/or the at least one piece of to-be-received feedback information based on the type of the data corresponding to the at least one piece of candidate feedback information:

if the at least one piece of candidate feedback information includes the at least one piece of candidate feedback information that needs to be sent, the terminal device determines the at least one piece of to-be-sent feedback information based on the type of the data corresponding to the at least one piece of candidate feedback information;

if the at least one piece of candidate feedback information includes the at least one piece of candidate feedback information that needs to be received, the terminal device determines the at least one piece of to-be-received feedback information based on the type of the data corresponding to the at least one piece of candidate feedback information; or if the at least one piece of candidate feedback information includes the at least one piece of candidate feedback information that needs to be sent and the at least one piece of candidate feedback information that needs to be received, the terminal device determines the at least one piece of to-be-sent feedback information and/or the at least one piece of to-be-received feedback information based on the type of the data corresponding to the at least one piece of candidate feedback information.

Specifically, if the terminal device determines the at least one piece of to-be-sent feedback information and/or the at least one piece of to-be-received feedback information based on the feedback period of the at least one piece of candidate feedback information includes:

if the at least one piece of candidate feedback information includes the at least one piece of candidate feedback information that needs to be sent, the terminal device determines the at least one piece of to-be-sent feedback information based on the feedback period of the at least one piece of candidate feedback information;

if the at least one piece of candidate feedback information includes the at least one piece of candidate feedback information that needs to be received, the terminal device determines the at least one piece of to-be-received feedback information based on the feedback period of the at least one piece of candidate feedback information; or if the at least one piece of candidate feedback information includes the at least one piece of candidate feedback information that needs to be sent and the at least one piece of candidate feedback information that needs to be received, the terminal device determines the at least one piece of to-be-sent feedback information and/or the at least one piece of to-be-received feedback information based on the feedback period of the at least one piece of candidate feedback information.

Specifically, if the terminal device determines the at least one piece of to-be-sent feedback information and/or the at least one piece of to-be-received feedback information based on the feedback type of the at least one piece of candidate feedback information:

if the at least one piece of candidate feedback information includes the at least one piece of candidate feedback information that needs to be sent, the terminal device determines the at least one piece of to-be-sent feedback information based on the feedback type of the at least one piece of candidate feedback information;

if the at least one piece of candidate feedback information includes the at least one piece of candidate feedback information that needs to be received, the terminal device determines the at least one piece of to-be-received feedback information based on the feedback type of the at least one piece of candidate feedback information; or if the at least one piece of candidate feedback information includes the at least one piece of candidate feedback information that needs to be sent and the at least one piece of candidate feedback information that needs to be received, the terminal device determines the at least one piece of to-be-sent feedback information and/or the at least one piece of to-be-received feedback information based on the feedback type of the at least one piece of candidate feedback information.

In this implementation, the terminal device may determine the at least one piece of to-be-sent feedback information and/or the at least one piece of to-be-received feedback information based on a quality of service level, a quantity of pieces of candidate feedback information, a type of data corresponding to the candidate feedback information, a feedback period of the candidate feedback information, or a feedback type of the candidate feedback information. This helps resolve a collision caused in the receiving and/or sending process of the feedback information.

In a possible implementation, the at least one piece of candidate feedback information includes the at least one piece of candidate feedback information that needs to be sent; and when a first reference value of a quality of service level of data information corresponding to the at least one piece of candidate feedback information that needs to be sent is greater than or equal to a first priority threshold, the terminal device determines the at least one piece of to-be-sent feedback information, where the at least one piece of to-be-sent feedback information belongs to the at least one piece of candidate feedback information that needs to be sent.

In this implementation, the terminal device may determine the at least one piece of to-be-sent feedback information based on the first reference value of the quality of service level of the data information corresponding to the at least one piece of candidate feedback information that needs to be sent. This helps resolve a collision caused in a sending process of the feedback information.

In a possible implementation, the at least one piece of candidate feedback information includes the at least one piece of candidate feedback information that needs to be received; and when a second reference value of a quality of service level of data information corresponding to the at least one piece of candidate feedback information that needs to be received is greater than or equal to a first priority threshold, the terminal device determines the at least one piece of to-be-received feedback information, where the at least one piece of to-be-received feedback information belongs to the at least one piece of candidate feedback information that needs to be received.

In this implementation, the terminal device may determine the at least one piece of to-be-sent feedback information based on the first reference value of the quality of service level of the data information corresponding to the at least one piece of candidate feedback information that needs to be sent. This helps resolve a collision caused in a sending process of the feedback information.

In this implementation, the terminal device may determine the at least one piece of to-be-received feedback information based on the first reference value of the quality of service level of the data information corresponding to the at least one piece of candidate feedback information that needs to be received. This helps resolve a collision caused in a receiving process of the feedback information.

In a possible implementation, the at least one piece of candidate feedback information includes the at least one piece of candidate feedback information that needs to be sent and the at least one piece of candidate feedback information that needs to be received; and when a first reference value of a quality of service level of data information corresponding to the at least one piece of candidate feedback information that needs to be sent is greater than or equal to a first priority threshold, the terminal device determines the at least one piece of to-be-sent feedback information, where the at least one piece of to-be-sent feedback information belongs to the at least one piece of candidate feedback information that needs to be sent; and/or when a second reference value of a quality of service level of data information corresponding to the at least one piece of candidate feedback information that needs to be received is greater than or equal to a first priority threshold, the terminal device determines the at least one piece of to-be-received feedback information, where the at least one piece of to-be-received feedback information belongs to the at least one piece of candidate feedback information that needs to be received.

In this implementation, the terminal device determines the at least one piece of to-be-sent feedback information and/or the at least one piece of to-be-received feedback information based on the first reference value of the quality of service level of the data information corresponding to the at least one piece of candidate feedback information that needs to be sent, and/or based on the second reference value of the quality of service level of the data information corresponding to the at least one piece of candidate feedback information that needs to be received. This helps resolve a collision caused in the receiving and/or sending process of the feedback information.

In a possible implementation, the at least one piece of candidate feedback information includes the at least one piece of candidate feedback information that needs to be sent and the at least one piece of candidate feedback information that needs to be received; and when a first reference value of a quality of service level of data information corresponding to the at least one piece of candidate feedback information that needs to be sent is greater than or equal to a second reference value of a quality of service level of data information corresponding to the at least one piece of candidate feedback information that needs to be received, the terminal device determines the at least one piece of to-be-sent feedback information, where the at least one piece of to-be-sent feedback information belongs to the at least one piece of candidate feedback information that needs to be sent; or when a first reference value of a quality of service level of data information corresponding to the at least one piece of candidate feedback information that needs to be sent is less than or equal to a second reference value of a quality of service level of data information corresponding to the at least one piece of candidate feedback information that needs to be received, the terminal device determines the at least one piece of to-be-received feedback information, where the at least one piece of to-be-received feedback information belongs to the at least one piece of candidate feedback information that needs to be received.

In this implementation, the terminal device determines the at least one piece of to-be-sent feedback information or the at least one piece of to-be-received feedback information based on the first reference value of the quality of service level of the data information corresponding to the at least one piece of candidate feedback information that needs to be sent, and based on the second reference value of the quality of service level of the data information corresponding to the at least one piece of candidate feedback information that needs to be received. This helps resolve a collision caused in the receiving and/or sending process of the feedback information.

In a possible implementation, the first reference value is an average value of quality of service levels of data information corresponding to all feedback information in the at least one piece of candidate feedback information that needs to be sent, or the first reference value is an average value of quality of service levels of data information corresponding to a first feedback information set in the at least one piece of candidate feedback information that needs to be sent, where the first feedback information set includes the first N pieces of feedback information, in descending order of quality of service levels of corresponding data information, in the at least one piece of candidate feedback information that needs to be sent, and N is a positive integer greater than or equal to 1; and the second reference value is an average value of quality of service levels of data information corresponding to all feedback information in the at least one piece of candidate feedback information that needs to be received, or the second reference value is an average value of quality of service levels of data information corresponding to a second feedback information set in the at least one piece of candidate feedback information that needs to be received, where the second feedback information set includes the first M pieces of feedback information, in descending order of quality of service levels of corresponding data information, in the at least one piece of candidate feedback information that needs to be received, and M is a positive integer greater than or equal to 1.

In a possible implementation, the at least one piece of candidate feedback information includes the at least one piece of candidate feedback information that needs to be sent; and when the first quantity of the at least one piece of candidate feedback information that needs to be sent is greater than or equal to a first threshold, the terminal device determines the at least one piece of to-be-sent feedback information, where the at least one piece of to-be-sent feedback information belongs to the at least one piece of candidate feedback information that needs to be sent.

In this implementation, the terminal device may determine the at least one piece of to-be-sent feedback information based on the first quantity of the at least one piece of candidate feedback information that needs to be sent. This helps resolve a collision caused in the sending process of the feedback information.

In a possible implementation, the at least one piece of candidate feedback information includes the at least one piece of candidate feedback information that needs to be received; and when the second quantity of the at least one piece of candidate feedback information that needs to be received is greater than or equal to a first threshold, the terminal device determines the at least one piece of to-be-received feedback information, where the at least one piece of to-be-received feedback information belongs to the at least one piece of candidate feedback information that needs to be received.

In this implementation, the terminal device may determine the at least one piece of to-be-received feedback information based on the second quantity of the at least one piece of candidate feedback information that needs to be received. This helps resolve a collision caused in the receiving process of the feedback information.

In a possible implementation, the at least one piece of candidate feedback information includes the at least one piece of candidate feedback information that needs to be sent and the at least one piece of candidate feedback information that needs to be received; and when the second quantity of the at least one piece of candidate feedback information that needs to be received is greater than or equal to a first threshold, the terminal device determines the at least one piece of to-be-received feedback information, where the at least one piece of to-be-received feedback information belongs to the at least one piece of candidate feedback information that needs to be received; and/or when the first quantity of the at least one piece of candidate feedback information that needs to be sent is greater than a first threshold, the terminal device determines the at least one piece of to-be-sent feedback information, where the at least one piece of to-be-sent feedback information belongs to the at least one piece of candidate feedback information that needs to be sent.

In this implementation, the terminal device determines the at least one piece of to-be-sent feedback information and/or the at least one piece of to-be-received feedback information based on the first quantity of the at least one piece of candidate feedback information that needs to be sent and/or the second quantity of the at least one piece of candidate feedback information that needs to be received. This helps resolve a collision caused in the receiving and/or sending process of the feedback information.

In a possible implementation, the at least one piece of candidate feedback information includes the at least one piece of candidate feedback information that needs to be sent and the at least one piece of candidate feedback information that needs to be received; and when a ratio of the second quantity of the at least one piece of candidate feedback information that needs to be received to the first quantity of the at least one piece of candidate feedback information that needs to be sent is greater than or equal to a first ratio threshold, the terminal device determines the at least one piece of to-be-received feedback information, where the at least one piece of to-be-received feedback information belongs to the at least one piece of candidate feedback information that needs to be received; or when a ratio of the second quantity of the at least one piece of candidate feedback information that needs to be received to the first quantity of the at least one piece of candidate feedback information that needs to be sent is less than or equal to a first ratio threshold, the terminal device determines the at least one piece of to-be-sent feedback information, where the at least one piece of to-be-sent feedback information belongs to the at least one piece of candidate feedback information that needs to be sent.

In this implementation, the terminal device determines the at least one piece of to-be-sent feedback information or the at least one piece of to-be-received feedback information based on the first quantity of the at least one piece of candidate feedback information that needs to be sent and the second quantity of the at least one piece of candidate feedback information that needs to be received. This helps resolve a collision caused in the receiving and/or sending process of the feedback information.

In a possible implementation, the at least one piece of candidate feedback information includes the at least one piece of candidate feedback information that needs to be sent and the at least one piece of candidate feedback information that needs to be received; and when a ratio of the first quantity of the at least one piece of candidate feedback information that needs to be sent to the second quantity of the at least one piece of candidate feedback information that needs to be received is greater than or equal to a second ratio threshold, the terminal device determines the at least one piece of to-be-sent feedback information, where the at least one piece of to-be-sent feedback information belongs to the at least one piece of candidate feedback information that needs to be sent; or when a ratio of the first quantity of the at least one piece of candidate feedback information that needs to be sent to the second quantity of the at least one piece of candidate feedback information that needs to be received is less than a second ratio threshold, the terminal device determines the at least one piece of to-be-received feedback information, where the at least one piece of to-be-received feedback information belongs to the at least one piece of candidate feedback information that needs to be received.

In this implementation, the terminal device determines the at least one piece of to-be-sent feedback information or the at least one piece of to-be-received feedback information based on the first quantity of the at least one piece of candidate feedback information that needs to be sent and the second quantity of the at least one piece of candidate feedback information that needs to be received. This helps resolve a collision caused in the receiving and/or sending process of the feedback information.

In a possible implementation, the at least one piece of candidate feedback information includes the at least one piece of candidate feedback information that needs to be sent and the at least one piece of candidate feedback information that needs to be received; and when the at least one piece of candidate feedback information that needs to be sent is first-type candidate feedback information, the at least one piece of candidate feedback information that needs to be received is second-type candidate feedback information, a type of data corresponding to the first-type candidate feedback information is unicast, and a type of data corresponding to the second-type candidate feedback information is groupcast/multicast, the terminal device determines the at least one piece of to-be-sent feedback information, where the at least one piece of to-be-sent feedback information belongs to the first-type candidate feedback information.

In this implementation, the type of the data corresponding to the candidate feedback information determined by the terminal device includes the type of the data corresponding to the first-type candidate feedback information and the type of the data corresponding to the second-type candidate feedback information, and the terminal device determines the at least one piece of to-be-sent feedback information based on the type of the data corresponding to the at least one piece of candidate feedback information that needs to be sent and the type of the data corresponding to the at least one piece of candidate feedback information that needs to be received. This helps resolve a collision caused in the receiving and/or sending process of the feedback information.

In a possible implementation, the at least one piece of candidate feedback information includes the at least one piece of candidate feedback information that needs to be sent and the at least one piece of candidate feedback information that needs to be received; and when the at least one piece of candidate feedback information that needs to be sent is second-type candidate feedback information, and the at least one piece of candidate feedback information that needs to be received is first-type candidate feedback information, the terminal device determines the at least one piece of to-be-received feedback information, where the at least one piece of to-be-received feedback information belongs to the first-type candidate feedback information.

In this implementation, the type of the data corresponding to the candidate feedback information determined by the terminal device includes the type of the data corresponding to the first-type candidate feedback information and the type of the data corresponding to the second-type candidate feedback information, and the terminal device determines the at least one piece of to-be-received feedback information based on the type of the data corresponding to the at least one piece of candidate feedback information that needs to be sent and the type of the data corresponding to the at least one piece of candidate feedback information that needs to be received. This helps resolve a collision caused in the receiving and/or sending process of the feedback information.

In a possible implementation, the at least one piece of candidate feedback information includes the at least one piece of candidate feedback information that needs to be sent; and when the at least one piece of candidate feedback information that needs to be sent includes first-type candidate feedback information and second-type candidate feedback information, the terminal device determines the at least one piece of to-be-sent feedback information, where the at least one piece of to-be-sent feedback information belongs to the first-type candidate feedback information.

In this implementation, the type of the data corresponding to the candidate feedback information determined by the terminal device includes the type of the data corresponding to the first-type candidate feedback information and the type of the data corresponding to the second-type candidate feedback information, and the terminal device determines the at least one piece of to-be-sent feedback information based on the type of the data corresponding to the at least one piece of candidate feedback information that needs to be sent. This helps resolve a collision caused in the sending process of the feedback information.

In a possible implementation, the at least one piece of candidate feedback information includes the at least one piece of candidate feedback information that needs to be received; and when the at least one piece of candidate feedback information that needs to be received includes first-type candidate feedback information and second-type candidate feedback information, the terminal device determines the at least one piece of to-be-received feedback information, where the at least one piece of to-be-received feedback information belongs to the first-type candidate feedback information.

In this implementation, the type of the data corresponding to the candidate feedback information determined by the terminal device includes the type of the data corresponding to the first-type candidate feedback information and the type of the data corresponding to the second-type candidate feedback information, and the terminal device determines the at least one piece of to-be-received feedback information based on the type of the data corresponding to the at least one piece of candidate feedback information that needs to be received. This helps resolve a collision caused in the receiving process of the feedback information.

In a possible implementation, the at least one piece of candidate feedback information includes the at least one piece of candidate feedback information that needs to be sent and the at least one piece of candidate feedback information that needs to be received; and when the at least one piece of candidate feedback information that needs to be sent includes first-type candidate feedback information and second-type candidate feedback information, and the at least one piece of candidate feedback information that needs to be received includes the first-type candidate feedback information and the second-type candidate feedback information, the terminal device determines the at least one piece of to-be-sent feedback information and/or the at least one piece of to-be-received feedback information, where the at least one piece of to-be-sent feedback information belongs to the first-type candidate feedback information, and the at least one piece of to-be-received feedback information belongs to the second-type candidate feedback information.

In this implementation, if the type of the data corresponding to the at least one piece of candidate feedback information includes the first-type candidate feedback information and the second-type candidate feedback information, the terminal device determines the at least one piece of to-be-sent feedback information and/or the at least one piece of to-be-received feedback information based on the type of the data corresponding to the at least one piece of candidate feedback information. This helps resolve a collision caused in the receiving and/or sending process of the feedback information.

In a possible implementation, the at least one piece of candidate feedback information includes the at least one piece of candidate feedback information that needs to be sent and the at least one piece of candidate feedback information that needs to be received; and when the at least one piece of candidate feedback information that needs to be sent is third-type candidate feedback information, the at least one piece of candidate feedback information that needs to be received is fourth-type candidate feedback information, a type of data corresponding to the third-type candidate feedback information is a reservation type, and a type of data corresponding to the fourth-type candidate feedback information is a scheduling type, the terminal device determines the at least one piece of to-be-sent feedback information, where the at least one piece of to-be-sent feedback information belongs to the third-type candidate feedback information.

In a possible implementation, if a type of data corresponding to at least one piece of candidate feedback information includes third-type candidate feedback information and fourth-type candidate feedback information, the terminal device determines the at least one piece of to-be-sent feedback information based on the type of the data corresponding to the at least one piece of candidate feedback information. This helps resolve a collision caused in the receiving and/or sending process of the feedback information.

In a possible implementation, the at least one piece of candidate feedback information includes the at least one piece of candidate feedback information that needs to be sent and the at least one piece of candidate feedback information that needs to be received; and when the at least one piece of candidate feedback information that needs to be sent is fourth-type candidate feedback information, and the at least one piece of candidate feedback information that needs to be received is third-type candidate feedback information, the terminal device determines the at least one piece of to-be-received feedback information, where the at least one piece of to-be-received feedback information belongs to the third-type candidate feedback information.

In a possible implementation, if a type of data corresponding to one piece of candidate feedback information includes third-type candidate feedback information and fourth-type candidate feedback information, the terminal device determines the at least one piece of to-be-received feedback information based on the type of the data corresponding to the at least one piece of candidate feedback information. This helps resolve a collision caused in the receiving and/or sending process of the feedback information.

In a possible implementation, the at least one piece of candidate feedback information includes the at least one piece of candidate feedback information that needs to be sent; and when the at least one piece of candidate feedback information that needs to be sent includes third-type candidate feedback information and fourth-type candidate feedback information, the terminal device determines the at least one piece of to-be-sent feedback information, where the at least one piece of to-be-sent feedback information belongs to the third-type candidate feedback information.

In a possible implementation, if a type of data corresponding to one piece of candidate feedback information that needs to be sent includes third-type candidate feedback information and fourth-type candidate feedback information, the terminal device determines the at least one piece of to-be-sent feedback information based on the type of the data corresponding to the at least one piece of candidate feedback information. This helps resolve a collision caused in the sending process of the feedback information.

In a possible implementation, the at least one piece of candidate feedback information includes the at least one piece of candidate feedback information that needs to be received; and when the at least one piece of candidate feedback information that needs to be received includes third-type candidate feedback information and fourth-type candidate feedback information, the terminal device determines the at least one piece of to-be-received feedback information, where the at least one piece of to-be-received feedback information belongs to the third-type candidate feedback information.

In this implementation, if a type of data corresponding to one piece of candidate feedback information that needs to be received includes third-type candidate feedback information and fourth-type candidate feedback information, the terminal device determines the at least one piece of to-be-received feedback information based on the type of the data corresponding to the at least one piece of candidate feedback information. This helps resolve a collision caused in the receiving process of the feedback information.

In a possible implementation, the at least one piece of candidate feedback information includes the at least one piece of candidate feedback information that needs to be sent and the at least one piece of candidate feedback information that needs to be received; and when the at least one piece of candidate feedback information that needs to be sent includes third-type candidate feedback information and fourth-type candidate feedback information, and the at least one piece of candidate feedback information that needs to be received includes the third-type candidate feedback information and the fourth-type candidate feedback information, the terminal device determines the at least one piece of to-be-sent feedback information and/or the at least one piece of to-be-received feedback information, where the at least one piece of to-be-sent feedback information belongs to the third-type candidate feedback information, and the at least one piece of to-be-received feedback information belongs to the third-type candidate feedback information.

In this implementation, if the type of the data corresponding to the at least one piece of candidate feedback information includes the third-type candidate feedback information and the fourth-type candidate feedback information, the terminal device determines the at least one piece of to-be-sent feedback information and/or the at least one piece of to-be-received feedback information based on the type of the data corresponding to the at least one piece of candidate feedback information. This helps resolve a collision caused in the receiving and/or sending process of the feedback information.

In a possible implementation, the at least one piece of candidate feedback information includes the at least one piece of candidate feedback information that needs to be sent and the at least one piece of candidate feedback information that needs to be received; and when the at least one piece of candidate feedback information that needs to be sent is fifth-type candidate feedback information, the at least one piece of candidate feedback information that needs to be received is sixth-type candidate feedback information, a type of data corresponding to the fifth-type candidate feedback information is feeding back only negative acknowledgement information on a feedback resource, and a type of data corresponding to the sixth-type candidate feedback information is feeding back acknowledgement information or the negative acknowledgement information on a feedback resource corresponding to the terminal device, the terminal device determines the at least one piece of to-be-sent feedback information, where the at least one piece of to-be-sent feedback information belongs to the fifth-type candidate feedback information.

In this implementation, if the type of the data corresponding to the at least one piece of candidate feedback information includes the fifth-type candidate feedback information and the sixth-type candidate feedback information, the terminal device determines the at least one piece of to-be-sent feedback information based on the type of the data corresponding to the at least one piece of candidate feedback information. This helps resolve a collision caused in the receiving and/or sending process of the feedback information.

In a possible implementation, the at least one piece of candidate feedback information includes the at least one piece of candidate feedback information that needs to be sent and the at least one piece of candidate feedback information that needs to be received; and when the at least one piece of candidate feedback information that needs to be sent is sixth-type candidate feedback information, and the at least one piece of candidate feedback information that needs to be received is fifth-type candidate feedback information, the terminal device determines the at least one piece of to-be-received feedback information, where the at least one piece of to-be-received feedback information belongs to the fifth-type candidate feedback information.

In this implementation, if the type of the data corresponding to the at least one piece of candidate feedback information includes the fifth-type candidate feedback information and the sixth-type candidate feedback information, the terminal device determines the at least one piece of to-be-received feedback information based on the type of the data corresponding to the at least one piece of candidate feedback information. This helps resolve a collision caused in the receiving and/or sending process of the feedback information.

In a possible implementation, the at least one piece of candidate feedback information includes the at least one piece of candidate feedback information that needs to be sent; and when the at least one piece of candidate feedback information that needs to be sent includes fifth-type candidate feedback information and sixth-type candidate feedback information, the terminal device determines the at least one piece of to-be-sent feedback information, where the at least one piece of to-be-sent feedback information belongs to the fifth-type candidate feedback information.

In this implementation, if the type of the data corresponding to the at least one piece of candidate feedback information that needs to be sent includes the fifth-type candidate feedback information and the sixth-type candidate feedback information, the terminal device determines the at least one piece of to-be-sent feedback information based on the type of the data corresponding to the at least one piece of candidate feedback information. This helps resolve a collision caused in the sending process of the feedback information.

In a possible implementation, the at least one piece of candidate feedback information includes the at least one piece of candidate feedback information that needs to be received; and when the at least one piece of candidate feedback information that needs to be received includes fifth-type candidate feedback information and sixth-type candidate feedback information, the terminal device determines the at least one piece of to-be-received feedback information, where the at least one piece of to-be-received feedback information belongs to the fifth-type candidate feedback information.

In this implementation, if the type of the data corresponding to the at least one piece of candidate feedback information that needs to be received includes the fifth-type candidate feedback information and the sixth-type candidate feedback information, the terminal device determines the at least one piece of to-be-received feedback information based on the type of the data corresponding to the at least one piece of candidate feedback information. This helps resolve a collision caused in the receiving process of the feedback information.

In a possible implementation, the at least one piece of candidate feedback information includes the at least one piece of candidate feedback information that needs to be sent and the at least one piece of candidate feedback information that needs to be received; and when the at least one piece of candidate feedback information that needs to be sent includes fifth-type candidate feedback information and sixth-type candidate feedback information, and the at least one piece of candidate feedback information that needs to be received includes the fifth-type candidate feedback information and the sixth-type candidate feedback information, the terminal device determines the at least one piece of to-be-sent feedback information and/or the at least one piece of to-be-received feedback information, where the at least one piece of to-be-sent feedback information belongs to the fifth-type candidate feedback information, and the at least one piece of to-be-received feedback information belongs to the fifth-type candidate feedback information.

In this implementation, if the type of the data corresponding to the at least one piece of candidate feedback information includes the fifth-type candidate feedback information and the sixth-type candidate feedback information, the terminal device determines the at least one piece of to-be-sent feedback information and/or the at least one piece of to-be-received feedback information based on the type of the data corresponding to the at least one piece of candidate feedback information. This helps resolve a collision caused in the receiving and/or sending process of the feedback information.

In a possible implementation, the at least one piece of candidate feedback information includes the at least one piece of candidate feedback information that needs to be sent and the at least one piece of candidate feedback information that needs to be received; and when a first feedback period of the at least one piece of candidate feedback information that needs to be sent is longer than or equal to a second feedback period of the at least one piece of candidate feedback information that needs to be received, the terminal device determines the at least one piece of to-be-sent feedback information, where the at least one piece of to-be-sent feedback information belongs to the at least one piece of candidate feedback information that needs to be sent.

In this implementation, the terminal device determines the at least one piece of to-be-sent feedback information based on the feedback period of the at least one piece of candidate feedback information. This helps resolve a collision caused in the receiving and/or sending process of the feedback information.

In a possible implementation, the at least one piece of candidate feedback information includes the at least one piece of candidate feedback information that needs to be sent and the at least one piece of candidate feedback information that needs to be received; and when a first feedback period of the at least one piece of candidate feedback information that needs to be sent is shorter than or equal to a second feedback period of the at least one piece of candidate feedback information that needs to be received, the terminal device determines the at least one piece of to-be-received feedback information, where the at least one piece of to-be-received feedback information belongs to the at least one piece of candidate feedback information that needs to be received.

In this implementation, the terminal device determines the at least one piece of to-be-received feedback information based on the feedback period of the at least one piece of candidate feedback information. This helps resolve a collision caused in the receiving and/or sending process of the feedback information.

In a possible implementation, the at least one piece of candidate feedback information includes the at least one piece of candidate feedback information that needs to be sent; and when the at least one piece of candidate feedback information that needs to be sent includes first candidate feedback information and second candidate feedback information, and a feedback period of the first candidate feedback information is longer than a feedback period of the second candidate feedback information, the terminal device determines the at least one piece of to-be-sent feedback information, where the at least one piece of to-be-sent feedback information belongs to the first candidate feedback information.

In this implementation, the terminal device determines the at least one piece of to-be-sent feedback information based on the feedback period of the at least one piece of candidate feedback information that needs to be sent. This helps resolve a collision caused in the sending process of the feedback information.

In a possible implementation, the at least one piece of candidate feedback information includes the at least one piece of candidate feedback information that needs to be received; and when the at least one piece of candidate feedback information that needs to be received includes third candidate feedback information and fourth candidate feedback information, and a feedback period of the third candidate feedback information is longer than a feedback period of the fourth candidate feedback information, the terminal device determines the at least one piece of to-be-received feedback information, where the at least one piece of to-be-received feedback information belongs to the third candidate feedback information.

In this implementation, the terminal device determines the at least one piece of to-be-received feedback information based on the feedback period of the at least one piece of candidate feedback information that needs to be received. This helps resolve a collision caused in the receiving process of the feedback information.

In a possible implementation, the at least one piece of candidate feedback information includes the at least one piece of candidate feedback information that needs to be sent and the at least one piece of candidate feedback information that needs to be received; and when the at least one piece of candidate feedback information that needs to be sent includes first candidate feedback information and second candidate feedback information, a feedback period of the first candidate feedback information is longer than a feedback period of the second candidate feedback information, the at least one piece of candidate feedback information that needs to be sent includes fifth-type candidate feedback information and sixth-type candidate feedback information, and the at least one piece of candidate feedback information that needs to be received includes the fifth-type candidate feedback information and the sixth-type candidate feedback information, the terminal device determines the at least one piece of to-be-sent feedback information and/or the at least one piece of to-be-received feedback information, where the at least one piece of to-be-sent feedback information belongs to the first candidate feedback information, and the at least one piece of to-be-received feedback information belongs to the third candidate feedback information.

In this implementation, the terminal device determines the at least one piece of to-be-sent feedback information and/or the at least one piece of to-be-received feedback information based on the feedback period of the at least one piece of candidate feedback information. This helps resolve a collision caused in the receiving and/or sending process of the feedback information.

In a possible implementation, the at least one piece of candidate feedback information includes the at least one piece of candidate feedback information that needs to be sent; and when the at least one piece of candidate feedback information that needs to be sent includes seventh-type candidate feedback information and eighth-type candidate feedback information, a feedback type of the seventh-type candidate feedback information is an acknowledgement feedback, and a feedback type of the eighth-type candidate feedback information is a negative acknowledgement feedback, the terminal device determines the at least one piece of to-be-sent feedback information, where the at least one piece of to-be-sent feedback information belongs to the eighth-type candidate feedback information.

In this implementation, the terminal device determines the at least one piece of to-be-sent feedback information based on the feedback type of the at least one piece of candidate feedback information that needs to be sent. This helps resolve a collision caused in the sending process of the feedback information.

In a possible implementation, the at least one piece of candidate feedback information includes the at least one piece of candidate feedback information that needs to be received; and when the at least one piece of candidate feedback information that needs to be received includes seventh-type candidate feedback information and eighth-type candidate feedback information, the terminal device determines the at least one piece of to-be-received feedback information, where the at least one piece of to-be-received feedback information belongs to the eighth-type candidate feedback information.

In this implementation, the terminal device determines the at least one piece of to-be-received feedback information based on the feedback type of the at least one piece of candidate feedback information that needs to be received. This helps resolve a collision caused in the receiving process of the feedback information.

In a possible implementation, the at least one piece of candidate feedback information includes the at least one piece of candidate feedback information that needs to be sent and the at least one piece of candidate feedback information that needs to be received; and when the at least one piece of candidate feedback information that needs to be sent includes seventh-type candidate feedback information and eighth-type candidate feedback information, and the at least one piece of candidate feedback information that needs to be received includes the seventh-type candidate feedback information and the eighth-type candidate feedback information, the terminal device determines the at least one piece of to-be-sent feedback information and/or the at least one piece of to-be-received feedback information, where the at least one piece of to-be-sent feedback information belongs to the eighth-type candidate feedback information, and the at least one piece of to-be-received feedback information belongs to the eighth-type candidate feedback information.

In this implementation, the terminal device determines the at least one piece of to-be-sent feedback information and/or the at least one piece of to-be-received feedback information based on the feedback type of the at least one piece of candidate feedback information. This helps resolve a collision caused in the receiving and/or sending process of the feedback information.

In a possible implementation, the method further includes: If the data information corresponding to the at least one piece of to-be-sent feedback information is reserved data (that is, a corresponding type is a reservation type), or the data information corresponding to the at least one piece of to-be-received feedback information is reserved data, the data information corresponding to the at least one piece of to-be-sent feedback information or the data information corresponding to the at least one piece of to-be-received feedback information further includes indication information, where the indication information is used to indicate that a reserved link resource continues to be used or is released.

The indication information may be represented by SCI, and occupies at least one bit, for example, one bit.

For example, when transmission of the reserved data is completed, the reserved resource is released, and the one bit is set to a specific value, namely, 1, indicating that the resource reserved in the SCI is released or invalid. When transmission of the reserved data is not completed, the reserved resource continues to be used and does not need to be released, and the one bit is set to a specific value, namely, 0, indicating that the resource reserved in the SCI continues to be valid and used.

In this embodiment, the terminal device can learn whether the reserved resource continues to be used or is invalid only by detecting a bit value of the SCI without monitoring the feedback information.

According to a second aspect, a first data information transmission method is provided. The method includes: A terminal device determines at least one piece of to-be-sent first data information and/or at least one piece of to-be-received first data information in at least one piece of candidate first data information, where the at least one piece of candidate first data information includes at least one piece of candidate first data information that needs to be sent and/or at least one piece of candidate first data information that needs to be received, and the at least one piece of candidate first data information that needs to be sent and/or the at least one piece of candidate first data information that needs to be received corresponds to a same time domain resource; and the terminal device sends the at least one piece of to-be-sent first data information, and/or the terminal device receives the at least one piece of to-be-received first data information.

The terminal device may be a vehicle-mounted device, a device used by a user, a roadside unit, a network device, or the like.

Optionally, a technology used by the terminal device in a data receiving and/or sending process may be a D2D technology, a V2X technology, or the like. For example, the V2X technology may be based on an LTE-V2X technology, an NR-V2X technology, and the like.

For example, the first data information may be one or more of the following: reserved data, scheduled data, reserved periodic data, scheduled periodic data, reserved data with different periods, scheduled data with different periods, or the like.

If the terminal device determines that the at least one piece of candidate first data information that needs to be sent and/or the at least one piece of candidate first data information that needs to be received corresponds to the same time domain resource, the terminal device determines that a collision is caused between data that needs to be sent and/or data that needs to be received. The time domain resource includes one or more slots, one or more symbols, another time domain granularity, or the like. The another time granularity may be a mini-slot or a time unit shorter than one symbol.

For a terminal device without a full-duplex capability, namely, a terminal device with a half-duplex capability, the terminal device may determine the at least one piece of to-be-sent first data information or the at least one piece of to-be-received first data information in the at least one piece of candidate first data information, and then the terminal device sends the at least one piece of to-be-sent first data information, or receives the at least one piece of to-be-received first data information.

For a terminal device with a full-duplex capability, the terminal device may alternatively determine the at least one piece of to-be-sent first data information and the at least one piece of to-be-received first data information in the at least one piece of candidate first data information, and then the terminal device simultaneously sends the at least one piece of to-be-sent first data information and receives the at least one piece of to-be-received first data information.

For a terminal device with a limited sending capability, the terminal device may determine the at least one piece of to-be-sent first data information in the at least one piece of candidate first data information that needs to be sent, and then the terminal device sends the at least one piece of to-be-sent first data information, where the at least one piece of to-be-sent first data information does not exceed the sending capability of the terminal device.

For example, if the at least one piece of candidate first data information includes the at least one piece of candidate first data information that needs to be sent, and the at least one piece of candidate first data information that needs to be sent corresponds to a same time domain resource, the terminal device determines the at least one piece of to-be-sent first data information in the at least one piece of candidate first data information, and then sends the at least one piece of to-be-sent first data information.

If the at least one piece of candidate first data information includes the at least one piece of candidate first data information that needs to be received, and the at least one piece of candidate first data information that needs to be received corresponds to a same time domain resource, the terminal device determines the at least one piece of to-be-received first data information in the at least one piece of candidate first data information, and then receives the at least one piece of to-be-received first data information.

If the at least one piece of candidate first data information includes the at least one piece of candidate first data information that needs to be sent and the at least one piece of candidate first data information that needs to be received, and the at least one piece of candidate first data information that needs to be sent and the at least one piece of candidate first data information that needs to be received correspond to a same time domain resource, the terminal device determines the at least one piece of to-be-sent first data information in the at least one piece of candidate first data information, and then sends the at least one piece of to-be-sent first data information; or the terminal device determines the at least one piece of to-be-received first data information in the at least one piece of candidate first data information, and then receives the at least one piece of to-be-received first data information.

If the at least one piece of candidate first data information includes the at least one piece of candidate first data information that needs to be sent and the at least one piece of candidate first data information that needs to be received, the at least one piece of candidate first data information that needs to be sent corresponds to a same time domain resource, and the at least one piece of candidate first data information that needs to be received corresponds to a same time domain resource, the terminal device determines the at least one piece of to-be-sent first data information and the at least one piece of to-be-received first data information in the at least one piece of candidate first data information, and then sends the at least one piece of to-be-sent first data information and receives the at least one piece of to-be-received first data information.

When the at least one piece of candidate first data information that needs to be sent and/or the at least one piece of candidate first data information that needs to be received corresponds to a same time domain resource, the terminal device may select the at least one piece of to-be-sent first data information and/or the at least one piece of to-be-received first data information from the at least one piece of candidate first data information that needs to be sent and/or the at least one piece of candidate first data information that needs to be received, and then send the at least one piece of to-be-sent first data information, and/or receive the at least one piece of to-be-received first data information. Therefore, this method resolves a collision caused in a receiving and/or sending process of first data information, and ensures efficient and accurate receiving and/or sending of the first data information.

In a possible implementation, the at least one piece of candidate first data information that needs to be sent and/or the at least one piece of candidate first data information that needs to be received corresponds to a same first time domain resource; and the terminal device sends the at least one piece of to-be-sent first data information on a second time domain resource, and/or the terminal device receives the at least one piece of to-be-received first data information on a second time domain resource, where the second time domain resource is the same as the first time domain resource, the second time domain resource includes the first time domain resource, or the second time domain resource partially overlaps the first time domain resource.

In a possible implementation, the terminal device may determine the at least one piece of to-be-sent first data information and/or the at least one piece of to-be-received first data information in the at least one piece of candidate first data information in the following several manners:

the terminal device determines the at least one piece of to-be-sent first data information and/or the at least one piece of to-be-received first data information based on a quality of service level of data information corresponding to the at least one piece of candidate first data information;

the terminal device determines the at least one piece of to-be-sent first data information and/or the at least one piece of to-be-received first data information based on a first quantity of the at least one piece of candidate first data information that needs to be sent and/or a second quantity of the at least one piece of candidate first data information that needs to be received;

the terminal device determines the at least one piece of to-be-sent first data information and/or the at least one piece of to-be-received first data information based on a type of data corresponding to the at least one piece of candidate first data information;

the terminal device determines the at least one piece of to-be-sent first data information or the at least one piece of to-be-received first data information based on a feedback period of the at least one piece of candidate first data information; or the terminal device determines the at least one piece of to-be-sent first data information and/or the at least one piece of to-be-received first data information based on a feedback type of the at least one piece of candidate first data information.

For example, the quality of service level may include a reference value such as a QoS level. A specific QoS level may include a reference value such as a PPPP/5QI, and may further include reference values such as availability, a throughput, a delay, and a packet loss rate. The type of the data may include unicast and groupcast/multicast, include a reservation type and a scheduling type, or include an option 1 feedback and an option 2 feedback. The feedback type may include an acknowledgement feedback and a negative acknowledgement feedback.

Specifically, if the terminal device determines the at least one piece of to-be-sent first data information and/or the at least one piece of to-be-received first data information based on the quality of service level of the data information corresponding to the at least one piece of candidate first data information:

if the at least one piece of candidate first data information includes the at least one piece of candidate first data information that needs to be sent, the terminal device determines the at least one piece of to-be-sent first data information based on the quality of service level of the data information corresponding to the at least one piece of candidate first data information;

if the at least one piece of candidate first data information includes the at least one piece of candidate first data information that needs to be received, the terminal device determines the at least one piece of to-be-received first data information based on the quality of service level of the data information corresponding to the at least one piece of candidate first data information; or if the at least one piece of candidate first data information includes the at least one piece of candidate first data information that needs to be sent and the at least one piece of candidate first data information that needs to be received, the terminal device determines, based on the quality of service level of the data information corresponding to the at least one piece of candidate first data information, the at least one piece of candidate first data information that needs to be sent and/or at least one piece of candidate first data information that needs to be received.

Specifically, if the terminal device determines the at least one piece of to-be-sent first data information and/or the at least one piece of to-be-received first data information based on the first quantity of the at least one piece of candidate first data information that needs to be sent and/or the second quantity of the at least one piece of candidate first data information that needs to be received:

if the at least one piece of candidate first data information includes the at least one piece of candidate first data information that needs to be sent, the terminal device determines the at least one piece of to-be-sent first data information based on the first quantity of the at least one piece of candidate first data information that needs to be sent;

if the at least one piece of candidate first data information includes the at least one piece of candidate first data information that needs to be received, the terminal device determines the at least one piece of to-be-received first data information based on the second quantity of the at least one piece of candidate first data information that needs to be received; or if the at least one piece of candidate first data information includes the at least one piece of candidate first data information that needs to be sent and the at least one piece of candidate first data information that needs to be received, the terminal device determines the at least one piece of to-be-sent first data information and/or the at least one piece of to-be-received first data information based on the first quantity of the at least one piece of candidate first data information that needs to be sent and the second quantity of the at least one piece of candidate first data information that needs to be received.

Specifically, if the terminal device determines the at least one piece of to-be-sent first data information and/or the at least one piece of to-be-received first data information based on the type of the data corresponding to the at least one piece of candidate first data information:

if the at least one piece of candidate first data information includes the at least one piece of candidate first data information that needs to be sent, the terminal device determines the at least one piece of to-be-sent first data information based on the type of the data corresponding to the at least one piece of candidate first data information;

if the at least one piece of candidate first data information includes the at least one piece of candidate first data information that needs to be received, the terminal device determines the at least one piece of to-be-received first data information based on the type of the data corresponding to the at least one piece of candidate first data information; or if the at least one piece of candidate first data information includes the at least one piece of candidate first data information that needs to be sent and the at least one piece of candidate first data information that needs to be received, the terminal device determines the at least one piece of to-be-sent first data information and/or the at least one piece of to-be-received first data information based on the type of the data corresponding to the at least one piece of candidate first data information.

Specifically, if the terminal device determines the at least one piece of to-be-sent first data information and/or the at least one piece of to-be-received first data information based on the feedback period of the at least one piece of candidate first data information:

if the at least one piece of candidate first data information includes the at least one piece of candidate first data information that needs to be sent, the terminal device determines the at least one piece of to-be-sent first data information based on the feedback period of the at least one piece of candidate first data information;

if the at least one piece of candidate first data information includes the at least one piece of candidate first data information that needs to be received, the terminal device determines the at least one piece of to-be-received first data information based on the feedback period of the at least one piece of candidate first data information; or if the at least one piece of candidate first data information includes the at least one piece of candidate first data information that needs to be sent and the at least one piece of candidate first data information that needs to be received, the terminal device determines the at least one piece of to-be-sent first data information and/or the at least one piece of to-be-received first data information based on the feedback period of the at least one piece of candidate first data information.

Specifically, if the terminal device determines the at least one piece of to-be-sent first data information and/or the at least one piece of to-be-received first data information based on the feedback type of the at least one piece of candidate first data information includes:

if the at least one piece of candidate first data information includes the at least one piece of candidate first data information that needs to be sent, the terminal device determines the at least one piece of to-be-sent first data information based on the type of the at least one piece of candidate first data information;

if the at least one piece of candidate first data information includes the at least one piece of candidate first data information that needs to be received, the terminal device determines the at least one piece of to-be-received first data information based on the type of the at least one piece of candidate first data information; or if the at least one piece of candidate first data information includes the at least one piece of candidate first data information that needs to be sent and the at least one piece of candidate first data information that needs to be received, the terminal device determines the at least one piece of to-be-sent first data information and/or the at least one piece of to-be-received first data information based on the type of the at least one piece of candidate first data information.

In this implementation, the terminal device may determine the at least one piece of to-be-sent first data information and/or the at least one piece of to-be-received first data information based on a quality of service level, a quantity of pieces of candidate first data information, a type of data corresponding to the candidate first data information, a feedback period of the candidate first data information, or a feedback type of the candidate first data information. This helps resolve a collision caused in the receiving and/or sending process of the first data information.

In a possible implementation, the at least one piece of candidate first data information includes the at least one piece of candidate first data information that needs to be sent; and when a first reference value of a quality of service level of data information corresponding to the at least one piece of candidate first data information that needs to be sent is greater than or equal to a first priority threshold, the terminal device determines the at least one piece of to-be-sent first data information, where the at least one piece of to-be-sent first data information belongs to the at least one piece of candidate first data information that needs to be sent.

In this implementation, the terminal device may determine the at least one piece of to-be-sent first data information based on the first reference value of the quality of service level of the data information corresponding to the at least one piece of candidate first data information that needs to be sent. This helps resolve a collision caused in a sending process of the first data information.

In a possible implementation, the at least one piece of candidate first data information includes the at least one piece of candidate first data information that needs to be received; and when a second reference value of a quality of service level of data information corresponding to the at least one piece of candidate first data information that needs to be received is greater than or equal to a first priority threshold, the terminal device determines the at least one piece of to-be-received first data information, where the at least one piece of to-be-received first data information belongs to the at least one piece of candidate first data information that needs to be received.

In this implementation, the terminal device may determine the at least one piece of to-be-sent first data information based on the first reference value of the quality of service level of the data information corresponding to the at least one piece of candidate first data information that needs to be sent. This helps resolve a collision caused in a sending process of the first data information.

In this implementation, the terminal device may determine the at least one piece of to-be-received first data information based on the first reference value of the quality of service level of the data information corresponding to the at least one piece of candidate first data information that needs to be received. This helps resolve a collision caused in a receiving process of the first data information.

In a possible implementation, the at least one piece of candidate first data information includes the at least one piece of candidate first data information that needs to be sent and the at least one piece of candidate first data information that needs to be received; and when a first reference value of a quality of service level of data information corresponding to the at least one piece of candidate first data information that needs to be sent is greater than or equal to a first priority threshold, the terminal device determines the at least one piece of to-be-sent first data information, where the at least one piece of to-be-sent first data information belongs to the at least one piece of candidate first data information that needs to be sent; and/or when a second reference value of a quality of service level of data information corresponding to the at least one piece of candidate first data information that needs to be received is greater than or equal to a first priority threshold, the terminal device determines the at least one piece of to-be-received first data information, where the at least one piece of to-be-received first data information belongs to the at least one piece of candidate first data information that needs to be received.

In this implementation, the terminal device determines the at least one piece of to-be-sent first data information and/or the at least one piece of to-be-received first data information based on the first reference value of the quality of service level of the data information corresponding to the at least one piece of candidate first data information that needs to be sent, and/or based on the second reference value of the quality of service level of the data information corresponding to the at least one piece of candidate first data information that needs to be received. This helps resolve a collision caused in the receiving and/or sending process of the first data information.

In a possible implementation, the at least one piece of candidate first data information includes the at least one piece of candidate first data information that needs to be sent and the at least one piece of candidate first data information that needs to be received; and when a first reference value of a quality of service level of data information corresponding to the at least one piece of candidate first data information that needs to be sent is greater than or equal to a second reference value of a quality of service level of data information corresponding to the at least one piece of candidate first data information that needs to be received, the terminal device determines the at least one piece of to-be-sent first data information, where the at least one piece of to-be-sent first data information belongs to the at least one piece of candidate first data information that needs to be sent; or when a first reference value of a quality of service level of data information corresponding to the at least one piece of candidate first data information that needs to be sent is less than or equal to a second reference value of a quality of service level of data information corresponding to the at least one piece of candidate first data information that needs to be received, the terminal device determines the at least one piece of to-be-received first data information, where the at least one piece of to-be-received first data information belongs to the at least one piece of candidate first data information that needs to be received.

In this implementation, the terminal device determines the at least one piece of to-be-sent first data information or the at least one piece of to-be-received first data information based on the first reference value of the quality of service level of the data information corresponding to the at least one piece of candidate first data information that needs to be sent, and based on the second reference value of the quality of service level of the data information corresponding to the at least one piece of candidate first data information that needs to be received. This helps resolve a collision caused in the receiving and/or sending process of the first data information.

In a possible implementation, the first reference value is an average value of quality of service levels of data information corresponding to all first data information in the at least one piece of candidate first data information that needs to be sent, or the first reference value is an average value of quality of service levels of data information corresponding to a first data information set in the at least one piece of candidate first data information that needs to be sent, where the first data information set includes the first N pieces of first data information, in descending order of quality of service levels of corresponding data information, in the at least one piece of candidate first data information that needs to be sent, and N is a positive integer greater than or equal to 1; and the second reference value is an average value of quality of service levels of data information corresponding to all first data information in the at least one piece of candidate first data information that needs to be received, or the second reference value is an average value of quality of service levels of data information corresponding to a second data information set in the at least one piece of candidate first data information that needs to be received, where the second data information set includes the first M pieces of first data information, in descending order of quality of service levels of corresponding data information, in the at least one piece of candidate first data information that needs to be received, and M is a positive integer greater than or equal to 1.

In a possible implementation, the at least one piece of candidate first data information includes the at least one piece of candidate first data information that needs to be sent; and when the first quantity of the at least one piece of candidate first data information that needs to be sent is greater than or equal to a first threshold, the terminal device determines the at least one piece of to-be-sent first data information, where the at least one piece of to-be-sent first data information belongs to the at least one piece of candidate first data information that needs to be sent.

In this implementation, the terminal device may determine the at least one piece of to-be-sent first data information based on the first quantity of the at least one piece of candidate first data information that needs to be sent. This helps resolve a collision caused in the sending process of the first data information.

In a possible implementation, the at least one piece of candidate first data information includes the at least one piece of candidate first data information that needs to be received; and when the second quantity of the at least one piece of candidate first data information that needs to be received is greater than or equal to a first threshold, the terminal device determines the at least one piece of to-be-received first data information, where the at least one piece of to-be-received first data information belongs to the at least one piece of candidate first data information that needs to be received.

In this implementation, the terminal device may determine the at least one piece of to-be-received first data information based on the second quantity of the at least one piece of candidate first data information that needs to be received. This helps resolve a collision caused in the receiving process of the first data information.

In a possible implementation, the at least one piece of candidate first data information includes the at least one piece of candidate first data information that needs to be sent and the at least one piece of candidate first data information that needs to be received; and when the second quantity of the at least one piece of candidate first data information that needs to be received is greater than or equal to a first threshold, the terminal device determines the at least one piece of to-be-received first data information, where the at least one piece of to-be-received first data information belongs to the at least one piece of candidate first data information that needs to be received; and/or when the first quantity of the at least one piece of candidate first data information that needs to be sent is greater than a first threshold, the terminal device determines the at least one piece of to-be-sent first data information, where the at least one piece of to-be-sent first data information belongs to the at least one piece of candidate first data information that needs to be sent.

In this implementation, the terminal device determines the at least one piece of to-be-sent first data information and/or the at least one piece of to-be-received first data information based on the first quantity of the at least one piece of candidate first data information that needs to be sent and/or the second quantity of the at least one piece of candidate first data information that needs to be received. This helps resolve a collision caused in the receiving and/or sending process of the first data information.

In a possible implementation, the at least one piece of candidate first data information includes the at least one piece of candidate first data information that needs to be sent and the at least one piece of candidate first data information that needs to be received; and when a ratio of the second quantity of the at least one piece of candidate first data information that needs to be received to the first quantity of the at least one piece of candidate first data information that needs to be sent is greater than or equal to a first ratio threshold, the terminal device determines the at least one piece of to-be-received first data information, where the at least one piece of to-be-received first data information belongs to the at least one piece of candidate first data information that needs to be received; or when a ratio of the second quantity of the at least one piece of candidate first data information that needs to be received to the first quantity of the at least one piece of candidate first data information that needs to be sent is less than or equal to a first ratio threshold, the terminal device determines the at least one piece of to-be-sent first data information, where the at least one piece of to-be-sent first data information belongs to the at least one piece of candidate first data information that needs to be sent.

In this implementation, the terminal device determines the at least one piece of to-be-sent first data information or the at least one piece of to-be-received first data information based on the first quantity of the at least one piece of candidate first data information that needs to be sent and the second quantity of the at least one piece of candidate first data information that needs to be received. This helps resolve a collision caused in the receiving and/or sending process of the first data information.

In a possible implementation, the at least one piece of candidate first data information includes the at least one piece of candidate first data information that needs to be sent and the at least one piece of candidate first data information that needs to be received; and when a ratio of the first quantity of the at least one piece of candidate first data information that needs to be received to the second quantity of the at least one piece of candidate first data information that needs to be received is greater than or equal to a second ratio threshold, the terminal device determines the at least one piece of to-be-sent first data information, where the at least one piece of to-be-sent first data information belongs to the at least one piece of candidate first data information that needs to be sent; or when a ratio of the first quantity of the at least one piece of candidate first data information that needs to be sent to the second quantity of the at least one piece of candidate first data information that needs to be received is less than a second ratio threshold, the terminal device determines the at least one piece of to-be-received first data information, where the at least one piece of to-be-received first data information belongs to the at least one piece of candidate first data information that needs to be received.

In this implementation, the terminal device determines the at least one piece of to-be-sent first data information or the at least one piece of to-be-received first data information based on the first quantity of the at least one piece of candidate first data information that needs to be sent and the second quantity of the at least one piece of candidate first data information that needs to be received. This helps resolve a collision caused in the receiving and/or sending process of the first data information.

In a possible implementation, the at least one piece of candidate first data information includes the at least one piece of candidate first data information that needs to be sent and the at least one piece of candidate first data information that needs to be received; and when the at least one piece of candidate first data information that needs to be sent is first-type candidate first data information, the at least one piece of candidate first data information that needs to be received is second-type candidate first data information, a type of data corresponding to the first-type candidate first data information is unicast, and a type of data corresponding to the second-type candidate first data information is groupcast/multicast, the terminal device determines the at least one piece of to-be-sent first data information, where the at least one piece of to-be-sent first data information belongs to the first-type candidate first data information.

In this implementation, the type of the data corresponding to the candidate first data information determined by the terminal device includes the type of the data corresponding to the first-type candidate first data information and the type of the data corresponding to the second-type candidate first data information, and the terminal device determines the at least one piece of to-be-sent first data information based on the type of the data corresponding to the at least one piece of candidate first data information that needs to be sent and the type of the data corresponding to the at least one piece of candidate first data information that needs to be received. This helps resolve a collision caused in the receiving and/or sending process of the first data information.

In a possible implementation, the at least one piece of candidate first data information includes the at least one piece of candidate first data information that needs to be sent and the at least one piece of candidate first data information that needs to be received; and when the at least one piece of candidate first data information that needs to be sent is second-type candidate first data information, and the at least one piece of candidate first data information that needs to be received is first-type candidate first data information, the terminal device determines the at least one piece of to-be-received first data information, where the at least one piece of to-be-received first data information belongs to the first-type candidate first data information.

In this implementation, the type of the data corresponding to the candidate first data information determined by the terminal device includes the type of the data corresponding to the first-type candidate first data information and the type of the data corresponding to the second-type candidate first data information, and the terminal device determines the at least one piece of to-be-received first data information based on the type of the data corresponding to the at least one piece of candidate first data information that needs to be sent and the type of the data corresponding to the at least one piece of candidate first data information that needs to be received. This helps resolve a collision caused in the receiving and/or sending process of the first data information.

In a possible implementation, the at least one piece of candidate first data information includes the at least one piece of candidate first data information that needs to be sent; and when the at least one piece of candidate first data information that needs to be sent includes first-type candidate first data information and second-type candidate first data information, the terminal device determines the at least one piece of to-be-sent first data information, where the at least one piece of to-be-sent first data information belongs to the first-type candidate first data information.

In this implementation, the type of the data corresponding to the candidate first data information determined by the terminal device includes the type of the data corresponding to the first-type candidate first data information and the type of the data corresponding to the second-type candidate first data information, and the terminal device determines the at least one piece of to-be-sent first data information based on the type of the data corresponding to the at least one piece of candidate first data information that needs to be sent. This helps resolve a collision caused in the sending process of the first data information.

In a possible implementation, the at least one piece of candidate first data information includes the at least one piece of candidate first data information that needs to be received; and when the at least one piece of candidate first data information that needs to be received includes first-type candidate first data information and second-type candidate first data information, the terminal device determines the at least one piece of to-be-received first data information, where the at least one piece of to-be-received first data information belongs to the first-type candidate first data information.

In this implementation, the type of the data corresponding to the candidate first data information determined by the terminal device includes the type of the data corresponding to the first-type candidate first data information and the type of the data corresponding to the second-type candidate first data information, and the terminal device determines the at least one piece of to-be-received first data information based on the type of the data corresponding to the at least one piece of candidate first data information that needs to be received. This helps resolve a collision caused in the receiving process of the first data information.

In a possible implementation, the at least one piece of candidate first data information includes the at least one piece of candidate first data information that needs to be sent and the at least one piece of candidate first data information that needs to be received; and when the at least one piece of candidate first data information that needs to be sent includes first-type candidate first data information and second-type candidate first data information, and the at least one piece of candidate first data information that needs to be received includes the first-type candidate first data information and the second-type candidate first data information, the terminal device determines the at least one piece of to-be-sent first data information and/or the at least one piece of to-be-received first data information, where the at least one piece of to-be-sent first data information belongs to the first-type candidate first data information, and the at least one piece of to-be-received first data information belongs to the first-type candidate first data information.

In this implementation, if the type of the data corresponding to the at least one piece of candidate first data information includes the first-type candidate first data information and the second-type candidate first data information, the terminal device determines the at least one piece of to-be-sent first data information and/or the at least one piece of to-be-received first data information based on the type of the data corresponding to the at least one piece of candidate first data information. This helps resolve a collision caused in the receiving and/or sending process of the first data information.

In a possible implementation, the at least one piece of candidate first data information includes the at least one piece of candidate first data information that needs to be sent and the at least one piece of candidate first data information that needs to be received; and when the at least one piece of candidate first data information that needs to be sent is third-type candidate first data information, the at least one piece of candidate first data information that needs to be received is fourth-type candidate first data information, a type of data corresponding to the third-type candidate first data information is a reservation type, and a type of data corresponding to the fourth-type candidate first data information is a scheduling type, the terminal device determines the at least one piece of to-be-sent first data information, where the at least one piece of to-be-sent first data information belongs to the third-type candidate first data information.

In a possible implementation, if a type of data corresponding to one piece of candidate first data information includes third-type candidate first data information and fourth-type candidate first data information, the terminal device determines the at least one piece of to-be-sent first data information based on the type of the data corresponding to the at least one piece of candidate first data information. This helps resolve a collision caused in the receiving and/or sending process of the first data information.

In a possible implementation, the at least one piece of candidate first data information includes the at least one piece of candidate first data information that needs to be sent and the at least one piece of candidate first data information that needs to be received; and when the at least one piece of candidate first data information that needs to be sent is fourth-type candidate first data information, and the at least one piece of candidate first data information that needs to be received is third-type candidate first data information, the terminal device determines the at least one piece of to-be-received first data information, where the at least one piece of to-be-received first data information belongs to the third-type candidate first data information.

In a possible implementation, if a type of data corresponding to one piece of candidate first data information includes third-type candidate first data information and fourth-type candidate first data information, the terminal device determines the at least one piece of to-be-received first data information based on the type of the data corresponding to the at least one piece of candidate first data information. This helps resolve a collision caused in the receiving and/or sending process of the first data information.

In a possible implementation, the at least one piece of candidate first data information includes the at least one piece of candidate first data information that needs to be sent; and when the at least one piece of candidate first data information that needs to be sent includes third-type candidate first data information and fourth-type candidate first data information, the terminal device determines the at least one piece of to-be-sent first data information, where the at least one piece of to-be-sent first data information belongs to the third-type candidate first data information.

In a possible implementation, if a type of data corresponding to one piece of candidate first data information that needs to be sent includes third-type candidate first data information and fourth-type candidate first data information, the terminal device determines the at least one piece of to-be-sent first data information based on the type of the data corresponding to the at least one piece of candidate first data information. This helps resolve a collision caused in the sending process of the first data information.

In a possible implementation, the at least one piece of candidate first data information includes the at least one piece of candidate first data information that needs to be received; and when the at least one piece of candidate first data information that needs to be received includes third-type candidate first data information and fourth-type candidate first data information, the terminal device determines the at least one piece of to-be-received first data information, where the at least one piece of to-be-received first data information belongs to the third-type candidate first data information.

In this implementation, if a type of data corresponding to one piece of candidate first data information that needs to be received includes third-type candidate first data information and fourth-type candidate first data information, the terminal device determines the at least one piece of to-be-received first data information based on the type of the data corresponding to the at least one piece of candidate first data information. This helps resolve a collision caused in the receiving process of the first data information.

In a possible implementation, the at least one piece of candidate first data information includes the at least one piece of candidate first data information that needs to be sent and the at least one piece of candidate first data information that needs to be received; and when the at least one piece of candidate first data information that needs to be sent includes third-type candidate first data information and fourth-type candidate first data information, and the at least one piece of candidate first data information that needs to be received includes the third-type candidate first data information and the fourth-type candidate first data information, the terminal device determines the at least one piece of to-be-sent first data information and/or the at least one piece of to-be-received first data information, where the at least one piece of to-be-sent first data information belongs to the third-type candidate first data information, and the at least one piece of to-be-received first data information belongs to the third-type candidate first data information.

In this implementation, if the type of the data corresponding to the at least one piece of candidate first data information includes the third-type candidate first data information and the fourth-type candidate first data information, the terminal device determines the at least one piece of to-be-sent first data information and/or the at least one piece of to-be-received first data information based on the type of the data corresponding to the at least one piece of candidate first data information. This helps resolve a collision caused in the receiving and/or sending process of the first data information.

In a possible implementation, the at least one piece of candidate first data information includes the at least one piece of candidate first data information that needs to be sent and the at least one piece of candidate first data information that needs to be received; and when the at least one piece of candidate first data information that needs to be sent is fifth-type candidate first data information, the at least one piece of candidate first data information that needs to be received is sixth-type candidate first data information, a type of data corresponding to the fifth-type candidate first data information is feeding back only negative acknowledgement information on a feedback resource, and a type of data corresponding to the sixth-type candidate first data information is feeding back acknowledgement information or the negative acknowledgement information on a feedback resource corresponding to the terminal device, the terminal device determines the at least one piece of to-be-sent first data information, where the at least one piece of to-be-sent first data information belongs to the fifth-type candidate first data information.

In this implementation, if a type of data corresponding to at least one piece of candidate first data information includes the fifth-type candidate first data information and the sixth-type candidate first data information, the terminal device determines the at least one piece of to-be-sent first data information based on the type of the data corresponding to the at least one piece of candidate first data information. This helps resolve a collision caused in the receiving and/or sending process of the first data information.

In a possible implementation, the at least one piece of candidate first data information includes the at least one piece of candidate first data information that needs to be sent and the at least one piece of candidate first data information that needs to be received; and when the at least one piece of candidate first data information that needs to be sent is sixth-type candidate first data information, and the at least one piece of candidate first data information that needs to be received is fifth-type candidate first data information, the terminal device determines the at least one piece of to-be-received first data information, where the at least one piece of to-be-received first data information belongs to the fifth-type candidate first data information.

In this implementation, if the type of the data corresponding to at least one piece of candidate first data information includes the fifth-type candidate first data information and the sixth-type candidate first data information, the terminal device determines the at least one piece of to-be-received first data information based on the type of the data corresponding to the at least one piece of candidate first data information. This helps resolve a collision caused in the receiving and/or sending process of the first data information.

In a possible implementation, the at least one piece of candidate first data information includes the at least one piece of candidate first data information that needs to be sent; and when the at least one piece of candidate first data information that needs to be sent includes fifth-type candidate first data information and sixth-type candidate first data information, the terminal device determines the at least one piece of to-be-sent first data information, where the at least one piece of to-be-sent first data information belongs to the fifth-type candidate first data information.

In this implementation, if the type of the data corresponding to at least one piece of candidate first data information that needs to be sent includes the fifth-type candidate first data information and the sixth-type candidate first data information, the terminal device determines the at least one piece of to-be-sent first data information based on the type of the data corresponding to the at least one piece of candidate first data information. This helps resolve a collision caused in the sending process of the first data information.

In a possible implementation, the at least one piece of candidate first data information includes the at least one piece of candidate first data information that needs to be received; and when the at least one piece of candidate first data information that needs to be received includes the fifth-type candidate first data information and the sixth-type candidate first data information, the terminal device determines the at least one piece of to-be-received first data information, where the at least one piece of to-be-received first data information belongs to the fifth-type candidate first data information.

In this implementation, if the type of the data corresponding to at least one piece of candidate first data information that needs to be received includes the fifth-type candidate first data information and the sixth-type candidate first data information, the terminal device determines the at least one piece of to-be-received first data information based on the type of the data corresponding to the at least one piece of candidate first data information. This helps resolve a collision caused in the receiving process of the first data information.

In a possible implementation, the at least one piece of candidate first data information includes the at least one piece of candidate first data information that needs to be sent and the at least one piece of candidate first data information that needs to be received; and when the at least one piece of candidate first data information that needs to be sent includes fifth-type candidate first data information and sixth-type candidate first data information, and the at least one piece of candidate first data information that needs to be received includes the fifth-type candidate first data information and the sixth-type candidate first data information, the terminal device determines the at least one piece of to-be-sent first data information and/or the at least one piece of to-be-received first data information, where the at least one piece of to-be-sent first data information belongs to the fifth-type candidate first data information, and the at least one piece of to-be-received first data information belongs to the fifth-type candidate first data information.

In this implementation, if the type of the data corresponding to the at least one piece of candidate first data information includes the fifth-type candidate first data information and the sixth-type candidate first data information, the terminal device determines the at least one piece of to-be-sent first data information and/or the at least one piece of to-be-received first data information based on the type of the data corresponding to the at least one piece of candidate first data information. This helps resolve a collision caused in the receiving and/or sending process of the first data information.

In a possible implementation, the at least one piece of candidate first data information includes the at least one piece of candidate first data information that needs to be sent and the at least one piece of candidate first data information that needs to be received; and when a first period of the at least one piece of candidate first data information that needs to be sent is longer than or equal to a second period of the at least one piece of candidate first data information that needs to be received, the terminal device determines the at least one piece of to-be-sent first data information, where the at least one piece of to-be-sent first data information belongs to the at least one piece of candidate first data information that needs to be sent.

In this implementation, the terminal device determines the at least one piece of to-be-sent first data information based on the period of the at least one piece of candidate first data information. This helps resolve a collision caused in the receiving and/or sending process of the first data information.

In a possible implementation, the at least one piece of candidate first data information includes the at least one piece of candidate first data information that needs to be sent and the at least one piece of candidate first data information that needs to be received; and when a first period of the at least one piece of candidate first data information that needs to be sent is shorter than or equal to a second period of the at least one piece of candidate first data information that needs to be received, the terminal device determines the at least one piece of to-be-received first data information, where the at least one piece of to-be-received first data information belongs to the at least one piece of candidate first data information that needs to be received.

In this implementation, the terminal device determines the at least one piece of to-be-received first data information based on the period of the at least one piece of candidate first data information. This helps resolve a collision caused in the receiving and/or sending process of the first data information.

In a possible implementation, the at least one piece of candidate first data information includes the at least one piece of candidate first data information that needs to be sent; and when the at least one piece of candidate first data information that needs to be sent includes first candidate first data information and second candidate first data information, and a period of the first candidate first data information is longer than a period of the second candidate first data information, the terminal device determines the at least one piece of to-be-sent first data information, where the at least one piece of to-be-sent first data information belongs to the first candidate first data information.

In this implementation, the terminal device determines the at least one piece of to-be-sent first data information based on the period of the at least one piece of candidate first data information that needs to be sent. This helps resolve a collision caused in the sending process of the first data information.

In a possible implementation, the at least one piece of candidate first data information includes the at least one piece of candidate first data information that needs to be received; and when the at least one piece of candidate first data information that needs to be received includes third candidate first data information and fourth candidate first data information, and a period of the third candidate first data information is longer than a period of the fourth candidate first data information, the terminal device determines the at least one piece of to-be-received first data information, where the at least one piece of to-be-received first data information belongs to the third candidate first data information.

In this implementation, the terminal device determines the at least one piece of to-be-received first data information based on the period of the at least one piece of candidate first data information that needs to be received. This helps resolve a collision caused in the receiving process of the first data information.

In a possible implementation, the at least one piece of candidate first data information includes the at least one piece of candidate first data information that needs to be sent and the at least one piece of candidate first data information that needs to be received; and when the at least one piece of candidate first data information that needs to be sent includes first candidate first data information and second candidate first data information, a period of the first candidate first data information is longer than a period of the second candidate first data information, the at least one piece of candidate first data information that needs to be sent includes fifth-type candidate first data information and sixth-type candidate first data information, and the at least one piece of candidate first data information that needs to be received includes the fifth-type candidate first data information and the sixth-type candidate first data information, the terminal device determines the at least one piece of to-be-sent first data information and/or the at least one piece of to-be-received first data information, where the at least one piece of to-be-sent first data information belongs to the first candidate first data information, and the at least one piece of to-be-received first data information belongs to the third candidate first data information.

In this implementation, the terminal device determines the at least one piece of to-be-sent first data information and/or the at least one piece of to-be-received first data information based on the period of the at least one piece of candidate first data information. This helps resolve a collision caused in the receiving and/or sending process of the first data information.

In a possible implementation, the at least one piece of candidate first data information includes the at least one piece of candidate first data information that needs to be sent; and when the at least one piece of candidate first data information that needs to be sent includes seventh-type candidate first data information and eighth-type candidate first data information, a feedback type of the seventh-type candidate first data information is an acknowledgement feedback, and a feedback type of the eighth-type candidate first data information is a negative acknowledgement feedback, the terminal device determines the at least one piece of to-be-sent first data information, where the at least one piece of to-be-sent first data information belongs to the eighth-type candidate first data information.

In this implementation, the terminal device determines the at least one piece of to-be-sent first data information based on the feedback type of the at least one piece of candidate first data information that needs to be sent. This helps resolve a collision caused in the sending process of the first data information.

In a possible implementation, the at least one piece of candidate first data information includes the at least one piece of candidate first data information that needs to be received; and when the at least one piece of candidate first data information that needs to be received includes seventh-type candidate first data information and eighth-type candidate first data information, the terminal device determines the at least one piece of to-be-received first data information, where the at least one piece of to-be-received first data information belongs to the eighth-type candidate first data information.

In this implementation, the terminal device determines the at least one piece of to-be-received first data information based on the feedback type of the at least one piece of candidate first data information that needs to be received. This helps resolve a collision caused in the receiving process of the first data information.

In a possible implementation, the at least one piece of candidate first data information includes the at least one piece of candidate first data information that needs to be sent and the at least one piece of first data information that needs to be received; and when the at least one piece of candidate first data information that needs to be sent includes seventh-type candidate first data information and eighth-type candidate first data information, and the at least one piece of candidate first data information that needs to be received includes the seventh-type candidate first data information and the eighth-type candidate first data information, the terminal device determines the at least one piece of to-be-sent first data information and/or the at least one piece of to-be-received first data information, where the at least one piece of to-be-sent first data information belongs to the eighth-type candidate first data information, and the at least one piece of to-be-received first data information belongs to the eighth-type candidate first data information.

In this implementation, the terminal device determines the at least one piece of to-be-sent first data information and/or the at least one piece of to-be-received first data information based on the feedback type of the at least one piece of candidate first data information. This helps resolve a collision caused in the receiving and/or sending process of the first data information.

In a possible implementation, the method further includes: If the data information corresponding to the at least one piece of to-be-sent first data information is reserved data (that is, a corresponding type is a reservation type), or the data information corresponding to the at least one piece of to-be-received first data information is reserved data, the data information corresponding to the at least one piece of to-be-sent first data information or the data information corresponding to the at least one piece of to-be-received first data information further includes indication information, where the indication information is used to indicate that a reserved link resource continues to be used or is released.

The indication information may be represented by SCI, and occupies at least one bit (bit), for example, one bit.

For example, when transmission of the reserved data is completed, the reserved resource is released, and the one bit is set to a specific value, namely, 1, indicating that the resource reserved in the SCI is released or invalid. When transmission of the reserved data is not completed, the reserved resource continues to be used and does not need to be released, and the one bit is set to a specific value, namely, 0, indicating that the resource reserved in the SCI continues to be valid and used.

In this embodiment, the terminal device can learn whether the reserved resource continues to be used or is invalid only by detecting a bit value of the SCI without monitoring the first data information.

According to a third aspect, a feedback information transmission apparatus is provided. The apparatus has a function of implementing behavior in the method example in the first aspect or the second aspect. The function may be implemented by hardware, or may be implemented by hardware by executing corresponding software. The hardware or the software includes one or more modules corresponding to the foregoing function. In a possible implementation, a structure of the apparatus includes a processing unit and a transceiver unit. These units may perform corresponding steps or functions in the method example in the first aspect or the second aspect. For details, refer to detailed descriptions in the method example. Details are not described herein again.

The apparatus may be located in a terminal device, or may be the terminal device.

According to a fourth aspect, a feedback information transmission apparatus is provided. The apparatus provided in this application has a function of implementing the foregoing method aspect of the terminal device, and includes corresponding means configured to perform steps or functions described in the first aspect, the second aspect, any one of the possible implementations of the first aspect, or any one of the possible implementations of the second aspect. The steps or functions may be implemented by using software, hardware (for example, a circuit), or a combination of hardware and software. The apparatus may be a terminal device.

In a possible implementation, the apparatus includes one or more processors and communication units. The one or more processors are configured to support the apparatus in performing corresponding functions of the terminal device in the foregoing methods.

Optionally, the apparatus may further include one or more memories. The memory is configured to be coupled to the processor, and the memory stores program instructions and/or data necessary for the apparatus. The one or more memories may be integrated with the processor, or may be disposed independent of the processor. This is not limited in this application.

In another possible implementation, the apparatus includes a transceiver, a processor, and a memory. The processor is configured to control the transceiver or an input/output circuit to receive or send a signal. The memory is configured to store a computer program. The processor is configured to run the computer program in the memory, to enable the apparatus to perform the method completed by the terminal device in the first aspect, the second aspect, any one of the possible implementations of the first aspect, or any one of the possible implementations of the second aspect.

In a possible implementation, the apparatus includes one or more processors and communication units. The one or more processors are configured to support the apparatus in performing corresponding functions of the terminal device in the foregoing methods.

Optionally, the apparatus may further include one or more memories. The memory is configured to be coupled to the processor, and the memory stores program instructions and/or data necessary for the terminal device. The one or more memories may be integrated with the processor, or may be disposed independent of the processor. This is not limited in this application.

The apparatus may be located in a terminal device, or may be the terminal device.

In another possible implementation, the apparatus includes a transceiver, a processor, and a memory. The processor is configured to control the transceiver or an input/output circuit to receive or send a signal. The memory is configured to store a computer program. The processor is configured to run the computer program in the memory, to enable the apparatus to perform the method completed by the terminal device in the first aspect, the second aspect, any one of the possible implementations of the first aspect, or any one of the possible implementations of the second aspect.

According to a fifth aspect, a computer-readable storage medium is provided. The computer-readable storage medium is configured to store a computer program. The computer program includes instructions used to perform the method in the first aspect, the second aspect, any one of the possible implementations of the first aspect, or any one of the possible implementations of the second aspect.

According to a sixth aspect, a computer program product is provided. The computer program product includes computer program code. When the computer program code is run on a computer, the computer is enabled to perform the method in the first aspect, the second aspect, any one of the possible implementations of the first aspect, or any one of the possible implementations of the second aspect.

According to a seventh aspect, a feedback information transmission apparatus, for example, a chip system, is provided. The apparatus is connected to a memory, and is configured to read and execute a software program stored in the memory, to perform the method in the first aspect, the second aspect, any one of the possible implementations of the first aspect, or any one of the possible implementations of the second aspect.

BRIEF DESCRIPTION OF THE DRAWINGS

FIG. 2 is a schematic flowchart of feedback information transmission according to an embodiment of this application;

FIG. 3 is a schematic diagram in which time domain resources for feedback information that needs to be sent overlap according to an embodiment of this application;

FIG. 4 is a schematic diagram in which time domain resources for feedback information that needs to be received overlap according to an embodiment of this application;

DETAILED DESCRIPTION OF ILLUSTRATIVE EMBODIMENTS

Figure 1:
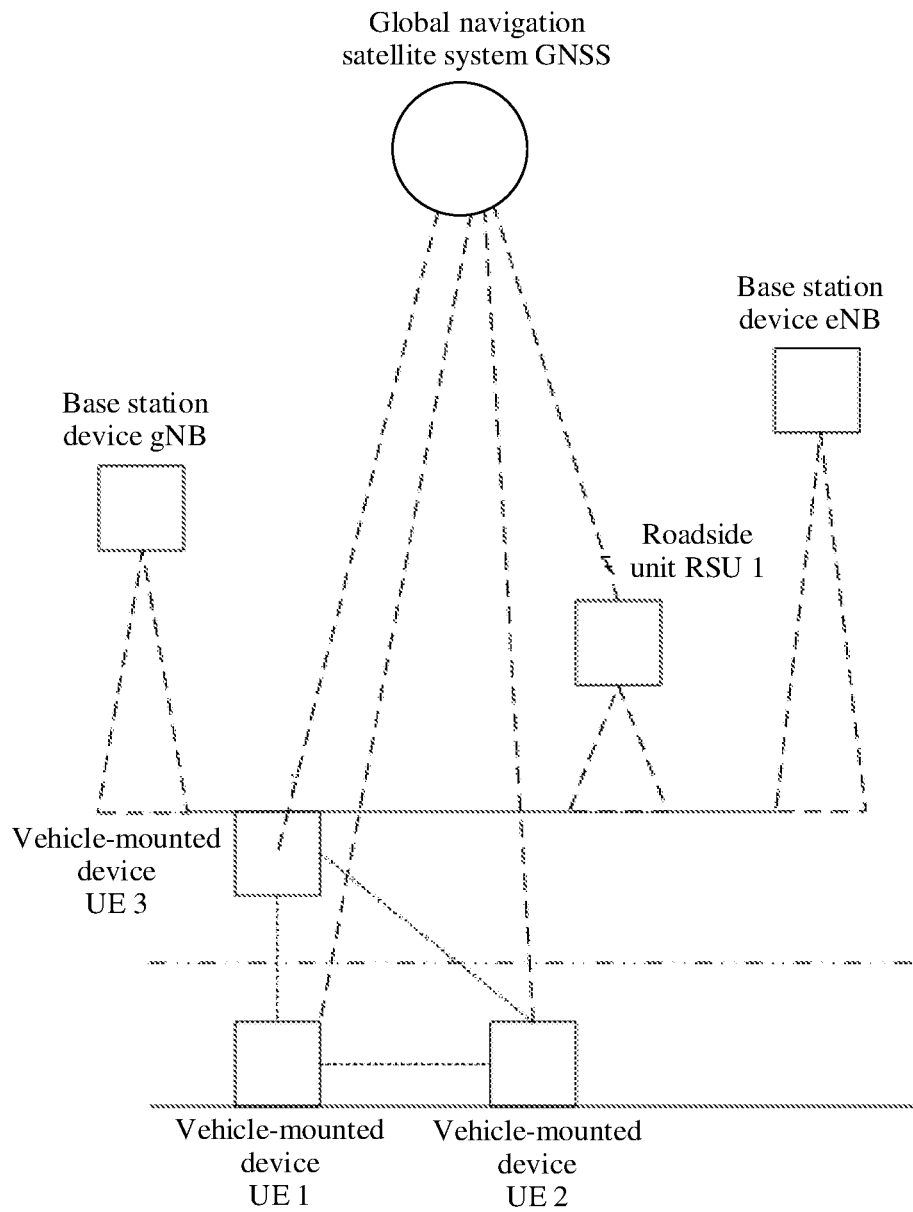
FIG. 1 is a schematic diagram of an application scenario according to an embodiment of this application.

The following further describes the present invention in detail with reference to the accompanying drawings.

The technical solutions in the embodiments of this application may be applied to various communication systems, for example, a 4th generation (4G) system. The 4G system includes an LTE system, a worldwide interoperability for microwave access (WiMAX) communication system, a future 5th generation (5G) system such as NR, and future communication systems such as a 6G system. In addition, the technical solutions provided in the embodiments of this application may be applied to a cellular link, or may be applied to a link between devices, for example, a device to device (D2D) link. The D2D link or a V2X link may also be referred to as a sidelink (SL), and the sidelink may also be referred to as a sidelink, a secondary link, or the like. In the embodiments of this application, the foregoing terms all refer to links established between devices of a same type, and have a same meaning. The link established between devices of a same type may be a link between terminal devices, or may be a link between base stations, or may be a link between relay nodes, or the like. This is not limited in the embodiments of this application. For the link between the terminal devices, there is a D2D link defined in 3GPP Release (Rel)-12/13, and there is also a V2X link, defined by 3GPP for Internet of Vehicles, from a vehicle to a vehicle, a vehicle to a mobile phone, or a vehicle to any entity. The V2X link includes a V2X link in Rel-14/15, and further includes, for example, a V2X link based on an NR system in Rel-16 and subsequent releases which are currently being researched by 3GPP.

This application presents all aspects, embodiments, or features by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in the embodiments of this application is used to represent giving an example, an illustration, or a description. Any embodiment or design described as an "example" in this application should not be explained as being more preferred or having more advantages than another embodiment or design. Exactly, the term "example" is used to present a concept in a specific manner.

A network architecture and a service scenario (or an application scenario) that are described in the embodiments of this application are intended to describe the technical solutions in the embodiments of this application more clearly, and do not constitute a limitation on the technical solutions provided in the embodiments of this application. A person of ordinary skill in the art may know that, with the evolution of the network architecture and emergence of a new service scenario, the technical solutions provided in the embodiments of this application are also applicable to similar technical problems.

The following describes some terms in the embodiments of this application, to facilitate understanding by a person skilled in the art.

(1) Terminal device: The terminal device includes a device that provides a user with voice and/or data connectivity, for example, may include a handheld device with a wireless connection function, or a processing device connected to a wireless modem. The terminal device may communicate with a core network through a radio access network (RAN) and exchange voice and/or data with the RAN. The terminal device may include user equipment (UE), a wireless terminal device, a mobile terminal device, a subscriber unit, a subscriber station, a mobile station, a mobile console (mobile), a remote station, an access point (AP), a remote terminal device (remote terminal), an access terminal device (access terminal), a user terminal device (user terminal), a user agent, a user apparatus (user device), or the like. For example, the terminal device may include a mobile phone (or referred to as a "cellular" phone), a computer having a mobile terminal device, a portable, pocket-sized, handheld, or computer built-in mobile apparatus, a smart wearable device, or the like. For example, the terminal is a personal communications service (PCS) phone, a cordless telephone set, a session initiation protocol (SIP) phone, a wireless local loop (WLL) station, or a personal digital assistant (PDA). The terminal further includes a limited device such as a device with relatively low power consumption, a device with a limited storage capability, or a device with a limited computing capability. For example, the terminal includes an information sensing device such as a barcode, radio frequency identification (RFID), a sensor, a global positioning system (GPS), or a laser scanner.

By way of example, but not limitation, the terminal device in the embodiments of this application may alternatively be a wearable device or the like. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not only a hardware device, but implements powerful functions through software support, data exchange, and cloud interaction. Generalized wearable intelligent devices include full-featured and large-size devices, such as smart watches or smart glasses, that can implement complete or partial functions without depending on smartphones; and devices, such as various smart bands, smart helmets, or smart jewelry for monitoring physical signs, that focus on only one type of application functions and need to work with other devices such as smartphones.

However, if the various terminal devices described above are located on a vehicle (for example, placed in the vehicle or installed in the vehicle), the terminal devices may be considered as vehicle-mounted terminal devices, and the vehicle-mounted terminal devices are also referred to as on-board units (OBUs) for example. If located on a roadside terminal device (for example, placed in a roadside unit or being installed in a roadside unit), the terminal device may be considered as a roadside terminal device, and the roadside terminal device is also referred to as a roadside unit (Road Side Unit, RSU). The terminal device in this application may alternatively be a vehicle-mounted module, a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement the method in this application.

In the embodiments of this application, the terminal device may further include a network device. The network device includes an access network (AN) device, for example, a base station (for example, an access point), and may be a device that communicates with a wireless terminal device through one or more cells on an air interface in an access network. For example, a network device in a V2X technology is a road side unit (RSU). The base station may be configured to mutually convert a received over-the-air frame and a received Internet protocol (IP) packet, and serve as a router between the terminal device and the other parts of the access network, where the other parts of the access network may include an IP network. The RSU may be a fixed infrastructure entity supporting application of the V2X, and may exchange a message with another entity supporting application of the V2X. The network device may further coordinate attribute management of the air interface. For example, the network device may include an evolved NodeB (NodeB or eNB or e-NodeB, evolutional Node B) in a long term evolution (LTE) system or an LTE-advanced (LTE-A) system, may include a next generation NodeB (next generation node B, gNB) in a 5G NR system, or may include a centralized unit (CU) and a distributed unit (DU) in a cloud access network (cloud radio access network, CloudRAN) system. This is not limited in the embodiments of this application.

(2) Transmission link: The transmission link includes a sidelink between two terminals, an uplink/a downlink between a terminal side device and a network side device, and the like.

(3) Sidelink (SL): The sidelink may also be referred to as a sidelink, a secondary link, or the like. The name is not limited in the embodiments of this application. In a V2X scenario, the sidelink is a direct link connection between two V2X terminals, and the V2X terminal is a terminal with a V2X function, for example, the foregoing terminal device.

(4) SL transmission: Data transmission between two V2X terminals on a sidelink is referred to as the SL transmission.

Before performing the SL transmission, the two V2X terminals may establish a sidelink connection. For example, the V2X terminal used as an initiator sends a request for establishing a sidelink connection to the network device. If the network device agrees with the V2X terminal on establishing the sidelink connection, the network device sends, to the V2X terminal, configuration information for establishing the sidelink connection, and the V2X terminal establishes a sidelink connection to another V2X terminal based on the configuration information sent by the network device.

(5) Time domain resource, slot, mini-slot, symbol, or another time domain granularity (for example, a system frame or a subframe): One slot may include at least one symbol, for example, 14 symbols or 12 symbols. If overlapping time domain resources exist (or a same time domain resource is occupied, or in other words, time domain resources overlap) in a transmission (that is, sending) and/or receiving process of feedback information, a collision is caused in the receiving and/or sending process of the feedback information.

In 5G NR, one slot may include at least one of a symbol used for downlink transmission, a flexible symbol, a symbol used for uplink transmission, and the like. In this way, compositions of the slot are referred to as different slot formats (SFs), and there may be a maximum of 256 slot formats.

A slot may have different slot types, and the different slot types include different quantities of symbols. For example, a mini slot includes fewer than seven symbols, and a common slot includes seven symbols or 14 symbols. Based on different subcarrier spacings, symbol lengths may be different. Therefore, slot lengths may be different.

In 5G NR, a slot aggregation technology is further introduced. To be specific, the network device may allocate a plurality of slots to a same terminal for data transmission. For example, the terminal may perform uplink data scheduling in a plurality of allocated slots, for example, scheduling on a physical uplink shared channel (PUSCH), or may perform downlink data scheduling in a plurality of allocated slots, for example, scheduling on a physical downlink shared channel (PDSCH).

It should be noted that the slot in this embodiment of this application may be any one of the foregoing slots.

(6) Feedback information: The feedback information includes feedback information that needs to be received by the terminal device and/or feedback information that needs to be sent by the terminal device. The feedback information that needs to be received by the terminal device is sent by another device to the terminal device, and the feedback information that needs to be sent by the terminal device is sent by the terminal device to the another device. The another device may be another terminal device or a network device. Specifically, the feedback information includes hybrid automatic repeat request (HARQ) feedback information and the like.

(7) The terms "system" and "network" in the embodiments of this application may be used interchangeably. "A plurality of" means two or more. In view of this, "a plurality of" in this embodiment of this application may also be understood as "at least two". The term "at least one" may be understood as one or more, for example, understood as one, two, or more. For example, "include at least one" means including one, two, or more, and does not limit which items are included. For example, if "include at least one of A, B, and C", A, B, C, A and B, A and C, B and C, or A and B and C may be included. Similarly, an understanding of descriptions such as "at least one type" is similar. The term "and/or" describes an association relationship for describing associated objects and represents that three relationships may exist. For example, A and/or B may represent the following three cases: Only A exists, both A and B exist, and only B exists. In addition, unless otherwise specified, the character "/" generally indicates an "or" relationship between associated objects.

Unless otherwise stated on the contrary, ordinal numerals such as "first" and "second" in the embodiments of this application are used to distinguish between a plurality of objects, and are not intended to limit a sequence, a time sequence, a priority, or an importance degree of the plurality of objects. For example, a first time domain resource and a second time domain resource are merely intended to distinguish between different time domain resources, but are not intended to limit priorities, importance, or the like of the two time domain resources.

In addition, it should be understood that in the descriptions of this application, "preset" and "predefined" values or information may be preconfigured, or may be configured by using higher layer signaling. The preconfiguration may be writing the values or information in the terminal device in advance, or may be configuring the values or information for the terminal device through operation, administration and maintenance (OAM). Performing the configuration by using higher layer signaling is that the network device sends a value or information to be configured to the terminal device by using higher layer signaling. The higher layer signaling may be one or more of radio resource control (RRC) signaling or MAC signaling.

For ease of understanding the embodiments of this application, the following describes application scenarios of this application.

Internet of Things is a network extended and expanded based on the Internet provided by a communication system. By using various apparatuses and technologies such as various information sensors, radio frequency identification technologies, a global positioning system, an infrared sensor, and a laser scanner, the Internet of Things collects any object or process that needs to be monitored, connected, and interacted, and implements ubiquitous connections between things, and between things and people through different types of possible network access. In brief, the core and foundation of the Internet of Things is still the Internet. The Internet of Things is a network extended and expanded based on the Internet. A user end of the Internet of Things extends and expands to information exchange and communication between any things.

The Internet of Things is applied to various fields, such as intelligent transportation. With the development of transportation informatization and industrial development of intelligent transportation, a concept of Internet of Vehicles is proposed. The Internet of Vehicles mainly means that a vehicle-mounted device on a vehicle effectively routes dynamic information of all vehicles on an information network platform by using a wireless communication technology, and provides different function services during operation of the vehicle, to improve vehicle safety, automatic driving, and traffic efficiency. Implementation of the Internet of Vehicles mainly depends on a V2X technology. A core of the V2X technology is to implement interconnection between the vehicles and everything. The V2X technology is mainly applied to a vehicle-to-everything (vehicle to everything, V2X) scenario. The V2X specifically further includes four application scenarios: vehicle-to-vehicle (Vehicle to Vehicle, V2V), vehicle-to-pedestrian (V2P), vehicle-to-infrastructure (V2I) on a roadside, and vehicle-to-network (V2N). V2V refers to inter-vehicle communication. V2P refers to communication between vehicles and people (including pedestrians, cyclists, drivers, and passengers). V2I refers to communication between a vehicle and a roadside unit (RSU). V2N refers to communication between a vehicle and a base station/network.

FIG. 1 is a schematic diagram of an application scenario. The application scenario shown in FIG. 1 is a V2X scenario. The scenario includes a vehicle-mounted device (which includes UE 1, UE 2, and UE 3, as shown in FIG. 1), a roadside unit (which includes an RSU 1, as shown in FIG. 1), a base station device (which includes an eNB, a gNB, and the like, as shown in FIG. 1), and a global navigation satellite system (which includes a GNSS, as shown in FIG. 1). There may be one or more devices in this scenario. Vehicle-mounted devices may communicate with each other to exchange and share information, for example, vehicle connection status information such as a vehicle location and a driving speed. The information may be used to determine a road vehicle flow status. The RSU may communicate with each vehicle-mounted device and/or base station device, and may further be configured to detect a road surface condition and guide the vehicle to select an optimal driving route. The base station device communicates with each vehicle-mounted device and/or the RSU, and the GNSS may provide positioning and time serving information for another network element. In addition, the vehicle-mounted device in the Internet of Vehicles may further communicate with a person. Specifically, a user may perform information communication with a vehicle by using a wireless communication means such as Wi-Fi, Bluetooth, or cellular, so that the user can monitor and control the vehicle by using a corresponding mobile terminal device. The base station device in FIG. 1 is optional. If there is a base station device, it is a scenario in which network coverage is provided. If there is no base station device, it is a scenario in which no network coverage is provided.

The foregoing devices may communicate with each other by using a sidelink and an uplink/a downlink. During communication, a spectrum of a cellular link may be used, or an intelligent transportation spectrum near 5.9 GHz may be used. A technology for mutual communication between devices may be enhanced based on a communication network protocol (for example, an LTE protocol), or may be enhanced based on a D2D technology.

Optionally, in a communication process, the UE 1 may send data (including feedback information) to different UE 2 and UE 3, and receive respective feedback information (for example, ACK/NACK) from the UE 2 and the UE 3. The UE 1 may send the data at a same moment or different moments. However, when receiving the feedback information from the UE 2 and the UE 3, the UE 1 may receive the feedback information at a same moment, or in other words, receive the feedback information in a same symbol. The same symbol may be in a same slot, or may be in different slots. The same symbol may be one or more symbols, or may be a part of a symbol. Therefore, the UE 1 needs to receive a plurality of pieces of feedback information simultaneously. Even in a unicast scenario, the UE 2 and the UE 3 may feed back information to the UE 1 simultaneously. Optionally, in a communication process, the UE 1 may further send data to a destination UE. The destination UE may be one destination UE, or may be a plurality of destination UEs, for example, a plurality of destination UEs in one groupcast/multicast group. Therefore, the UE 1 may simultaneously receive a plurality of pieces of feedback information. Optionally, a combination of unicast and groupcast/multicast may alternatively be used. That is, the UE 1 may send data to unicast destination UE (for example, the UE 2) and different destination UEs (for example, the UE 3 and another UE) in a group. Although the UE 1 may send data at a same moment or different moments, when the UE 1 receives the feedback information from the UE 2 and the UE 3 at a same moment or on a same symbol, the UE also needs to receive a plurality of pieces of feedback information simultaneously. The same symbol may be in a same slot, or may be in different slots. The same symbol may be one or more symbols, or may be a part of a symbol.

In a communication process, a transmission resource of the terminal device needs to be determined. There is a periodic service in V2X, and a transmission resource available for a sidelink needs to be configured for a period of time during communication. Certainly, there are also aperiodic services, and transmission resources available for the sidelink need to be configured. A conclusion is drawn at the meeting, to efficiently indicate a transmission resource method to a terminal that performs V2X communication. The conclusion drawn at the RAM1 #97 meeting includes the following cases. Case 1: UE sends a PSSCH, and receives another PSSCH scheduled by SCI. Respective PSFCHs of the two PSSCHs appear in a same timeslot. Case 2: UE receives SCI sent by different UEs and PSSCHs scheduled by the SCI. PSFCHs corresponding to these PSSCHs appear in a same timeslot. For Case 1, one PSSCH is used for receiving, and the other is used for sending. For a terminal device without a full-duplex capability, a collision is caused between sending and/or receiving of feedback information. For Case 2, if sent feedback information exceeds a capability limit of the terminal device or faces a power limit, a collision is caused when feedback information is sent. However, currently, no appropriate solution is provided to avoid a collision caused in a process of receiving and/or sending (sending and/or receiving) the feedback information. Consequently, the feedback information cannot be normally received or sent, and efficient and accurate transmission of the feedback information cannot be ensured.

In view of this, to resolve a collision caused in a data receiving and/or sending process, and efficiently and accurately transmit the feedback information, this application provides a feedback information transmission method, to partially reserve feedback information that causes a collision, to avoid a collision caused in a sending and/or receiving process of the feedback information.

It should be noted that, although the embodiments of this application mainly provide a solution to a collision caused by the feedback information in the data receiving and/or sending process, for other data (for example, any one of received and/or sent data reserved on a transmission link, data that is reserved on a transmission link and that is to be simultaneously sent, received and/or sent data scheduled on a transmission link, and data that is scheduled on a transmission link and that is to be simultaneously sent), if a collision is caused in the data receiving and/or sending process, the collision may also be resolved by using the solutions provided in the embodiments of this application. The transmission link may be a sidelink.

The following uses simultaneous sending as an example for description.

For example, when a plurality of pieces of data that are reserved on a transmission link and that is to be simultaneously sent have respective corresponding periods, reserved data that has a longer period and that is to be simultaneously sent has a higher priority, and reserved data that has a shorter period and that is to be simultaneously sent has a lower priority. If the plurality of pieces of data that are reserved on the transmission link and to be simultaneously sent collide, the terminal device performs sending or discarding based on the foregoing priorities. That is, the to-be-sent reserved data with a higher priority is sent, and the to-be-sent reserved data with a lower priority is discarded.

For example, when there are to-be-sent reserved data and to-be-sent scheduled data on the transmission link, between the to-be-sent reserved data and the to-be-sent scheduled data, the to-be-sent reserved data has a higher priority, and the to-be-sent scheduled data has a lower priority. If the to-be-sent reserved data collides with the to-be-sent scheduled data, the terminal device performs sending or discarding based on the foregoing priorities. That is, the to-be-sent reserved data with a higher priority is sent, and the to-be-sent scheduled data with a lower priority is discarded.

In this application, a collision is caused, that is, data overlaps.

The following describes an example in which both sending and receiving are performed.

For example, when to-be-sent data and to-be-received data that are reserved on a transmission link have respective corresponding periods, the to-be-sent reserved data or to-be-received reserved data with a longer period has a higher priority, and the to-be-sent reserved data or to-be-received reserved data with a shorter period has a lower priority. If the to-be-sent or to-be-received data reserved on the transmission link collides, the terminal device performs sending or discarding based on the foregoing priorities. That is, the to-be-sent reserved data with a higher priority is sent, and the to-be-received reserved data with a lower priority is discarded; or the to-be-received reserved data with a higher priority is received, and the to-be-sent reserved data with a lower priority is discarded.

For example, when there are to-be-sent reserved data and to-be-received scheduled data on a transmission link, between the to-be-sent reserved data and the to-be-received scheduled data, the to-be-sent reserved data has a higher priority, and the to-be-received scheduled data has a lower priority. If the to-be-sent reserved data collides with the to-be-received scheduled data, the terminal device sends or discards the data based on the foregoing priorities. That is, the to-be-sent reserved data with a higher priority is sent, and the to-be-received scheduled data with a lower priority is discarded.

For example, when there are to-be-received reserved data and to-be-sent scheduled data on a transmission link, between the to-be-received reserved data and the to-be-sent scheduled data, the to-be-received reserved data has a higher priority, and the to-be-sent scheduled data has a lower priority. If the to-be-received reserved data collides with the to-be-sent scheduled data, the terminal device performs receiving or discarding based on the foregoing priorities. That is, the to-be-received reserved data with a higher priority is received, and the to-be-sent data scheduled with a lower priority is discarded.

In this application, candidate feedback information may also be referred to as feedback information. A quality of service level may also be referred to as quality of service (QoS).

In this method, if at least one piece of candidate feedback information includes at least one piece of candidate feedback information that needs to be sent, and the at least one piece of candidate feedback information that needs to be sent corresponds to a same time domain resource, the terminal determines at least one piece of to-be-sent feedback information in the at least one piece of candidate feedback information, and then sends the at least one piece of to-be-sent feedback information.

If at least one piece of candidate feedback information includes at least one piece of candidate feedback information that needs to be received, and the at least one piece of candidate feedback information that needs to be received corresponds to a same time domain resource, the terminal device determines at least one piece of to-be-received feedback information in the at least one piece of candidate feedback information, and then receives the at least one piece of to-be-received feedback information.

If at least one piece of candidate feedback information includes at least one piece of candidate feedback information that needs to be sent and at least one piece of candidate feedback information that needs to be received, and the at least one piece of candidate feedback information that needs to be sent and the at least one piece of candidate feedback information that needs to be received correspond to a same time domain resource, the terminal determines at least one piece of to-be-sent feedback information in the at least one piece of candidate feedback information, and then sends the at least one piece of to-be-sent feedback information; or the terminal determines the at least one piece of to-be-received feedback information in the at least one piece of candidate feedback information, and then receives the at least one piece of to-be-received feedback information.

If at least one piece of candidate feedback information includes at least one piece of candidate feedback information that needs to be sent and at least one piece of candidate feedback information that needs to be received, the at least one piece of candidate feedback information that needs to be sent corresponds to a same time domain resource, and the at least one piece of candidate feedback information that needs to be received corresponds to a same time domain resource, the terminal device determines at least one piece of to-be-sent feedback information and at least one piece of to-be-received feedback information in the at least one piece of candidate feedback information, and then sends the at least one piece of to-be-sent feedback information and receives the at least one piece of to-be-received feedback information.

An embodiment of this application provides a feedback information transmission method. The method may be applied to the scenario shown in FIG. 1, or may be applied to another scenario in which a collision may be caused. Referring to FIG. 2, the following describes in detail a specific process of the feedback information transmission method. As shown in FIG. 2, the process includes the following steps.

Step 2.1: A terminal device determines that at least one piece of candidate feedback information that needs to be sent and/or at least one piece of candidate feedback information that needs to be received in at least one piece of candidate feedback information corresponds to a same time domain resource.

The at least one piece of candidate feedback information includes the at least one piece of candidate feedback information that needs to be sent and/or the at least one piece of candidate feedback information that needs to be received. That is, the at least one piece of candidate feedback information includes the at least one piece of candidate feedback information that needs to be sent, the at least one piece of candidate feedback information includes the at least one piece of candidate feedback information that needs to be received, or the at least one piece of candidate feedback information includes the at least one piece of candidate feedback information that needs to be sent and the at least one piece of candidate feedback information that needs to be received.

If the at least one piece of candidate feedback information that needs to be sent and the at least one piece of candidate feedback information that needs to be received correspond to a same time domain resource, the terminal device determines that a collision is caused in a data sending and/or receiving process. The time domain resource includes a slot, a symbol, another time domain granularity, or the like. If the at least one piece of candidate feedback information that needs to be sent corresponds to a same time domain resource, the terminal device determines that a collision is caused in a data sending and/or receiving process. The time domain resource includes a slot, a symbol, another time domain granularity, or the like. If the at least one piece of candidate feedback information that needs to be received corresponds to a same time domain resource, the terminal device determines that a collision is caused in a data receiving process. The time domain resource includes a slot, a symbol, another time domain granularity, or the like.

Optionally, that the at least one piece of candidate feedback information that needs to be sent and/or the at least one piece of candidate feedback information that needs to be received corresponds to a same time domain resource may be that the at least one piece of candidate feedback information that needs to be sent and/or the at least one piece of candidate feedback information that needs to be received corresponds to a same first time domain resource.

Specifically, that the at least one piece of candidate feedback information that needs to be sent and the at least one piece of candidate feedback information that needs to be received correspond to a same time domain resource includes that the at least one piece of candidate feedback information that needs to be sent and the at least one piece of candidate feedback information that needs to be received correspond to a same time domain resource.

That the at least one piece of candidate feedback information that needs to be sent corresponds to a same time domain resource includes: The at least one piece of candidate feedback information that needs to be sent corresponds to a same time domain resource.

That the at least one piece of candidate feedback information that needs to be received corresponds to a same time domain resource includes: The at least one piece of candidate feedback information that needs to be received corresponds to a same time domain resource.

In this application, corresponding to a same time domain resource means overlapping (overlap) on the time domain resource. The overlapping on the time domain resource may also be referred to as that overlapping occurs on the time domain resource or overlapping exists on the time domain resource. The time domain resource may be one or more symbols, one or more slots, one or more mini-slots, or the like. The one or more symbols may be in a same slot, or may be in different slots. For different candidate feedback information sent and/or received, for a specific case of the overlapping on the time domain resource, refer to the following descriptions.

That the at least one piece of candidate feedback information that needs to be sent and the at least one piece of candidate feedback information that needs to be received correspond to a same time domain resource includes that the at least one piece of candidate feedback information that needs to be sent and the at least one piece of candidate feedback information that needs to be received overlap on the time domain resource.

That the overlapping exists on the time domain resource may be: The at least one piece of candidate feedback information that needs to be sent and the at least one piece of candidate feedback information that needs to be received overlap on the time domain resource; the at least one piece of candidate feedback information that needs to be sent and that includes radio frequency switching time and the at least one piece of candidate feedback information that needs to be received overlap on the time domain resource; the at least one piece of candidate feedback information that needs to be sent and the at least one piece of candidate feedback information that needs to be received and that includes radio frequency switching time overlap on the time domain resource; or the at least one piece of candidate feedback information that needs to be sent and that includes radio frequency switching time and the at least one piece of candidate feedback information that needs to be received and that includes radio frequency switching time overlap on the time domain resource.

A specific example is as follows: That the overlapping exists on the time domain resources may be: First candidate feedback information that needs to be sent and first candidate feedback information that needs to be received overlap on the time domain resource; first candidate feedback information that needs to be sent and that includes radio frequency switching time and first candidate feedback information that needs to be received overlap on the time domain resource; first candidate feedback information that needs to be sent and first candidate feedback information that needs to be received and that includes radio frequency switching time overlap on the time domain resource; or first candidate feedback information that needs to be sent and that includes radio frequency switching time and first candidate feedback information that needs to be received and that includes radio frequency switching time overlap on the time domain resource.

That the at least one piece of candidate feedback information that needs to be sent corresponds to a same time domain resource includes that the at least one piece of candidate feedback information that needs to be sent overlaps on the time domain resource.

That the overlapping exists on the time domain resource may be: The at least one piece of candidate feedback information that needs to be sent and at least one piece of remaining candidate feedback information that needs to be sent overlap on the time domain resource; at least one piece of candidate feedback information that needs to be sent and that includes radio frequency switching time and at least one piece of remaining candidate feedback information that needs to be sent overlap on the time domain resource; or at least one piece of candidate feedback information that needs to be sent and that needs to include radio frequency switching time and at least one piece of remaining candidate feedback information that needs to be sent and that needs to include radio frequency switching time overlap on the time domain resource.

A specific example is as follows: That the overlapping exists on the time domain resource may be: First candidate feedback information that needs to be sent and second candidate feedback information that needs to be sent overlap on the time domain resource; first candidate feedback information that needs to be sent and that includes radio frequency switching time and second candidate feedback information that needs to be sent overlap on the time domain resource; or first candidate feedback information that needs to be sent and that includes radio frequency switching time and second candidate feedback information that needs to be sent and that includes radio frequency switching time overlap on the time domain resource.

That the at least one piece of candidate feedback information that needs to be received corresponds to a same time domain resource includes that the at least one piece of candidate feedback information that needs to be received overlaps on the time domain resource.

That the overlapping exists on the time domain resource may be: The at least one piece of candidate feedback information that needs to be received and at least one piece of remaining candidate feedback information that needs to be received overlap on the time domain resource; at least one piece of candidate feedback information that needs to be received and that includes radio frequency switching time and at least one piece of remaining candidate feedback information that needs to be received overlap on the time domain resource; or at least one piece of candidate feedback information that needs to be received and that needs to include radio frequency switching time and at least one piece of remaining candidate feedback information that needs to be received and that needs to include radio frequency switching time overlap on the time domain resource.

A specific example is as follows: That the overlapping exists on the time domain resource may be: First candidate feedback information that needs to be received and second candidate feedback information that needs to be received overlap on the time domain resource; first candidate feedback information that needs to be received and that includes radio frequency switching time and second candidate feedback information that needs to be received overlap on the time domain resource; or first candidate feedback information that needs to be received and that includes radio frequency switching time and second candidate feedback information that needs to be received and that includes radio frequency switching time overlap on the time domain resource.

If the at least one piece of candidate feedback information that needs to be sent corresponds to a same time domain resource, when the at least one piece of candidate feedback information that needs to be sent meets one of the following cases, the terminal device may determine that the at least one piece of candidate feedback information that needs to be sent corresponds to a same time domain resource. The at least one piece of candidate feedback information that needs to be sent includes first candidate feedback information that needs to be sent and second candidate feedback information that needs to be sent:

1. A time domain resource for the first candidate feedback information that needs to be sent partially overlaps a time domain resource for the second candidate feedback information that needs to be sent. For details, refer to an overlapping part shown in Case A in FIG. 3.

2. A time domain resource for the second candidate feedback information that needs to be sent includes a time domain resource for the first candidate feedback information that needs to be sent. For details, refer to an overlapping part shown in Case B in FIG. 3.

3. A time domain resource for the first candidate feedback information that needs to be sent includes a time domain resource for the second candidate feedback information that needs to be sent. For details, refer to an overlapping part shown in Case C in FIG. 3.

4. A time domain resource for the first candidate feedback information that needs to be sent is the same as a time domain resource for the second candidate feedback information that needs to be sent. For details, refer to an overlapping part shown in Case D in FIG. 3.

If the at least one piece of candidate feedback information that needs to be received corresponds to a same time domain resource, when the at least one piece of candidate feedback information that needs to be received meets one of the following cases, the terminal device may determine that the at least one piece of candidate feedback information that needs to be received corresponds to a same time domain resource. The at least one piece of candidate feedback information that needs to be received includes first candidate feedback information that needs to be received and second candidate feedback information that needs to be received:

1. A time domain resource for the first candidate feedback information that needs to be received partially overlaps a time domain resource for the second candidate feedback information that needs to be received. For details, refer to an overlapping part shown in Case A in FIG. 4.

2. A time domain resource for the second candidate feedback information that needs to be received includes a time domain resource for the first candidate feedback information that needs to be received. For details, refer to an overlapping part shown in Case B in FIG. 4.

3. A time domain resource for the first candidate feedback information that needs to be received includes a time domain resource for the second candidate feedback information that needs to be received. For details, refer to an overlapping part shown in Case C in FIG. 4.

4. A time domain resource for the first candidate feedback information that needs to be received is the same as a time domain resource for the second candidate feedback information that needs to be received. For details, refer to an overlapping part shown in Case D in FIG. 4.

Figure 5:
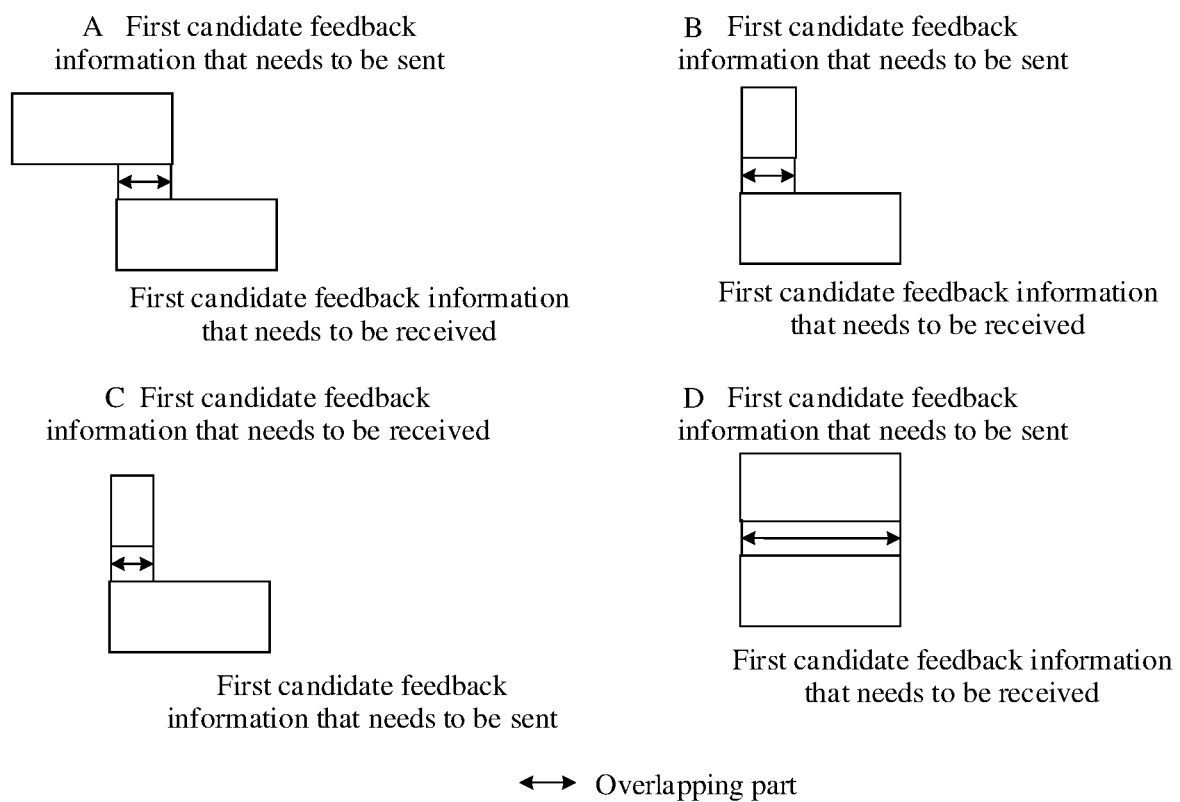
FIG. 5 is a schematic diagram in which a time domain resource for feedback information that needs to be sent and a time domain resource for feedback information that needs to be received overlap according to an embodiment of this application.

If the at least one piece of candidate feedback information that needs to be sent and the at least one piece of candidate feedback information that needs to be received correspond to a same time domain resource, when the at least one piece of candidate feedback information that needs to be sent and the at least one piece of candidate feedback information that needs to be received meet one of the following cases, the terminal device may determine that the at least one piece of candidate feedback information that needs to be sent and the at least one piece of candidate feedback information that needs to be received correspond to a same time domain resource. The at least one piece of candidate feedback information that needs to be sent and the at least one piece of candidate feedback information that needs to be received include first candidate feedback information that needs to be sent and first candidate feedback information that needs to be received:

1. A time domain resource for the first candidate feedback information that needs to be sent partially overlaps a time domain resource for the first candidate feedback information that needs to be received. For details, refer to an overlapping part shown in Case A in FIG. 5.

2. A time domain resource for the first candidate feedback information that needs to be received includes a time domain resource for the first candidate feedback information that needs to be sent. For details, refer to an overlapping part shown in Case B in FIG. 5.

3. A time domain resource for the first candidate feedback information that needs to be sent includes a time domain resource for the first candidate feedback information that needs to be received. For details, refer to an overlapping part shown in Case C in FIG. 5.

4. A time domain resource for the first candidate feedback information that needs to be sent is the same as a time domain resource for the first candidate feedback information that needs to be received. For details, refer to an overlapping part shown in Case D in FIG. 5.

Step 2.2: The terminal device determines at least one piece of to-be-sent feedback information and/or at least one piece of to-be-received feedback information in the at least one piece of candidate feedback information.

When performing step 2.2, the terminal device may determine the at least one piece of to-be-sent feedback information or the at least one piece of to-be-received feedback information in the following manners:

1. The terminal device determines the at least one piece of to-be-sent feedback information or the at least one piece of to-be-received feedback information based on a quality of service level of a data packet corresponding to the at least one piece of candidate feedback information.

2. The terminal device determines the at least one piece of to-be-sent feedback information or the at least one piece of to-be-received feedback information based on a first quantity of the at least one piece of candidate feedback information that needs to be sent and/or a second quantity of the at least one piece of candidate feedback information that needs to be received.

3. The terminal device determines the at least one piece of to-be-sent feedback information or the at least one piece of to-be-received feedback information based on a type of data corresponding to the at least one piece of candidate feedback information.

4. The terminal device determines the at least one piece of to-be-sent feedback information or the at least one piece of to-be-received feedback information based on a feedback period of the at least one piece of candidate feedback information.

5. The terminal device determines the at least one piece of to-be-sent feedback information or the at least one piece of to-be-received feedback information based on a feedback type of the at least one piece of candidate feedback information.

When performing step 2.2, the terminal device may determine the at least one piece of to-be-sent feedback information and the at least one piece of to-be-received feedback information in the following manners:

1. The terminal device determines the at least one piece of to-be-sent feedback information and the at least one piece of to-be-received feedback information based on a quality of service level of a data packet corresponding to the at least one piece of candidate feedback information.

2. The terminal device determines the at least one piece of to-be-sent feedback information and the at least one piece of to-be-received feedback information based on a first quantity of the at least one piece of candidate feedback information that needs to be sent and a second quantity of the at least one piece of candidate feedback information that needs to be received.

3. The terminal device determines the at least one piece of to-be-sent feedback information and the at least one piece of to-be-received feedback information based on a type of data corresponding to the at least one piece of candidate feedback information.

4. The terminal device determines the at least one piece of to-be-sent feedback information and the at least one piece of to-be-received feedback information based on a feedback period of the at least one piece of candidate feedback information.

5. The terminal device determines the at least one piece of to-be-sent feedback information and the at least one piece of to-be-received feedback information based on a feedback type of the at least one piece of candidate feedback information.

For example, a quality of service level of data information may include a reference value such as a QoS level. A specific QoS level may include a reference value such as a PPPP/5QI, and may further include reference values such as availability, a throughput, a delay, and a packet loss rate. The type of the data may include unicast and groupcast/multicast, unicast and broadcast, groupcast/multicast and broadcast, or unicast, groupcast/multicast, and broadcast. The type of the data may further include a reservation type and a scheduling type, or include an option 1 feedback and an option 2 feedback. The feedback type may include an acknowledgement feedback (ACK) and a negative acknowledgement feedback (NACK). The option 1 feedback may also be referred to as a first feedback type, and the option 2 feedback may also be referred to as a second feedback type. The first feedback type is feeding back only a NACK, and the second feedback type is feeding back both an ACK and a NACK. When both the ACK and the NACK are fed back, there may be a corresponding feedback resource for feeding back the ACK, namely, a feedback resource used when the terminal device feeds back the ACK, and there may be a corresponding feedback resource for feeding back the NACK, namely, a feedback resource used when the terminal device feeds back the NACK.

The foregoing manners of determining the at least one piece of to-be-sent feedback information or the at least one piece of to-be-received feedback information, and the foregoing manners of determining the at least one piece of to-be-sent feedback information and the at least one piece of to-be-received feedback information are described in detail in subsequent embodiments.

Step 2.3: The terminal device sends the at least one piece of to-be-sent feedback information, and/or the terminal device receives the at least one piece of to-be-received feedback information.

If the terminal device determines the at least one piece of to-be-sent feedback information in the at least one piece of candidate feedback information, the terminal device sends the at least one piece of to-be-sent feedback information. If the terminal device determines the at least one piece of to-be-received feedback information in the at least one piece of candidate feedback information, the terminal device receives the at least one piece of to-be-received feedback information.

For example, the terminal device sends the at least one piece of to-be-sent feedback information on a second time domain resource, the terminal device receives the at least one piece of to-be-received feedback information on the second time domain resource, or the terminal device sends the at least one piece of to-be-sent feedback information on the second time domain resource and receives the at least one piece of to-be-received feedback information on the second time domain resource. The second time domain resource is a time domain resource occupied for sending the at least one piece of to-be-sent feedback information, or the second time domain resource is a time domain resource occupied for receiving the at least one piece of to-be-received feedback information. Generally, the second time domain resource occupied for sending the at least one piece of to-be-sent feedback information may be different from the second time domain resource occupied for receiving the at least one piece of to-be-received feedback information.

The second time domain resource is the same as the first time domain resource, the second time domain resource includes the first time domain resource, or the second time domain resource partially overlaps the first time domain resource. Overlapping in this application may also be referred to as overlapping.

For a terminal device without a full-duplex capability, the terminal device may determine the at least one piece of to-be-sent feedback information or the at least one piece of to-be-received feedback information, and the terminal device may send the at least one piece of to-be-sent feedback information or receive the at least one piece of to-be-received feedback information.

For a terminal device with a full-duplex capability, the terminal device may determine the at least one piece of to-be-sent feedback information and/or the at least one piece of to-be-received feedback information, and the terminal device may send the at least one piece of to-be-sent feedback information, receive the at least one piece of to-be-received feedback information, or simultaneously send the at least one piece of to-be-sent feedback information and receive the at least one piece of to-be-received feedback information.

For example, the terminal device usually has more receiving capabilities. To be specific, a quantity of pieces of feedback information received simultaneously is not limited, or a quantity of pieces of feedback information received simultaneously may be very large. However, the terminal device usually has a limited transmission capability. To be specific, a quantity of pieces of feedback information transmitted simultaneously is limited, or a quantity of pieces of feedback information transmitted simultaneously falls within a relatively small range (where a preset first value range may be used to represent the relatively small range). In this case, for a terminal device with a limited sending capability, the terminal may determine the at least one piece of to-be-sent feedback information, and may send the at least one piece of to-be-sent feedback information.

If the terminal device can send only one piece of feedback information due to a limited sending capability or limited power, the terminal device determines the at least one piece of to-be-sent feedback information equals to determining one piece of to-be-sent feedback information.

In addition, optionally, if the terminal device determines that some candidate feedback information that needs to be sent is the at least one piece of to-be-sent feedback information, the terminal device determines not to send other candidate feedback information. To be specific, the terminal device gives up sending the other candidate feedback information, or the terminal device discards the other candidate feedback information. The other candidate feedback information is candidate feedback information other than the at least one piece of to-be-sent feedback information in the at least one piece of candidate feedback information that needs to be sent. In addition, the terminal device may alternatively determine not to receive the candidate feedback information that needs to be received.

In addition, optionally, if the terminal device determines that some candidate feedback information that needs to be received is the at least one piece of to-be-received feedback information, the terminal device determines not to receive other candidate feedback information. To be specific, the terminal device gives up receiving the other candidate feedback information, or the terminal device discards the other candidate feedback information. The other candidate feedback information is candidate feedback information other than the at least one piece of to-be-received feedback information in the at least one piece of candidate feedback information that needs to be received. In addition, the terminal device may alternatively determine not to send the candidate feedback information that needs to be sent.

In addition, optionally, if the terminal device determines at least one piece of to-be-sent candidate feedback information and at least one piece of to-be-received candidate feedback information, the terminal device determines not to send other candidate feedback information and not to receive the other candidate feedback information. The other candidate feedback information not to be sent is candidate feedback information other than the at least one piece of to-be-sent feedback information in the at least one piece of candidate feedback information that needs to be sent. The other candidate feedback information not to be received is candidate feedback information other than the at least one piece of to-be-received feedback information in the at least one piece of candidate feedback information that needs to be received.

According to the solution provided in this embodiment of this application, when the at least one piece of candidate feedback information that needs to be sent and/or the at least one piece of candidate feedback information that needs to be received corresponds to a same time domain resource, the terminal device may select the at least one piece of to-be-sent feedback information or the at least one piece of to-be-received feedback information from the at least one piece of candidate feedback information that needs to be sent and/or the at least one piece of candidate feedback information that needs to be received, and then send the at least one piece of to-be-sent feedback information, and/or receive the at least one piece of to-be-received feedback information. Therefore, this method resolves a collision existing in a receiving and/or sending process of the feedback information, and ensures efficient and accurate data transmission.

Based on FIG. 2, the foregoing manners of determining the at least one piece of to-be-sent feedback information and/or the at least one piece of to-be-received feedback information are described in detail in the embodiments of this application.

Embodiment 1: The terminal device determines the at least one piece of to-be-sent feedback information or the at least one piece of to-be-received feedback information based on the quality of service level of the data information corresponding to the at least one piece of candidate feedback information.

For example, the data information corresponding to the at least one piece of candidate feedback information has a corresponding quality of service level, and the quality of service level may be obtained from control information associated with the data information. That the data information corresponds to the at least one piece of candidate feedback information is specifically: When the data information is sent, there is feedback information corresponding to the data information. That the control information is associated with the data information is specifically: The data information is scheduled by using corresponding control information. Therefore, the terminal device may obtain, from the control information associated with the data information corresponding to the at least one piece of candidate feedback information, the quality of service level of the data information corresponding to the at least one piece of candidate feedback information.

Specifically, the terminal device determines a first reference value of the quality of service level of the data information corresponding to the at least one piece of candidate feedback information that needs to be sent; and/or the terminal device determines a second reference value of the quality of service level of the data information corresponding to the at least one piece of candidate feedback information that needs to be received. In this application, the data information may also be referred to as a data packet. In other words, the data packet may be replaced with the data information.

In an implementation, the terminal device may determine the first reference value in the following manners:

1. The terminal device determines, as the first reference value, an average value of quality of service levels of data information corresponding to all feedback information in the at least one piece of candidate feedback information that needs to be sent. In other words, the first reference value is an average value of quality of service levels of data information corresponding to all feedback information in the at least one piece of candidate feedback information that needs to be sent. For example, the terminal device obtains the quality of service levels of the data information corresponding to all the feedback information in the at least one piece of candidate feedback information that needs to be sent, calculates a first average value of the quality of service levels of the data information corresponding to all the feedback information, and determines the first average value as the first reference value.

In addition, the terminal device may alternatively determine, as the first reference value, a mapping value of quality of service levels of data information corresponding to all feedback information in the at least one piece of candidate feedback information that needs to be sent. In other words, the first reference value is a mapping value of quality of service levels of data information corresponding to all feedback information in the at least one piece of candidate feedback information that needs to be sent. For example, the terminal device obtains the quality of service levels of the data information corresponding to all the feedback information in the at least one piece of candidate feedback information that needs to be sent, calculates a first mapping value obtained through mapping the quality of service levels of the data information corresponding to all the feedback information, and determines the first mapping value as the first reference value. A mapping function may be a linear function or a non-linear function that uses, as variables, the quality of service levels of the data information corresponding to all the feedback information in the at least one piece of candidate feedback information that needs to be sent.

2. The terminal device determines, as the first reference value, an average value of quality of service levels of data information corresponding to a first feedback information set in the at least one piece of candidate feedback information that needs to be sent. In other words, the first reference value is an average value of quality of service levels of data information corresponding to a first feedback information set in the at least one piece of candidate feedback information that needs to be sent. For example, the terminal device obtains the quality of service levels of the data information corresponding to the first feedback information set in the at least one piece of candidate feedback information that needs to be sent, calculates a second average value of the quality of service levels of the data information corresponding to the first feedback information set, and determines the second average value as the first reference value.

Optionally, the first feedback information set includes the first N pieces of feedback information, in descending order of quality of service levels of corresponding data information, in the at least one piece of candidate feedback information that needs to be sent. N is a positive integer greater than or equal to 1. In other words, the first feedback information set includes N pieces of feedback information, with the highest quality of service levels of corresponding data information, in the at least one piece of candidate feedback information that needs to be sent. N is a positive integer greater than or equal to 1. In an embodiment, the first feedback information set is a piece of feedback information, with the highest quality of service level of corresponding data information, in the at least one piece of candidate feedback information that needs to be sent. In this case, N is 1.

Specifically, N is greater than or equal to 1, and N is not greater than (that is, less than or equal to) a quantity of the at least one piece of candidate feedback information that needs to be sent. For example, if the quantity of the at least one piece of candidate feedback information that needs to be sent is A, N is a positive integer greater than or equal to 1 and not greater than A.

When the first feedback information set includes one piece of feedback information, with the highest quality of service level of corresponding data information, in the at least one piece of candidate feedback information that needs to be sent, the terminal device determines, as the first reference value, the quality of service level of the data information corresponding to the first feedback information set in the at least one piece of candidate feedback information that needs to be sent. In other words, the first reference value is the quality of service level of the data information corresponding to the first feedback information set in the at least one piece of candidate feedback information that needs to be sent.

In addition, the terminal device may alternatively determine, as the first reference value, a mapping value of the quality of service levels of the data information corresponding to the first feedback information set in the at least one piece of candidate feedback information that needs to be sent. In other words, the first reference value is a mapping value of the quality of service levels of the data information corresponding to the first feedback information set in the at least one piece of candidate feedback information that needs to be sent. For example, the terminal device obtains the quality of service levels of the data information corresponding to the first feedback information set in the at least one piece of candidate feedback information that needs to be sent, calculates a second mapping value obtained by mapping, based on a mapping function, the quality of service levels of the data information corresponding to the first feedback information set, and determines the second mapping value as the first reference value. A mapping function may be a linear function or a non-linear function that uses, as variables, the quality of service levels of the data information corresponding to all the feedback information in the at least one piece of candidate feedback information that needs to be sent.

3. The terminal device determines, as the first reference value, any one of quality of service levels of data information corresponding to some or all of the at least one piece of candidate feedback information that needs to be sent.

Similarly, in an implementation, the terminal device may determine the second reference value in the following manners:

1. The terminal device determines, as the second reference value, an average value of quality of service levels of data information corresponding to all feedback information in the at least one piece of candidate feedback information that needs to be received. In other words, the second reference value is an average value of quality of service levels of data information corresponding to all feedback information in the at least one piece of candidate feedback information that needs to be received. For example, the terminal device obtains the quality of service levels of the data information corresponding to all the feedback information in the at least one piece of candidate feedback information that needs to be received, calculates a third average value of the quality of service levels of the data information corresponding to all the feedback information, and determines the third average value as the second reference value.

In addition, the terminal device may alternatively determine, as the second reference value, a mapping value of quality of service levels of data information corresponding to all feedback information in the at least one piece of candidate feedback information that needs to be received. In other words, the second reference value is a mapping value of quality of service levels of data information corresponding to all feedback information in the at least one piece of candidate feedback information that needs to be received. For example, the terminal device obtains the quality of service levels of the data information corresponding to all the feedback information in the at least one piece of candidate feedback information that needs to be received, calculates a third mapping value obtained through mapping the quality of service levels of the data information corresponding to all the feedback information, and determines the third mapping value as the second reference value. A mapping function may be a linear function or a non-linear function that uses, as variables, the quality of service levels of the data information corresponding to all the feedback information in the at least one piece of candidate feedback information that needs to be received.

2. The terminal device determines, as the second reference value, an average value of quality of service levels of data information corresponding to a second feedback information set in the at least one piece of candidate feedback information that needs to be received. In other words, the second reference value is an average value of quality of service levels of data information corresponding to a second feedback information set in the at least one piece of candidate feedback information that needs to be received. For example, the terminal device obtains the quality of service levels of the data information corresponding to the second feedback information set in the at least one piece of candidate feedback information that needs to be received, calculates a fourth average value of the quality of service levels of the data information corresponding to the second feedback information set, and determines the fourth average value as the second reference value.

Optionally, the second feedback information set includes the first M pieces of feedback information, in descending order of quality of service levels of corresponding data information, in the at least one piece of candidate feedback information that needs to be received. M is a positive integer greater than or equal to 1. In other words, the second feedback information set includes M pieces of feedback information, with the highest quality of service levels of corresponding data information in the at least one piece of candidate feedback information that needs to be received. M is a positive integer greater than or equal to 1. In an embodiment, the second feedback information set is a piece of feedback information, with the highest quality of service level of corresponding data information, in the at least one piece of candidate feedback information that needs to be received. In this case, M is 1.

Specifically, M is greater than or equal to 1, and M is not greater than a quantity of the at least one piece of candidate feedback information that needs to be received. For example, if the quantity of the at least one piece of candidate feedback information that needs to be received is B, M is a positive integer greater than or equal to 1 and not greater than B. M may be equal to N, or may not be equal to N.

In addition, the terminal device may alternatively determine, as the second reference value, a mapping value of the quality of service levels of the data information corresponding to the second feedback information set in the at least one piece of candidate feedback information that needs to be received. In other words, the second reference value is a mapping value of the quality of service levels of the data information corresponding to the second feedback information set in the at least one piece of candidate feedback information that needs to be received. For example, the terminal device obtains the quality of service levels of the data information corresponding to the second feedback information set in the at least one piece of candidate feedback information that needs to be received, calculates a fourth mapping value obtained by mapping, based on a mapping function, the quality of service levels of the data information corresponding to the second feedback information set, and determines the fourth mapping value as the second reference value. A mapping function may be a linear function or a non-linear function that uses, as variables, the quality of service levels of the data information corresponding to all the feedback information in the at least one piece of candidate feedback information that needs to be received.

3. The terminal device determines, as the second reference value, any one of quality of service levels of data information corresponding to some or all of the at least one piece of candidate feedback information that needs to be received.

Embodiment 1(1): If the at least one piece of candidate feedback information includes the at least one piece of candidate feedback information that needs to be sent: when the first reference value of the quality of service level of the data information corresponding to the at least one piece of candidate feedback information that needs to be sent is greater than or equal to a first priority threshold, the terminal device determines the at least one piece of to-be-sent feedback information, where the at least one piece of to-be-sent feedback information belongs to the at least one piece of candidate feedback information that needs to be sent.

To be specific, the terminal device determines the at least one piece of to-be-sent feedback information in the at least one piece of candidate feedback information that needs to be sent. To be specific, the terminal device determines to send some or all of candidate feedback information that needs to be sent. In other words, the terminal device determines, as to-be-sent feedback information, the some or all of the candidate feedback information that needs to be sent.

It may be understood that, if there is one piece of the at least one piece of candidate feedback information that needs to be sent, the terminal device determines, as the to-be-sent feedback information, all of the at least one piece of candidate feedback information that needs to be sent.

For example, the terminal device may determine, based on the first reference value of the quality of service level of the data information corresponding to the at least one piece of candidate feedback information that needs to be sent, to send some or all of candidate feedback information that needs to be sent. To be specific, the terminal device determines that the some or all of the at least one piece of candidate feedback information that needs to be sent is of a high priority, and determines to send the some or all of the candidate feedback information that needs to be sent and that has the high priority.

A value of a reference value may represent a priority of feedback information. For example, a greater reference value indicates a higher priority of feedback information, and a smaller reference value indicates a lower priority of feedback information. Specifically, a reference value may be the same as or similar to a priority value of feedback information.

Embodiment 1(2): If the at least one piece of candidate feedback information includes the at least one piece of candidate feedback information that needs to be received: when the second reference value of the quality of service level of the data information corresponding to the at least one piece of candidate feedback information that needs to be received is greater than or equal to a first priority threshold, the terminal device determines the at least one piece of to-be-received feedback information, where the at least one piece of to-be-received feedback information belongs to the at least one piece of candidate feedback information that needs to be received.

To be specific, the terminal device determines the at least one piece of to-be-received feedback information in the at least one piece of candidate feedback information that needs to be received. To be specific, the terminal device determines to receive some or all of candidate feedback information that needs to be received. In other words, the terminal device determines, as to-be-received feedback information, the some or all of the candidate feedback information that needs to be received.

It may be understood that, if there is one piece of the at least one piece of candidate feedback information that needs to be received, the terminal device determines, as the to-be-received feedback information, all of the at least one piece of candidate feedback information that needs to be received.

For example, the terminal device may determine, based on a value of the second reference value of the quality of service level of the data information corresponding to the at least one piece of candidate feedback information that needs to be received, to receive some or all of candidate feedback information that needs to be received. To be specific, the terminal device determines that the some or all of the at least one piece of candidate feedback information that needs to be received is of a high priority, and determines to receive the some or all of the candidate feedback information that needs to be received and that has the high priority.

Embodiment 1(3): If the at least one piece of candidate feedback information includes the at least one piece of candidate feedback information that needs to be sent and the at least one piece of candidate feedback information that needs to be received: when the first reference value of the quality of service level of the data information corresponding to the at least one piece of candidate feedback information that needs to be sent is greater than or equal to a first priority threshold, the terminal device determines the at least one piece of to-be-sent feedback information, where the at least one piece of to-be-sent feedback information belongs to the at least one piece of candidate feedback information that needs to be sent; and/or when the second reference value of the quality of service level of the data information corresponding to the at least one piece of candidate feedback information that needs to be received is greater than or equal to a first priority threshold, the terminal device determines the at least one piece of to-be-received feedback information, where the at least one piece of to-be-received feedback information belongs to the at least one piece of candidate feedback information that needs to be received.

When both the first reference value and the second reference value are greater than or equal to the first priority threshold, if a terminal device does not have a full-duplex capability, the terminal device selects, as to-be-sent feedback information or to-be-received feedback information, one of the first reference value and the second reference value that has a higher reference value. To be specific, if the first reference value is greater than or equal to the second reference value, the terminal device determines the at least one piece of to-be-sent feedback information. Otherwise, if the first reference value is less than or equal to the second reference value, the terminal device determines the at least one piece of to-be-received feedback information. In an embodiment, it may also be understood as that a greater reference value indicates a higher priority corresponding to the reference value, and a smaller reference value indicates a lower priority corresponding to the reference value.

In this embodiment, for a process in which the terminal device determines the at least one piece of to-be-sent feedback information and the at least one piece of to-be-received feedback information, refer to Embodiment 1(1) and Embodiment 1(2). Details are not described herein again.

Embodiment 1(4): If the at least one piece of candidate feedback information includes the at least one piece of candidate feedback information that needs to be sent and the at least one piece of candidate feedback information that needs to be received: when the first reference value of the quality of service level of the data information corresponding to the at least one piece of candidate feedback information that needs to be sent is greater than the second reference value of the quality of service level of the data information corresponding to the at least one piece of candidate feedback information that needs to be received, the terminal device determines the at least one piece of to-be-sent feedback information, where the at least one piece of to-be-sent feedback information belongs to the at least one piece of candidate feedback information that needs to be sent; or when the first reference value of the quality of service level of the data information corresponding to the at least one piece of candidate feedback information that needs to be sent is less than or equal to the second reference value of the quality of service level of the data information corresponding to the at least one piece of candidate feedback information that needs to be received, the terminal device determines the at least one piece of to-be-received feedback information, where the at least one piece of to-be-received feedback information belongs to the at least one piece of candidate feedback information that needs to be received.

In this embodiment, for a process in which the terminal device determines the at least one piece of to-be-sent feedback information and the at least one piece of to-be-received feedback information, refer to Embodiment 1(1) and Embodiment 1(2). Details are not described herein again.

Optionally, the terminal device may determine the first priority threshold in the following manners:

1. The terminal device determines the first priority threshold that is predefined.

2. The terminal device determines, as the first priority threshold, an average value of quality of service levels of data information corresponding to all feedback information in the at least one piece of candidate feedback information.

3. The terminal device determines, as the first priority threshold, the average value of the quality of service levels of the data information corresponding to all the feedback information in the at least one piece of candidate feedback information that needs to be sent.

4. The terminal device determines, as the first priority threshold, an average value of quality of service levels of data information corresponding to a third feedback information set in the at least one piece of candidate feedback information that needs to be sent.

Optionally, the third feedback information set includes the first Q pieces of feedback information, in descending order of quality of service levels of corresponding data information, in the at least one piece of candidate feedback information that needs to be sent. Q is a positive integer greater than or equal to 1.

Specifically, Q is greater than or equal to 1, and Q is not greater than the quantity of the at least one piece of candidate feedback information that needs to be sent. For example, if the quantity of the at least one piece of candidate feedback information that needs to be sent is A, Q is a positive integer greater than or equal to 1 and not greater than A.

5. The terminal device determines, as the first priority threshold, the average value of the quality of service levels of the data information corresponding to all the feedback information in the at least one piece of candidate feedback information that needs to be received.

6. The terminal device determines, as the first priority threshold, an average value of quality of service levels of data information corresponding to a fourth feedback information set in the at least one piece of candidate feedback information that needs to be received.

Optionally, the fourth feedback information set includes the first P pieces of feedback information, in descending order of quality of service levels of corresponding data information, in the at least one piece of candidate feedback information that needs to be received. P is a positive integer greater than or equal to 1.

Specifically, P is greater than or equal to 1, and P is not greater than the quantity of the at least one piece of candidate feedback information that needs to be received. For example, if the quantity of the at least one piece of candidate feedback information that needs to be received is B, P is a positive integer greater than or equal to 1 and not greater than B.

7. The first priority threshold is configured by a network device by using signaling, where the signaling is RRC signaling, MAC signaling, or physical layer signaling.

8. The first priority threshold is preset for either the network device or the terminal device. The presetting is writing in advance or setting performed through network operation, administration and maintenance (OAM).

The following describes Embodiment 1 by using specific embodiments:

1. If there are a plurality of pieces of feedback information that need to be received and one piece of feedback information that needs to be sent, and a priority corresponding to an average quality of service level of data packets corresponding to the plurality of pieces of feedback information that need to be received is higher than or equal to a priority corresponding to an average quality of service level of a data packet corresponding to the piece of feedback information that needs to be sent, the terminal device does not send the piece of feedback information that needs to be sent, but receives the plurality of pieces of feedback information that need to be received as to-be-received feedback information. In this embodiment, a priority corresponding to an average quality of service level of data packets is an average value of quality of service levels of the data packets.

For example, specifically, if there are three pieces of feedback information that need to be received and one piece of feedback information that needs to be sent, and a priority corresponding to an average quality of service level of data packets corresponding to the three pieces of feedback information that need to be received is higher than or equal to a priority corresponding to an average quality of service level of a data packet corresponding to the piece of feedback information that needs to be sent, the terminal device does not send the piece of feedback information that needs to be sent, but receives the three pieces of feedback information that need to be received as to-be-received feedback information.

Alternatively, if there are a plurality of pieces of feedback information that need to be received and one piece of feedback information that needs to be sent, and a priority corresponding to an average quality of service level of data packets corresponding to the plurality of pieces of feedback information that need to be received is lower than a priority corresponding to an average quality of service level of a data packet corresponding to the piece of feedback information that needs to be sent, the terminal device does not receive the plurality of pieces of feedback information that need to be received, but sends the piece of feedback information that needs to be sent as to-be-sent feedback information.

For example, specifically, if there are three pieces of feedback information that need to be received and one piece of feedback information that needs to be sent, and a priority corresponding to an average quality of service level of data packets corresponding to the three pieces of feedback information that need to be received is lower than a priority corresponding to an average quality of service level of a data packet corresponding to the piece of feedback information that needs to be sent, the terminal device does not receive the three pieces of feedback information that need to be received, but sends the piece of feedback information that needs to be sent as to-be-sent feedback information.

In this embodiment, it can be ensured that corresponding feedback information is received and/or sent on a link with a higher priority corresponding to a quality of service level.

2. If there are a plurality of pieces of feedback information that need to be received and one piece of feedback information that needs to be sent, and a priority corresponding to an average quality of service level of data packets corresponding to some of the plurality of pieces of feedback information that need to be received is higher than or equal to a priority corresponding to an average quality of service level of a data packet corresponding to the piece of feedback information that needs to be sent, the terminal device does not send the piece of feedback information that needs to be sent, but receives the some of the plurality of pieces of feedback information that need to be received as to-be-received feedback information.

For example, specifically, if there are five pieces of feedback information that need to be received and one piece of feedback information that needs to be sent, and a priority corresponding to an average quality of service level of data packets corresponding to two of the five pieces of feedback information that need to be received is higher than or equal to a priority corresponding to an average quality of service level of a data packet corresponding to the piece of feedback information that needs to be sent, the terminal device does not send the piece of feedback information that needs to be sent, but receives the two pieces of feedback information that need to be received as to-be-received feedback information.

Alternatively, if there are a plurality of pieces of feedback information that need to be sent and at least one piece of feedback information that needs to be received, and a priority corresponding to an average quality of service level of data packets corresponding to some of the plurality of pieces of feedback information that need to be sent is higher than or equal to a priority corresponding to an average quality of service level of a data packet corresponding to the at least one piece of candidate feedback information that needs to be received, the terminal device does not receive the at least one piece of candidate feedback information that needs to be received, but sends the plurality of pieces of feedback information that need to be sent as to-be-sent feedback information. When the plurality of pieces of feedback information that need to be sent are simultaneously sent, a transmission capability of the terminal device is not exceeded.

For example, specifically, if there are five pieces of feedback information that need to be sent and four pieces of feedback information that need to be received, and a priority corresponding to an average quality of service level of data packets corresponding to three pieces of feedback information that need to be sent is higher than or equal to that of at least one (where the at least one is an integer less than or equal to 4) piece of feedback information that needs to be received, the terminal device does not receive the four pieces of feedback information that need to be received, but sends the five pieces of feedback information that need to be sent. The transmission capability of the UE is greater than or equal to 5.

For example, specifically, if there are five pieces of feedback information that need to be sent and four pieces of feedback information that need to be received, and a priority corresponding to an average quality of service level of data packets corresponding to three pieces of feedback information that need to be sent is higher than or equal to that of at least one (where the at least one is an integer less than or equal to 4) piece of feedback information that needs to be received, the terminal device does not receive the four pieces of feedback information that need to be received, but sends the three pieces of feedback information that need to be sent. The transmission capability of the UE is greater than or equal to 3.

In this embodiment, it can be ensured that some feedback information with a higher priority is received and/or sent.

Embodiment 2: The terminal device determines the at least one piece of to-be-sent feedback information or the at least one piece of to-be-received feedback information based on the first quantity of the at least one piece of candidate feedback information that needs to be sent and/or the second quantity of the at least one piece of candidate feedback information that needs to be received.

For example, the terminal device obtains a quantity of pieces of candidate feedback information in the at least one piece of candidate feedback information that needs to be sent, and determines the quantity as the first quantity; the terminal device obtains a quantity of pieces of candidate feedback information in the at least one piece of candidate feedback information that needs to be received, and determines the quantity as the second quantity.

Specifically, the terminal device determines the first quantity of the at least one piece of candidate feedback information that needs to be sent; and/or the terminal device determines the second quantity of the at least one piece of candidate feedback information that needs to be received.

Embodiment 2(1): If the at least one piece of candidate feedback information includes the at least one piece of candidate feedback information that needs to be sent: when the first quantity of the at least one piece of candidate feedback information that needs to be sent is greater than or equal to a first threshold, the terminal device determines the at least one piece of to-be-sent feedback information, where the at least one piece of to-be-sent feedback information belongs to the at least one piece of candidate feedback information that needs to be sent.

To be specific, the terminal device determines the at least one piece of to-be-sent feedback information in the at least one piece of candidate feedback information that needs to be sent. To be specific, the terminal device determines to send some or all of candidate feedback information that needs to be sent. In other words, the terminal device determines, as to-be-sent feedback information, the some or all of the candidate feedback information that needs to be sent.

It may be understood that, if there is one piece of the at least one piece of candidate feedback information that needs to be sent, the terminal device determines, as the to-be-sent feedback information, all of the at least one piece of candidate feedback information that needs to be sent.

The terminal device may determine the to-be-sent feedback information in the following manners:

1. The terminal device may randomly select a first preset quantity of pieces of to-be-sent feedback information from the at least one piece of candidate feedback information that needs to be sent, where the first preset quantity of pieces of to-be-sent feedback information is the some or all of the candidate feedback information that needs to be sent.

2. The terminal device may determine, based on the value of the first reference value of the quality of service levels of the data information corresponding to the at least one piece of candidate feedback information that needs to be sent, the some or all of the candidate feedback information that needs to be sent.

3. The terminal device may determine, based on the type of the data corresponding to the at least one piece of candidate feedback information that needs to be sent, the some or all of the candidate feedback information that needs to be sent. A specific determining process is described in detail in subsequent embodiments.

4. The terminal device may determine, based on the feedback period of the at least one piece of candidate feedback information that needs to be sent, the some or all of the candidate feedback information that needs to be sent. A specific determining process is described in detail in subsequent embodiments.

5. The terminal device may determine, based on the feedback type of the at least one piece of candidate feedback information that needs to be sent, the some or all of the candidate feedback information that needs to be sent. A specific determining process is described in detail in subsequent embodiments.

Embodiment 2(2): If the at least one piece of candidate feedback information includes the at least one piece of candidate feedback information that needs to be received: when the second quantity of the at least one piece of candidate feedback information that needs to be received is greater than or equal to a first threshold, the terminal device determines the at least one piece of to-be-received feedback information, where the at least one piece of to-be-received feedback information belongs to the at least one piece of candidate feedback information that needs to be received.

To be specific, the terminal device determines the at least one piece of to-be-received feedback information in the at least one piece of candidate feedback information that needs to be received. To be specific, the terminal device determines to receive some or all of candidate feedback information that needs to be received. In other words, the terminal device determines, as to-be-received feedback information, the some or all of the candidate feedback information that needs to be received.

It may be understood that, if there is one piece of the at least one piece of candidate feedback information that needs to be received, the terminal device determines, as the to-be-received feedback information, all of the at least one piece of candidate feedback information that needs to be received.

In a possible implementation, the terminal device may randomly select a second preset quantity of pieces of to-be-received feedback information from the at least one piece of candidate feedback information that needs to be received, where the second preset quantity of pieces of to-be-received feedback information is the some or all of the candidate feedback information that needs to be received.

In another possible implementation, the terminal device may determine, based on the priority corresponding to the first reference value of the quality of service levels of the data packets corresponding to the at least one piece of candidate feedback information that needs to be received, the some or all of the candidate feedback information that needs to be received.

All the first priority threshold, the first threshold, the first ratio threshold, the second ratio threshold, the first threshold, the second threshold, the third threshold, the preset first offset value, the first preset quantity, the second preset quantity, the third preset quantity, the fourth preset quantity, the fifth preset quantity, the sixth preset quantity, the seventh preset quantity, the eighth preset quantity, the ninth preset quantity, the tenth preset quantity, the eleventh preset quantity, the twelfth preset quantity, the thirteenth preset quantity, the fourteenth preset quantity, the fifteenth preset quantity, the sixteenth preset quantity, the seventeenth preset quantity, the eighteenth preset quantity, the nineteenth preset quantity, the twentieth preset quantity, the twenty-first preset quantity, the twenty-second preset quantity, and the like in this application may be preset, or may be configured by the network device by using signaling.

The terminal device may determine the to-be-received feedback information in the following manners:

1. The terminal device may randomly select a second preset quantity of pieces of to-be-received feedback information from the at least one piece of candidate feedback information that needs to be received, where the second preset quantity of pieces of to-be-received feedback information is the some or all of the candidate feedback information that needs to be received.

2. The terminal device may determine, based on the value of the second reference value of the quality of service levels of the data information corresponding to the at least one piece of candidate feedback information that needs to be received, the some or all of the candidate feedback information that needs to be received.

3. The terminal device may determine, based on the type of the data corresponding to the at least one piece of candidate feedback information that needs to be received, the some or all of the candidate feedback information that needs to be received. A specific determining process is described in detail in subsequent embodiments.

4. The terminal device may determine, based on the feedback period of the at least one piece of candidate feedback information that needs to be received, the some or all of the candidate feedback information that needs to be received. A specific determining process is described in detail in subsequent embodiments.

5. The terminal device may determine, based on the feedback type of the at least one piece of candidate feedback information that needs to be received, the some or all of the candidate feedback information that needs to be received. A specific determining process is described in detail in subsequent embodiments.

Embodiment 2(3): If the at least one piece of candidate feedback information includes the at least one piece of candidate feedback information that needs to be sent and the at least one piece of candidate feedback information that needs to be received: when the second quantity of the at least one piece of candidate feedback information that needs to be received is greater than or equal to a first threshold, the terminal device determines the at least one piece of to-be-received feedback information, where the at least one piece of to-be-received feedback information belongs to the at least one piece of candidate feedback information that needs to be received; and/or when the first quantity of the at least one piece of candidate feedback information that needs to be sent is greater than a first threshold, the terminal device determines the at least one piece of to-be-sent feedback information, where the at least one piece of to-be-sent feedback information belongs to the at least one piece of candidate feedback information that needs to be sent.

In this embodiment, for a process in which the terminal device determines the at least one piece of to-be-sent feedback information and the at least one piece of to-be-received feedback information, refer to Embodiment 2(1) and Embodiment 2(2). Details are not described herein again.

Embodiment 2(4): If the at least one piece of candidate feedback information includes the at least one piece of candidate feedback information that needs to be sent and the at least one piece of candidate feedback information that needs to be received: when a ratio of the second quantity of the at least one piece of candidate feedback information that needs to be received to the first quantity of the at least one piece of candidate feedback information that needs to be sent is greater than or equal to a first ratio threshold, the terminal device determines the at least one piece of to-be-received feedback information, where the at least one piece of to-be-received feedback information belongs to the at least one piece of candidate feedback information that needs to be received; or when a ratio of the second quantity of the at least one piece of candidate feedback information that needs to be received to the first quantity of the at least one piece of candidate feedback information that needs to be sent is less than a first ratio threshold, the terminal device determines the at least one piece of to-be-sent feedback information, where the at least one piece of to-be-sent feedback information belongs to the at least one piece of candidate feedback information that needs to be sent.

In this embodiment, for a process in which the terminal device determines the at least one piece of to-be-sent feedback information and the at least one piece of to-be-received feedback information, refer to Embodiment 2(1) and Embodiment 2(2). Details are not described herein again.

Embodiment 2(5): If the at least one piece of candidate feedback information includes the at least one piece of candidate feedback information that needs to be sent and the at least one piece of candidate feedback information that needs to be received: when a ratio of the first quantity of the at least one piece of candidate feedback information that needs to be received to the second quantity of the at least one piece of candidate feedback information that needs to be received is greater than or equal to a second ratio threshold, the terminal device determines the at least one piece of to-be-sent feedback information, where the at least one piece of to-be-sent feedback information belongs to the at least one piece of candidate feedback information that needs to be sent; or when a ratio of the first quantity of the at least one piece of candidate feedback information that needs to be sent to the second quantity of the at least one piece of candidate feedback information that needs to be received is less than a second ratio threshold, the terminal device determines the at least one piece of to-be-received feedback information, where the at least one piece of to-be-received feedback information belongs to the at least one piece of candidate feedback information that needs to be received.

In this embodiment, for a process in which the terminal device determines the at least one piece of to-be-sent feedback information and the at least one piece of to-be-received feedback information, refer to Embodiment 2(1) and Embodiment 2(2). Details are not described herein again.

Optionally, the terminal device may determine the first threshold in the following manners:

1. The terminal device determines the first threshold that is predefined.
2. The terminal device determines the first threshold based on a data sending capability of the terminal device.
3. The terminal device determines the first threshold based on a data receiving capability of the terminal device.

Optionally, the terminal device may determine the first ratio threshold in the following manners:

1. The terminal device determines the first ratio threshold that is predefined.
2. The terminal device determines the first ratio threshold based on a ratio of a data receiving capability of the terminal device to a data sending capability of the terminal device.

Optionally, the terminal device may determine the second ratio threshold in the following manners:

1. The terminal device determines the second ratio threshold that is predefined.
2. The terminal device determines the second ratio threshold based on a ratio of a data sending capability of the terminal device to a data receiving capability of the terminal device.

The following describes Embodiment 2 by using specific embodiments:

1. If a ratio of a second quantity of feedback information that needs to be received to a first quantity of feedback information that needs to be sent exceeds a first threshold (that is, the first ratio threshold), the terminal device does not send the feedback information that needs to be sent, but receives the feedback information that needs to be received, where the first threshold is greater than 1.

2. If a second quantity of feedback information that needs to be received is greater than or equal to a second threshold, and a quantity of feedback information that needs to be sent is 1 or is less than a third threshold, the terminal device does not send the feedback information that needs to be sent, but receives the feedback information that needs to be received.

The second threshold is greater than the third threshold. For example, the second threshold is 3, and the third threshold is 2.

Optionally, a quality of service level is not considered in Embodiment 2. Even if a priority corresponding to the feedback information that needs to be sent is higher than or equal to a priority corresponding to the feedback information that needs to be received, the terminal device still does not send the feedback information that needs to be sent.

Optionally, a quality of service level is considered in Embodiment 2. If a priority corresponding to the feedback information that needs to be sent is higher than or equal to a priority corresponding to the feedback information that needs to be received, the terminal device may send the feedback information that needs to be sent, or may not send the feedback information that needs to be sent.

In this embodiment, it can be ensured that a terminal device with a half-duplex capability receives and sends a maximum quantity of feedback information on a link.

Embodiment 3: The terminal device determines the at least one piece of to-be-sent feedback information or the at least one piece of to-be-received feedback information based on the type of the data corresponding to the at least one piece of candidate feedback information.

For example, a type of data corresponding to candidate feedback information may be preset in the terminal device.

Specifically, the type of the data corresponding to the candidate feedback information determined by the terminal device includes the following types:

1. Type of data corresponding to first-type candidate feedback information and type of data corresponding to second-type candidate feedback information. The type of the data corresponding to the first-type candidate feedback information is unicast, and the type of the data corresponding to the second-type candidate feedback information is groupcast/multicast.

Optionally, a priority of the type of the data corresponding to the first-type candidate feedback information is higher than a priority of the type of the data corresponding to the second-type candidate feedback information. There are a plurality of links for groupcast/multicast, and even if one terminal device in a groupcast/multicast group fails to perform feedback, another terminal device in the groupcast/multicast group can successfully perform feedback. However, there is only one link for unicast, communication can be performed only after CSI feedback is performed, and more overheads (used to indicate communication efficiency, where a higher overhead value indicates lower communication efficiency) need to be paid. Therefore, the priority of the unicast is higher than the priority of the groupcast/multicast, so that it can be ensured that a unicast link consuming more overheads is preferentially received and/or sent.

Optionally, a priority of the type of the data corresponding to the first-type candidate feedback information is higher than or higher than a priority of the type of the data corresponding to the second-type candidate feedback information by a first offset value. The first offset value may be a preset first offset value. The first offset value is not limited in this embodiment of this application, and may be, for example, greater than or equal to 0. Specifically, a priority of unicast may be a priority corresponding to a unicast link, or may be an average priority corresponding to a plurality of unicast links. A priority of groupcast/multicast may be a priority corresponding to a groupcast/multicast link, or may be an average priority corresponding to a plurality of groupcast/multicast links.

Optionally, if the type of the data corresponding to the candidate feedback information determined by the terminal device further includes broadcast, the priority of the unicast may be set to be higher than a priority of the broadcast, the priority of the groupcast/multicast may be set to be higher than or equal to the priority of the broadcast, and so on.

2. Type of data corresponding to third-type candidate feedback information and type of data corresponding to fourth-type candidate feedback information. The type of the data corresponding to the third-type candidate feedback information is a reservation type, and the type of the data corresponding to the fourth-type candidate feedback information is a scheduling type.

Optionally, a priority of the type of the data corresponding to the third-type candidate feedback information is higher than a priority of the type of the data corresponding to the fourth-type candidate feedback information. The priority of the reservation type is higher than the priority of the scheduling type, so that it can be ensured that a preview-type link that can bring more resource benefits is preferentially received and/or sent.

3. Type of data corresponding to fifth-type candidate feedback information and type of data corresponding to sixth-type candidate feedback information. The type of the data corresponding to the fifth-type candidate feedback information is feeding back only negative acknowledgement information on a feedback resource, and the type of the data corresponding to the sixth-type candidate feedback information is feeding back acknowledgement information or the negative acknowledgement information on the feedback information corresponding to the terminal device.

For example, the fifth candidate feedback information may be referred to as an option 1, and is the same as the first feedback type in the foregoing description. The sixth candidate feedback information may be referred to as an option 2, and is the same as the second feedback type in the foregoing description.

Optionally, a priority of the type of the data corresponding to the fifth-type candidate feedback information is higher than a priority of the type of the data corresponding to the sixth-type candidate feedback information, so that it is ensured that feedback information that feeds back only the negative acknowledgement information is preferentially received and/or sent.

Optionally, the type of the data corresponding to the fifth-type candidate feedback information is feeding back only the negative acknowledgement information on a joint feedback resource, and the joint feedback resource is a feedback resource jointly used by all terminal devices.

For example, the acknowledgement information may be ACK information, and the negative acknowledgement information may be NACK information.

Embodiment 3(1): If the type of the data corresponding to the candidate feedback information determined by the terminal device includes the type of the data corresponding to the first-type candidate feedback information and the type of the data corresponding to the second-type candidate feedback information, and the at least one piece of candidate feedback information includes the at least one piece of candidate feedback information that needs to be sent: when the at least one piece of candidate feedback information that needs to be sent includes the first-type candidate feedback information and the second-type candidate feedback information, the terminal device determines the at least one piece of to-be-sent feedback information, where the at least one piece of to-be-sent feedback information belongs to the first-type candidate feedback information. There is at least one piece of the first-type candidate feedback information.

To be specific, the terminal device determines the at least one piece of to-be-sent feedback information in the first-type candidate feedback information. To be specific, the terminal device determines to send some or all of the first-type candidate feedback information. In other words, the terminal device determines the some or all of the first-type candidate feedback information as to-be-sent feedback information.

It may be understood that, if there is one piece of the first-type candidate feedback information, the terminal device determines all the first-type candidate feedback information as the to-be-sent feedback information.

The terminal device may determine the to-be-sent feedback information in the following manners:

1. The terminal device may randomly select a third preset quantity of pieces of to-be-sent feedback information from the first-type candidate feedback information, where the third preset quantity of pieces of to-be-sent feedback information is the some or all of the first-type candidate feedback information.

2. The terminal device may determine, based on the value of the first reference value of the quality of service levels of the data information corresponding to the first-type candidate feedback information, that the some or all of the first-type candidate feedback information is the to-be-sent feedback information.

3. The terminal device may determine, based on the feedback period of the first-type candidate feedback information, the some or all of the first-type candidate feedback information as the to-be-sent feedback information. A specific determining process is described in detail in subsequent embodiments.

4. The terminal device may determine, based on the feedback type of the first-type candidate feedback information, the some or all of the first-type candidate feedback information as the to-be-sent feedback information. A specific determining process is described in detail in subsequent embodiments.

5. The terminal device may select, from the first-type candidate feedback information, a fourth preset quantity of pieces of to-be-sent feedback information with maximum reference values (or highest priorities) in quality of service levels of data information corresponding to the first-type candidate feedback information, where the fourth preset quantity of pieces of to-be-sent feedback information is the some or all of the first-type candidate feedback information.

Embodiment 3(2): If the type of the data corresponding to the candidate feedback information determined by the terminal device includes the type of the data corresponding to the first-type candidate feedback information and the type of the data corresponding to the second-type candidate feedback information, and the at least one piece of candidate feedback information includes at least one piece of candidate feedback information that needs to be received: when the at least one piece of candidate feedback information that needs to be received includes the first-type candidate feedback information and the second-type candidate feedback information, the terminal device determines the at least one piece of to-be-received feedback information, where the at least one piece of to-be-received feedback information belongs to the first-type candidate feedback information. There is at least one piece of the first-type candidate feedback information.

To be specific, the terminal device determines the at least one piece of to-be-received feedback information in the first-type candidate feedback information. To be specific, the terminal device determines to receive some or all of the first-type candidate feedback information. In other words, the terminal device determines the some or all of the first-type candidate feedback information as to-be-received feedback information.

It may be understood that, if there is one piece of the first-type candidate feedback information, the terminal device determines all the first-type candidate feedback information as the to-be-received feedback information.

The terminal device may determine the to-be-received feedback information in the following manners:

1. The terminal device may randomly select a fifth preset quantity of pieces of to-be-received feedback information from the first-type candidate feedback information, where the fifth preset quantity of pieces of to-be-received feedback information is the some or all of the first-type candidate feedback information.

2. The terminal device may determine, based on the value of the second reference value of the quality of service levels of the data information corresponding to the first-type candidate feedback information, that the some or all of the first-type candidate feedback information is the to-be-sent feedback information.

3. The terminal device may determine, based on the feedback period of the first-type candidate feedback information, the some or all of the first-type candidate feedback information as the to-be-sent feedback information. A specific determining process is described in detail in subsequent embodiments.

4. The terminal device may determine, based on the feedback type of the first-type candidate feedback information, the some or all of the first-type candidate feedback information as the to-be-sent feedback information. A specific determining process is described in detail in subsequent embodiments.

5. The terminal device may select, from the first-type candidate feedback information, a sixth preset quantity of pieces of to-be-received feedback information with maximum reference values (or highest priorities) in quality of service levels of data information corresponding to the first-type candidate feedback information, where the sixth preset quantity of pieces of to-be-received feedback information is the some or all of the first-type candidate feedback information.

Embodiment 3(3): If the type of the data corresponding to the candidate feedback information determined by the terminal device includes the type of the data corresponding to the first-type candidate feedback information and the type of the data corresponding to the second-type candidate feedback information, and the at least one piece of candidate feedback information includes the at least one piece of candidate feedback information that needs to be sent and the at least one piece of candidate feedback information that needs to be received:

In a possible implementation, when the at least one piece of candidate feedback information that needs to be sent is the first-type candidate feedback information, and the at least one piece of candidate feedback information that needs to be received is the second-type candidate feedback information, the terminal device determines the at least one piece of to-be-sent feedback information, where the at least one piece of to-be-sent feedback information belongs to the fifth-type candidate feedback information.

In this implementation, the at least one piece of to-be-sent feedback information belongs to the first-type candidate feedback information. In other words, the at least one piece of to-be-sent feedback information belongs to the at least one piece of candidate feedback information that needs to be sent.

For a process in which the terminal device determines the at least one piece of to-be-sent feedback information, refer to Embodiment 3(1). Details are not described herein again.

In another possible implementation, when the at least one piece of candidate feedback information that needs to be sent is the second-type candidate feedback information, and the at least one piece of candidate feedback information that needs to be received is the first-type candidate feedback information, the terminal device determines the at least one piece of to-be-received feedback information, where the at least one piece of to-be-received feedback information belongs to the first-type candidate feedback information.

In this implementation, the at least one piece of to-be-received feedback information belongs to the first-type candidate feedback information. In other words, the at least one piece of to-be-received feedback information belongs to the at least one piece of candidate feedback information that needs to be received.

For a process in which the terminal device determines the at least one piece of to-be-received feedback information, refer to Embodiment 3(2). Details are not described herein again.

Embodiment 3(4): If the type of the data corresponding to the candidate feedback information determined by the terminal device includes the type of the data corresponding to the first-type candidate feedback information and the type of the data corresponding to the second-type candidate feedback information, and the at least one piece of candidate feedback information includes the at least one piece of candidate feedback information that needs to be sent and the at least one piece of candidate feedback information that needs to be received: when the at least one piece of candidate feedback information that needs to be sent includes the first-type candidate feedback information and the second-type candidate feedback information, and the at least one piece of candidate feedback information that needs to be received includes the first-type candidate feedback information and the second-type candidate feedback information, the terminal device determines the at least one piece of to-be-sent feedback information and/or the at least one piece of to-be-received feedback information, where the at least one piece of to-be-sent feedback information and/or the at least one piece of to-be-received feedback information belongs to the first-type candidate feedback information.

In this embodiment, for a process in which the terminal device determines the at least one piece of to-be-sent feedback information and the at least one piece of to-be-received feedback information, refer to Embodiment 3(1) and Embodiment 3(2). Details are not described herein again.

Embodiment 3(5): If the type of the data corresponding to the candidate feedback information determined by the terminal device includes the type of the data corresponding to the third-type candidate feedback information and the type of the data corresponding to the fourth-type candidate feedback information, and the at least one piece of candidate feedback information includes the at least one piece of candidate feedback information that needs to be sent: when the at least one piece of candidate feedback information that needs to be sent includes the third-type candidate feedback information and the fourth-type candidate feedback information, the terminal device determines the at least one piece of to-be-sent feedback information, where the at least one piece of to-be-sent feedback information belongs to the third-type candidate feedback information. There is at least one piece of the third-type candidate feedback information.

To be specific, the terminal device determines the at least one piece of to-be-sent feedback information in the third-type candidate feedback information. To be specific, the terminal device determines to send some or all of the third-type candidate feedback information. In other words, the terminal device determines the some or all of the third-type candidate feedback information as to-be-sent feedback information.

It may be understood that, if there is one piece of the third-type candidate feedback information, the terminal device determines all the third-type candidate feedback information as the to-be-sent feedback information.

The terminal device may determine the to-be-sent feedback information in the following manners:

1. The terminal device may randomly select a seventh preset quantity of pieces of to-be-sent feedback information from the third-type candidate feedback information, where the seventh preset quantity of pieces of to-be-sent feedback information is the some or all of the third-type candidate feedback information.

2. The terminal device may determine, based on the value of the first reference value of the quality of service levels of the data information corresponding to the third-type candidate feedback information, that the some or all of the third-type candidate feedback information is the to-be-sent feedback information.

3. The terminal device may determine, based on the feedback period of the third-type candidate feedback information, the some or all of the third-type candidate feedback information as the to-be-sent feedback information. A specific determining process is described in detail in subsequent embodiments.

4. The terminal device may determine, based on the feedback type of the third-type candidate feedback information, the some or all of the third-type candidate feedback information as the to-be-sent feedback information. A specific determining process is described in detail in subsequent embodiments.

5. The terminal device may select, from the third-type candidate feedback information, an eighth preset quantity of pieces of to-be-sent feedback information with maximum reference values (or highest priorities) in quality of service levels of data information corresponding to the third-type candidate feedback information, where the eighth preset quantity of pieces of to-be-sent feedback information is the some or all of the third-type candidate feedback information.

Embodiment 3(6): If the type of the data corresponding to the candidate feedback information determined by the terminal device includes the type of the data corresponding to the third-type candidate feedback information and the type of the data corresponding to the fourth-type candidate feedback information, and the at least one piece of candidate feedback information includes the at least one piece of candidate feedback information that needs to be received: when the at least one piece of candidate feedback information that needs to be received includes the third-type candidate feedback information and the fourth-type candidate feedback information, the terminal device determines the at least one piece of to-be-received feedback information, where the at least one piece of to-be-received feedback information belongs to the third-type candidate feedback information. There is at least one piece of the third-type candidate feedback information.

To be specific, the terminal device determines the at least one piece of to-be-received feedback information in the third-type candidate feedback information. To be specific, the terminal device determines to receive some or all of the third-type candidate feedback information. In other words, the terminal device determines the some or all of the third-type candidate feedback information as to-be-received feedback information.

It may be understood that, if there is one piece of the third-type candidate feedback information, the terminal device determines all the third-type candidate feedback information as the to-be-received feedback information.

The terminal device may determine the to-be-received feedback information in the following manners:

1. The terminal device may randomly select a ninth preset quantity of pieces of to-be-received feedback information from the third-type candidate feedback information, where the ninth preset quantity of pieces of to-be-received feedback information is the some or all of the third-type candidate feedback information.

2. The terminal device may determine, based on the value of the second reference value of the quality of service levels of the data information corresponding to the third-type candidate feedback information, that the some or all of the third-type candidate feedback information is the to-be-sent feedback information.

3. The terminal device may determine, based on the feedback period of the third-type candidate feedback information, the some or all of the third-type candidate feedback information as the to-be-sent feedback information. A specific determining process is described in detail in subsequent embodiments.

4. The terminal device may determine, based on the feedback type of the third-type candidate feedback information, the some or all of the third-type candidate feedback information as the to-be-sent feedback information. A specific determining process is described in detail in subsequent embodiments.

5. The terminal device may select, from the third-type candidate feedback information, a tenth preset quantity of pieces of to-be-received feedback information with maximum reference values (or highest priorities) in quality of service levels of data information corresponding to the third-type candidate feedback information, where the tenth preset quantity of pieces of to-be-received feedback information is the some or all of the third-type candidate feedback information.

Embodiment 3(7): If the type of the data corresponding to the candidate feedback information determined by the terminal device includes the type of the data corresponding to the third-type candidate feedback information and the type of the data corresponding to the fourth-type candidate feedback information, and the at least one piece of candidate feedback information includes the at least one piece of candidate feedback information that needs to be sent and the at least one piece of candidate feedback information that needs to be received:

In a possible implementation, when the at least one piece of candidate feedback information that needs to be sent is the third-type candidate feedback information, and the at least one piece of candidate feedback information that needs to be received is the fourth-type candidate feedback information, the terminal device determines the at least one piece of to-be-sent feedback information, where the at least one piece of to-be-sent feedback information belongs to the third-type candidate feedback information.

In this implementation, the at least one piece of to-be-sent feedback information belongs to the third-type candidate feedback information. In other words, the at least one piece of to-be-sent feedback information belongs to the at least one piece of candidate feedback information that needs to be sent.

For a process in which the terminal device determines the at least one piece of to-be-sent feedback information, refer to Embodiment 3(5). Details are not described herein again.

In another possible implementation, when the at least one piece of candidate feedback information that needs to be sent is the fourth-type candidate feedback information, and the at least one piece of candidate feedback information that needs to be received is the third-type candidate feedback information, the terminal device determines the at least one piece of to-be-received feedback information, where the at least one piece of to-be-received feedback information belongs to the third-type candidate feedback information.

In this implementation, the at least one piece of to-be-received feedback information belongs to the third-type candidate feedback information. In other words, the at least one piece of to-be-received feedback information belongs to the at least one piece of candidate feedback information that needs to be received.

For a process in which the terminal device determines the at least one piece of to-be-received feedback information, refer to Embodiment 3(6). Details are not described herein again.

Embodiment 3(8): If the type of the data corresponding to the candidate feedback information determined by the terminal device includes the type of the data corresponding to the third-type candidate feedback information and the type of the data corresponding to the fourth-type candidate feedback information, and the at least one piece of candidate feedback information includes the at least one piece of candidate feedback information that needs to be sent and the at least one piece of candidate feedback information that needs to be received: when the at least one piece of candidate feedback information that needs to be sent includes the third-type candidate feedback information and the fourth-type candidate feedback information, and the at least one piece of candidate feedback information that needs to be received includes the third-type candidate feedback information and the fourth-type candidate feedback information, the terminal device determines the at least one piece of to-be-sent feedback information and/or the at least one piece of to-be-received feedback information, where the at least one piece of to-be-sent feedback information and/or the at least one piece of to-be-received feedback information belongs to the third-type candidate feedback information.

In this embodiment, for a process in which the terminal device determines the at least one piece of to-be-sent feedback information and the at least one piece of to-be-received feedback information, refer to Embodiment 3(5) and Embodiment 3(6). Details are not described herein again.

Embodiment 3(9): If the type of the data corresponding to the candidate feedback information determined by the terminal device includes the type of the data corresponding to the fifth-type candidate feedback information and the type of the data corresponding to the sixth-type candidate feedback information, and the at least one piece of candidate feedback information includes the at least one piece of candidate feedback information that needs to be sent: when the at least one piece of candidate feedback information that needs to be sent includes the fifth-type candidate feedback information and the sixth-type candidate feedback information, the terminal device determines the at least one piece of to-be-sent feedback information, where the at least one piece of to-be-sent feedback information belongs to the fifth-type candidate feedback information. There is at least one piece of the fifth-type candidate feedback information.

To be specific, the terminal device determines the at least one piece of to-be-sent feedback information in the fifth-type candidate feedback information. To be specific, the terminal device determines to send some or all of the fifth-type candidate feedback information. In other words, the terminal device determines the some or all of the fifth-type candidate feedback information as to-be-sent feedback information.

It may be understood that, if there is one piece of the fifth-type candidate feedback information, the terminal device determines all the fifth-type candidate feedback information as the to-be-sent feedback information.

The terminal device may determine the to-be-sent feedback information in the following manners:

1. The terminal device may randomly select an eleventh preset quantity of pieces of to-be-sent feedback information from the fifth-type candidate feedback information, where the eleventh preset quantity of pieces of to-be-sent feedback information is the some or all of the third-type candidate feedback information.

2. The terminal device may determine, based on the value of the first reference value of the quality of service levels of the data information corresponding to the fifth-type candidate feedback information, that the some or all of the fifth-type candidate feedback information is the to-be-sent feedback information.

3. The terminal device may determine, based on the feedback period of the fifth-type candidate feedback information, the some or all of the fifth-type candidate feedback information as the to-be-sent feedback information. A specific determining process is described in detail in subsequent embodiments.

4. The terminal device may determine, based on the feedback type of the fifth-type candidate feedback information, the some or all of the fifth-type candidate feedback information as the to-be-sent feedback information. A specific determining process is described in detail in subsequent embodiments.

5. The terminal device may select, from the fifth-type candidate feedback information, a twelfth preset quantity of pieces of to-be-sent feedback information with maximum reference values (or highest priorities) in quality of service levels of data information corresponding to the fifth-type candidate feedback information, where the twelfth preset quantity of pieces of to-be-sent feedback information is the some or all of the fifth-type candidate feedback information.

Embodiment 3(10): If the type of the data corresponding to the candidate feedback information determined by the terminal device includes the type of the data corresponding to the fifth-type candidate feedback information and the type of the data corresponding to the sixth-type candidate feedback information, and the at least one piece of candidate feedback information includes the at least one piece of candidate feedback information that needs to be received: when the at least one piece of candidate feedback information that needs to be received includes the fifth-type candidate feedback information and the sixth-type candidate feedback information, the terminal device determines the at least one piece of to-be-received feedback information, where the at least one piece of to-be-received feedback information belongs to the fifth-type candidate feedback information. There is at least one piece of the fifth-type candidate feedback information.

To be specific, the terminal device determines the at least one piece of to-be-received feedback information in the fifth-type candidate feedback information. To be specific, the terminal device determines to receive some or all of the fifth-type candidate feedback information. In other words, the terminal device determines the some or all of the fifth-type candidate feedback information as to-be-received feedback information.

It may be understood that, if there is one piece of the fifth-type candidate feedback information, the terminal device determines all the fifth-type candidate feedback information as the to-be-received feedback information.

The terminal device may determine the to-be-received feedback information in the following manners:

1. The terminal device may randomly select a thirteenth preset quantity of pieces of to-be-received feedback information from the fifth-type candidate feedback information, where the thirteenth preset quantity of pieces of to-be-received feedback information is the some or all of the fifth-type candidate feedback information.

2. The terminal device may determine, based on the value of the second reference value of the quality of service levels of the data information corresponding to the fifth-type candidate feedback information, that the some or all of the fifth-type candidate feedback information is the to-be-sent feedback information.

3. The terminal device may determine, based on the feedback period of the fifth-type candidate feedback information, the some or all of the fifth-type candidate feedback information as the to-be-sent feedback information. A specific determining process is described in detail in subsequent embodiments.

4. The terminal device may determine, based on the feedback type of the fifth-type candidate feedback information, the some or all of the fifth-type candidate feedback information as the to-be-sent feedback information. A specific determining process is described in detail in subsequent embodiments.

5. The terminal device may select, from the fifth-type candidate feedback information, a fourteenth preset quantity of pieces of to-be-received feedback information with maximum reference values (or highest priorities) in quality of service levels of data information corresponding to the fifth-type candidate feedback information, where the fourteenth preset quantity of pieces of to-be-received feedback information is the some or all of the fifth-type candidate feedback information.

Embodiment 3(11): If the type of the data corresponding to the candidate feedback information determined by the terminal device includes the type of the data corresponding to the fifth-type candidate feedback information and the type of the data corresponding to the sixth-type candidate feedback information, and the at least one piece of candidate feedback information includes the at least one piece of candidate feedback information that needs to be sent and the at least one piece of candidate feedback information that needs to be received:

In a possible implementation, when the at least one piece of candidate feedback information that needs to be sent is the fifth-type candidate feedback information, and the at least one piece of candidate feedback information that needs to be received is the sixth-type candidate feedback information, the terminal device determines at least one piece of to-be-sent feedback information, where the at least one piece of to-be-sent feedback information belongs to the fifth-type candidate feedback information.

In this implementation, the at least one piece of to-be-sent feedback information belongs to the fifth-type candidate feedback information. In other words, the at least one piece of to-be-sent feedback information belongs to the at least one piece of candidate feedback information that needs to be sent.

For a process in which the terminal device determines the at least one piece of to-be-sent feedback information, refer to Embodiment 3(9). Details are not described herein again.

In another possible implementation, when the at least one piece of candidate feedback information that needs to be sent is the sixth-type candidate feedback information, and the at least one piece of candidate feedback information that needs to be received is the fifth-type candidate feedback information, the terminal device determines the at least one piece of to-be-received feedback information, where the at least one piece of to-be-received feedback information belongs to the fifth-type candidate feedback information.

In this implementation, the at least one piece of to-be-received feedback information belongs to the fifth-type candidate feedback information. In other words, the at least one piece of to-be-received feedback information belongs to the at least one piece of candidate feedback information that needs to be received.

For a process in which the terminal device determines the at least one piece of to-be-received feedback information, refer to Embodiment 3(10). Details are not described herein again.

Embodiment 3(12): If the type of the data corresponding to the candidate feedback information determined by the terminal device includes the type of the data corresponding to the fifth-type candidate feedback information and the type of the data corresponding to the sixth-type candidate feedback information, and the at least one piece of candidate feedback information includes the at least one piece of candidate feedback information that needs to be sent and the at least one piece of candidate feedback information that needs to be received: when the at least one piece of candidate feedback information that needs to be sent includes the fifth-type candidate feedback information and the sixth-type candidate feedback information, and the at least one piece of candidate feedback information that needs to be received includes the fifth-type candidate feedback information and the sixth-type candidate feedback information, the terminal device determines the at least one piece of to-be-sent feedback information and/or the at least one piece of to-be-received feedback information, where the at least one piece of to-be-sent feedback information and/or the at least one piece of to-be-received feedback information belongs to the fifth-type candidate feedback information.

In this embodiment, for a process in which the terminal device determines the at least one piece of to-be-sent feedback information and the at least one piece of to-be-received feedback information, refer to Embodiment 3(9) and Embodiment 3(10). Details are not described herein again.

Embodiment 4: The terminal device determines the at least one piece of to-be-sent feedback information or the at least one piece of to-be-received feedback information based on the feedback period of the at least one piece of candidate feedback information.

For example, a feedback period corresponding to candidate feedback information may be preset in the terminal device.

Optionally, a longer feedback period of the candidate feedback information indicates a higher priority of the candidate feedback information. A shorter feedback period of the candidate feedback information indicates a lower priority of the candidate feedback information. In this case, it can be ensured that feedback information that may obtain a transmission opportunity after a relatively long time is preferentially received and/or sent.

Figure 6:
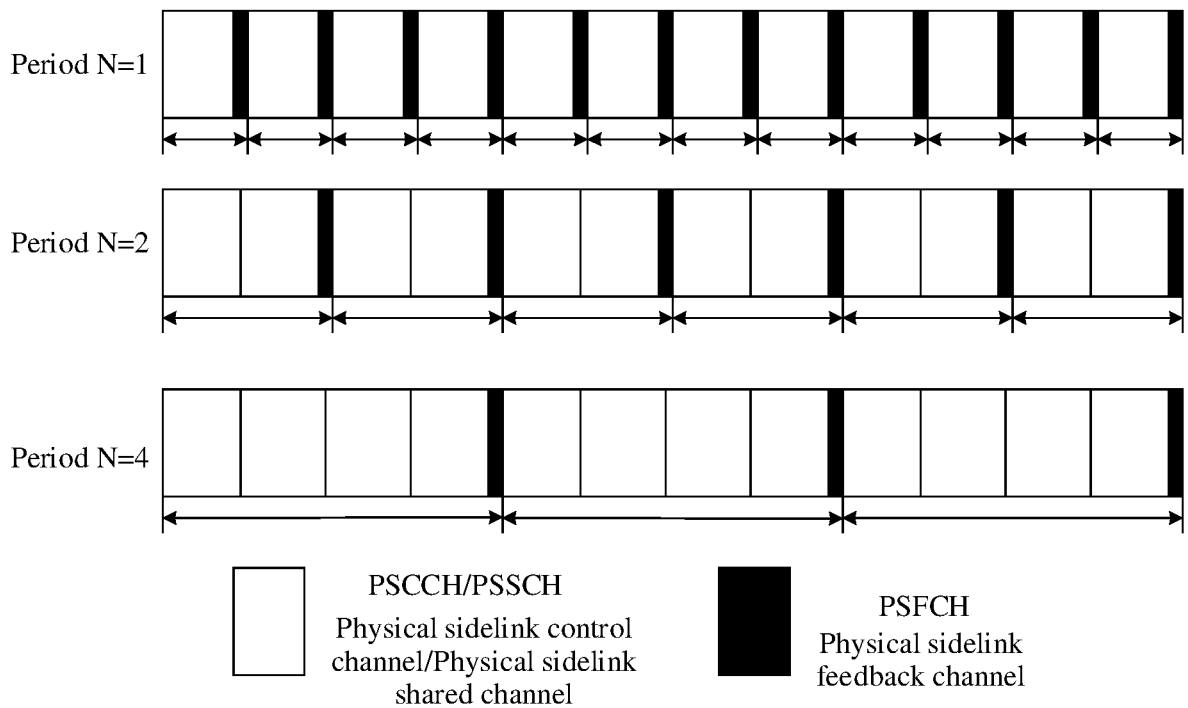
FIG. 6 is a schematic diagram of a feedback period corresponding to feedback information according to an embodiment of this application.

The feedback period corresponding to the candidate feedback information is shown in FIG. 6. FIG. 6 shows cases in which feedback periods N are respectively 1, 2, and 4.

Embodiment 4(1): If the at least one piece of candidate feedback information includes the at least one piece of candidate feedback information that needs to be sent: when the at least one piece of candidate feedback information that needs to be sent includes first candidate feedback information and second candidate feedback information, and a feedback period of the first candidate feedback information is longer than or equal to a feedback period of the second candidate feedback information, the terminal determines the at least one piece of to-be-sent feedback information, where the at least one piece of to-be-sent feedback information belongs to the first candidate feedback information. There is at least one piece of the first candidate feedback information.

To be specific, the terminal device determines the at least one piece of to-be-sent feedback information in the first candidate feedback information. To be specific, the terminal device determines to send some or all of the first candidate feedback information. In other words, the terminal device determines the some or all of the first candidate feedback information as to-be-sent feedback information.

It may be understood that if there is one piece of the first candidate feedback information, the terminal device determines all the first candidate feedback information as the to-be-sent feedback information.

The terminal may determine the to-be-sent feedback information in the following manners:

1. The terminal device may randomly select a fifteenth preset quantity of pieces of to-be-sent feedback information from the first candidate feedback information, where the fifteenth preset quantity of pieces of to-be-sent feedback information is the some or all of the first candidate feedback information.

2. The terminal device may determine, based on the value of the first reference value of the quality of service levels of the data information corresponding to the first candidate feedback information, the some or all of the first candidate feedback information as the to-be-sent feedback information.

3. The terminal device may determine, based on the type of the data corresponding to the first candidate feedback information, that the some or all of the first candidate feedback information is the to-be-sent feedback information.

4. The terminal device may continue to determine, based on the feedback period of candidate feedback information in the first candidate feedback information, that the some or all of the first candidate feedback information is the to-be-sent feedback information.

5. The terminal device may determine, based on the feedback type of the first candidate feedback information, the some or all of the first candidate feedback information as the to-be-sent feedback information. A specific determining process is described in detail in subsequent embodiments.

6. The terminal device may select, from the first candidate feedback information, a sixteenth preset quantity of pieces of to-be-sent feedback information with maximum reference values (or highest priorities) in quality of service levels of data information corresponding to the first candidate feedback information, where the sixteenth preset quantity of pieces of to-be-sent feedback information is the some or all of the first candidate feedback information.

It may be understood that if the feedback period of the first candidate feedback information is shorter than the feedback period of the second candidate feedback information, the terminal device determines the at least one piece of to-be-sent feedback information, where the at least one piece of to-be-sent feedback information belongs to the second candidate feedback information. There is at least one piece of the second candidate feedback information.

Embodiment 4(2): If the at least one piece of candidate feedback information includes the at least one piece of candidate feedback information that needs to be received: when the at least one piece of candidate feedback information that needs to be received includes third candidate feedback information and fourth candidate feedback information, and a feedback period of the third candidate feedback information is longer than or equal to a feedback period of the fourth candidate feedback information, the terminal determines the at least one piece of to-be-received feedback information, where the at least one piece of to-be-received feedback information belongs to the third candidate feedback information. There is at least one piece of the third candidate feedback information.

To be specific, the terminal device determines the at least one piece of to-be-received feedback information in the third candidate feedback information. To be specific, the terminal device determines to send some or all of the third candidate feedback information. In other words, the terminal device determines the some or all of the third candidate feedback information as to-be-received feedback information.

It may be understood that, if there is one piece of the third candidate feedback information, the terminal device determines all the third candidate feedback information as the to-be-received feedback information.

The terminal may determine the to-be-received feedback information in the following manners:

1. The terminal device may randomly select a seventeenth preset quantity of pieces of to-be-sent feedback information from the third candidate feedback information, where the seventeenth preset quantity of pieces of to-be-sent feedback information is the some or all of the third candidate feedback information.

2. The terminal device may determine, based on the value of the second reference value of the quality of service levels of the data information corresponding to the third candidate feedback information, that the some or all of the third candidate feedback information is the to-be-received feedback information.

3. The terminal device may determine, based on the type of the data corresponding to the third candidate feedback information, that the some or all of the third candidate feedback information is the to-be-received feedback information.

4. The terminal device may continue to determine, based on the feedback period of candidate feedback information in the third candidate feedback information, that the some or all of the third candidate feedback information is the to-be-received feedback information.

5. The terminal device may determine, based on the feedback type of the third candidate feedback information, the some or all of the third candidate feedback information as the to-be-received feedback information. A specific determining process is described in detail in subsequent embodiments.

6. The terminal device may select, from the third candidate feedback information, an eighteenth preset quantity of pieces of to-be-sent feedback information with maximum reference values (or highest priorities) in quality of service levels of data information corresponding to the third candidate feedback information, where the eighteenth preset quantity of pieces of to-be-sent feedback information is the some or all of the third candidate feedback information.

It may be understood that if the feedback period of the third candidate feedback information is shorter than the feedback period of the fourth candidate feedback information, the terminal device determines the at least one piece of to-be-received feedback information, where the at least one piece of to-be-received feedback information belongs to the fourth candidate feedback information. There is at least one piece of the fourth candidate feedback information.

Embodiment 4(3): If the at least one piece of candidate feedback information includes the at least one piece of candidate feedback information that needs to be sent and the at least one piece of candidate feedback information that needs to be received:

In a possible implementation, when a first feedback period of the at least one piece of candidate feedback information that needs to be sent is longer than or equal to a second feedback period of the at least one piece of candidate feedback information that needs to be received, the terminal device determines the at least one piece of to-be-sent feedback information, where the at least one piece of to-be-sent feedback information belongs to the at least one piece of candidate feedback information that needs to be sent.

For a process in which the terminal determines the at least one piece of to-be-sent feedback information, refer to Embodiment 4(1). Details are not described herein again.

In another possible implementation, when a first feedback period of the at least one piece of candidate feedback information that needs to be sent is shorter than a second feedback period of the at least one piece of candidate feedback information that needs to be received, the terminal device determines the at least one piece of to-be-received feedback information, where the at least one piece of to-be-received feedback information belongs to the at least one piece of candidate feedback information that needs to be received.

For a process in which the terminal determines the at least one piece of to-be-received feedback information, refer to Embodiment 4(2). Details are not described herein again.

Embodiment 4(4): If the at least one piece of candidate feedback information includes the at least one piece of candidate feedback information that needs to be sent and the at least one piece of candidate feedback information that needs to be received: when the at least one piece of candidate feedback information that needs to be sent includes first candidate feedback information and second candidate feedback information, a feedback period of the first candidate feedback information is longer than or equal to a feedback period of the second candidate feedback information, the at least one piece of candidate feedback information that needs to be received includes third candidate feedback information and fourth candidate feedback information, and a feedback period of the third candidate feedback information is longer than a feedback period of the fourth candidate feedback information, the terminal determines the at least one piece of to-be-sent feedback information and/or the at least one piece of to-be-received feedback information, where the at least one piece of to-be-sent feedback information belongs to the first candidate feedback information, and the at least one piece of to-be-received feedback information belongs to the third candidate feedback information.

In this embodiment, for a process in which the terminal device determines the at least one piece of to-be-sent feedback information and the at least one piece of to-be-received feedback information, refer to Embodiment 4(1) and Embodiment 4(2). Details are not described herein again.

Embodiment 5: The terminal device determines the at least one piece of to-be-sent feedback information and/or the at least one piece of to-be-received feedback information based on the feedback type of the at least one piece of candidate feedback information.

For example, a feedback type of candidate feedback information may be preset in the terminal device.

Specifically, the feedback type of the candidate feedback information includes seventh-type candidate feedback information and eighth-type candidate feedback information, where a feedback type of the seventh-type candidate feedback information is an acknowledgement feedback, and a feedback type of the eighth-type candidate feedback information is a negative acknowledgement feedback.

For example, the acknowledgement feedback may be feeding back ACK information, and the negative acknowledgement feedback may be feeding back NACK information.

Optionally, a priority of the feedback type of the eighth-type candidate feedback information is higher than a priority of the feedback type of the seventh-type candidate feedback information.

For example, Embodiment 5 may be mainly applied to a groupcast/multicast scenario in which feedback information for a plurality of groups is sent.

Embodiment 5(1): If the at least one piece of candidate feedback information includes the at least one piece of candidate feedback information that needs to be sent: when the at least one piece of candidate feedback information that needs to be sent includes the seventh-type candidate feedback information and the eighth-type candidate feedback information, the terminal device determines the at least one piece of to-be-sent feedback information, where the at least one piece of to-be-sent feedback information belongs to the eighth-type candidate feedback information. There is at least one piece of the eighth-type candidate feedback information.

To be specific, the terminal device determines the at least one piece of to-be-sent feedback information in the eighth-type candidate feedback information. To be specific, the terminal device determines to send some or all of the eighth-type candidate feedback information. In other words, the terminal device determines the some or all of the eighth-type candidate feedback information as to-be-sent feedback information.

It may be understood that, if there is one piece of the eighth-type candidate feedback information, the terminal device determines all the eighth-type candidate feedback information as the to-be-sent feedback information.

The terminal device may determine the to-be-sent feedback information in the following manners:

1. The terminal device may randomly select a nineteenth preset quantity of pieces of to-be-sent feedback information from the eighth-type candidate feedback information, where the nineteenth preset quantity of pieces of to-be-sent feedback information is the some or all of the eighth-type candidate feedback information.

2. The terminal device may determine the some or all of the eighth-type candidate feedback information based on the value of the first reference value of the quality of service levels of the data information corresponding to the eighth-type candidate feedback information.

3. The terminal device may determine, based on the type of the data corresponding to the eighth-type candidate feedback information, that the some or all of the eighth-type candidate feedback information is the to-be-sent feedback information.

4. The terminal device may determine, based on the feedback period of the eighth-type candidate feedback information, the some or all of the eighth-type candidate feedback information as the to-be-sent feedback information.

5. The terminal device may select, from the eighth-type candidate feedback information, a twentieth preset quantity of pieces of to-be-sent feedback information with maximum reference values (or highest priorities) in quality of service levels of data information corresponding to the eighth-type candidate feedback information, where the twentieth preset quantity of pieces of to-be-sent feedback information is the some or all of the eighth-type candidate feedback information.

Embodiment 5(2): If the at least one piece of candidate feedback information includes the at least one piece of candidate feedback information that needs to be received: when the at least one piece of candidate feedback information that needs to be received includes the seventh-type candidate feedback information and the eighth-type candidate feedback information, the terminal device determines the at least one piece of to-be-received feedback information, where the at least one piece of to-be-received feedback information belongs to the eighth-type candidate feedback information. There is at least one piece of the eighth-type candidate feedback information.

To be specific, the terminal device determines the at least one piece of to-be-received feedback information in the eighth-type candidate feedback information. To be specific, the terminal device determines to receive some or all of the eighth-type candidate feedback information. In other words, the terminal device determines the some or all of the eighth-type candidate feedback information as to-be-received feedback information.

It may be understood that, if there is one piece of the eighth-type candidate feedback information, the terminal device determines all the eighth-type candidate feedback information as the to-be-received feedback information.

The terminal device may determine the to-be-received feedback information in the following manners:

1. The terminal device may randomly select a twenty-first preset quantity of pieces of to-be-received feedback information from the eighth-type candidate feedback information, where the twenty-first preset quantity of pieces of to-be-received feedback information is the some or all of the eighth-type candidate feedback information.

2. The terminal device may determine the some or all of the eighth-type candidate feedback information based on the value of the first reference value of the quality of service levels of the data information corresponding to the eighth-type candidate feedback information.

3. The terminal device may determine, based on the type of the data corresponding to the eighth-type candidate feedback information, that the some or all of the eighth-type candidate feedback information is the to-be-received feedback information.

4. The terminal device may determine, based on the feedback period of the eighth-type candidate feedback information, the some or all of the eighth-type candidate feedback information as the to-be-received feedback information.

5. The terminal device may select, from the eighth-type candidate feedback information, a twenty-second preset quantity of pieces of to-be-received feedback information with maximum reference values (or highest priorities) in quality of service levels of data information corresponding to the eighth-type candidate feedback information, where the twenty-second preset quantity of pieces of to-be-received feedback information is the some or all of the eighth-type candidate feedback information.

Embodiment 5(3): If the at least one piece of candidate feedback information includes the at least one piece of candidate feedback information that needs to be sent and the at least one piece of candidate feedback information that needs to be received: when the at least one piece of candidate feedback information that needs to be sent includes the seventh-type candidate feedback information and the eighth-type candidate feedback information, and the at least one piece of candidate feedback information that needs to be received includes the seventh-type candidate feedback information and the eighth-type candidate feedback information, the terminal device determines the at least one piece of to-be-sent feedback information and/or the at least one piece of to-be-received feedback information, where the at least one piece of to-be-sent feedback information belongs to the eighth-type candidate feedback type, and the at least one piece of to-be-received feedback information belongs to the eighth-type candidate feedback information.

In this embodiment, for a process in which the terminal device determines the at least one piece of to-be-sent feedback information and the at least one piece of to-be-received feedback information, refer to Embodiment 5(1) and Embodiment 5(2). Details are not described herein again.

The following describes Embodiment 5 by using specific embodiments:

1. If there are three pieces of feedback information that need to be sent, two pieces of feedback information are NACK feedbacks, one piece of feedback information is an ACK feedback, and a sending capability of the terminal device is 2, the terminal device sends the two NACK feedbacks, and does not send the ACK feedback.

2. If there are three pieces of feedback information that need to be sent, one piece of feedback information is a NACK feedback, two pieces of feedback information are ACK feedbacks, and a sending capability of the terminal device is 2, the terminal device determines to send one NACK and one ACK. The sent ACK may be an ACK, with a higher priority corresponding to a quality of service level of a data packet, in the two ACK feedbacks, and the terminal device does not send an ACK, with a lower priority corresponding to a quality of service level of a data packet, in the two ACK feedbacks.

In this embodiment, it can be ensured that a NACK feedback is preferentially received and/or sent, and especially, a NACK feedback in groupcast/multicast is preferentially received and/or sent.

Embodiment 6: The terminal device may monitor feedback information to determine whether a link resource continues to be used or is released. For example, when detecting an ACK feedback, the terminal device determines that the link resource is released. When detecting a NACK feedback, the terminal device determines that the link resource is not released and continues to be used.

If a data packet corresponding to the at least one piece of to-be-sent feedback information is reserved data (that is, a corresponding type is a reservation type), or a data packet corresponding to the at least one piece of to-be-received feedback information is reserved data, the data packet corresponding to the at least one piece of to-be-sent feedback information or the data packet corresponding to the at least one piece of to-be-received feedback information further includes indication information, where the indication information is used to indicate that a reserved link resource continues to be used or is released. The indication information is represented by SCI, and occupies at least one bit, for example, one bit.

For example, when transmission of the reserved data is completed, the reserved resource is released, and the one bit is set to a specific value, namely, 1, indicating that the resource reserved in the SCI is released or invalid. When transmission of the reserved data is not completed, the reserved resource continues to be used and does not need to be released, and the one bit is set to a specific value, namely, 0, indicating that the resource reserved in the SCI continues to be valid and used.

In this embodiment, the terminal device can learn whether the reserved resource continues to be used or is released only by detecting a bit value of the SCI without monitoring the feedback information.

Figure 7:
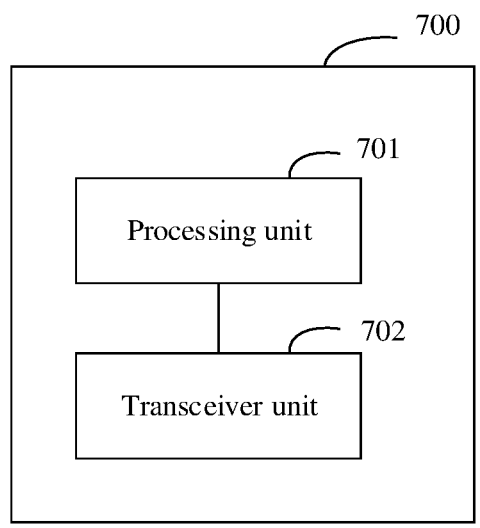
FIG. 7 is a schematic structural diagram of a feedback information transmission apparatus according to an embodiment of this application.

The feedback information transmission method in the embodiments of this application is described in detail above with reference to FIG. 2 to FIG. 6. Based on a same inventive concept as the foregoing feedback information transmission method, the embodiments of this application further provide a feedback information transmission apparatus. As shown in FIG. 7, the feedback information transmission apparatus 700 includes a processing unit 701 and a transceiver unit 702. The apparatus 700 may be configured to implement the method described in the foregoing method embodiments applied to a terminal device. The apparatus 700 may be located in a terminal device, or may be the terminal device.

It should be noted that the apparatus in the foregoing embodiments, that is, the apparatus 700, may be the terminal device, or may be a chip applied to the terminal device, or another combined device, component, or the like that has a function of the foregoing terminal device. When the apparatus is the terminal device, the transceiver unit may be a transceiver, which may include an antenna, a radio frequency circuit, and the like. The processing unit may be a processor, for example, a central processing unit (CPU). When the apparatus is a component having functions of the foregoing terminal device, the transceiver unit may be a radio frequency unit, and the processing unit may be a processor. When the apparatus is a chip system, the transceiver unit may be an input/output interface of the chip system, and the processing unit may be a processor of the chip system.

Specifically, the processing unit 701 is configured to determine at least one piece of to-be-sent feedback information or at least one piece of to-be-received feedback information in at least one piece of candidate feedback information, where the at least one piece of candidate feedback information includes at least one piece of candidate feedback information that needs to be sent and/or at least one piece of candidate feedback information that needs to be received, and the at least one piece of candidate feedback information that needs to be sent and/or the at least one piece of candidate feedback information that needs to be received corresponds to a same time domain resource.

The transceiver unit 702 is configured to send the at least one piece of to-be-sent feedback information or receive the at least one piece of to-be-received feedback information.

In an implementation, the at least one piece of candidate feedback information that needs to be sent and/or the at least one piece of candidate feedback information that needs to be received corresponds to a same first time domain resource.

The transceiver unit 702 is specifically configured to send the at least one piece of to-be-sent feedback information or receive the at least one piece of to-be-received feedback information in the following manner: sending the at least one piece of to-be-sent feedback information on a second time domain resource, or receiving the at least one piece of to-be-received feedback information on the second time domain resource, where the second time domain resource is the same as the first time domain resource, the second time domain resource includes the first time domain resource, or the second time domain resource partially overlaps the first time domain resource.

In an implementation, the processing unit 701 is specifically configured to determine the at least one piece of to-be-sent feedback information or the at least one piece of to-be-received feedback information in the at least one piece of candidate feedback information in the following manners:
  determining the at least one piece of to-be-sent feedback information or the at least one piece of to-be-received feedback information based on a quality of service level of data information corresponding to the at least one piece of candidate feedback information;
  determining the at least one piece of to-be-sent feedback information or the at least one piece of to-be-received feedback information based on a first quantity of the at least one piece of candidate feedback information that needs to be sent and/or a second quantity of the at least one piece of candidate feedback information that needs to be received;
  determining the at least one piece of to-be-sent feedback information or the at least one piece of to-be-received feedback information based on a type of data corresponding to the at least one piece of candidate feedback information;
  determining the at least one piece of to-be-sent feedback information or the at least one piece of to-be-received feedback information based on a feedback period of the at least one piece of candidate feedback information; or
  determining the at least one piece of to-be-sent feedback information or the at least one piece of to-be-received feedback information based on a feedback type of the at least one piece of candidate feedback information.

In an implementation, the at least one piece of candidate feedback information includes the at least one piece of candidate feedback information that needs to be sent and the at least one piece of candidate feedback information that needs to be received; and
  the processing unit 701 is specifically configured to determine, in the following manners, the at least one piece of to-be-sent feedback information or the at least one piece of to-be-received feedback information based on the quality of service level of the data information corresponding to the at least one piece of candidate feedback information:
  when a first reference value of a quality of service level of data information corresponding to the at least one piece of candidate feedback information that needs to be sent is greater than a first priority threshold, determining the at least one piece of to-be-sent feedback information, where the at least one piece of to-be-sent feedback information belongs to the at least one piece of candidate feedback information that needs to be sent; or when a second reference value of a quality of service level of data information corresponding to the at least one piece of candidate feedback information that needs to be received is greater than a first priority threshold, determining the at least one piece of to-be-received feedback information, where the at least one piece of to-be-received feedback information belongs to the at least one piece of candidate feedback information that needs to be received.

In an implementation, the at least one piece of candidate feedback information includes the at least one piece of candidate feedback information that needs to be sent and the at least one piece of candidate feedback information that needs to be received; and the processing unit 701 is specifically configured to determine, in the following manners, the at least one piece of to-be-sent feedback information or the at least one piece of to-be-received feedback information based on the quality of service level of the data information corresponding to the at least one piece of candidate feedback information:

when a first reference value of a quality of service level of data information corresponding to the at least one piece of candidate feedback information that needs to be sent is greater than a second reference value of a quality of service level of data information corresponding to the at least one piece of candidate feedback information that needs to be received, determining the at least one piece of to-be-sent feedback information, where the at least one piece of to-be-sent feedback information belongs to the at least one piece of candidate feedback information that needs to be sent; or when a first reference value of a quality of service level of data information corresponding to the at least one piece of candidate feedback information that needs to be sent is less than or equal to a second reference value of a quality of service level of data information corresponding to the at least one piece of candidate feedback information that needs to be received, determining the at least one piece of to-be-received feedback information, where the at least one piece of to-be-received feedback information belongs to the at least one piece of candidate feedback information that needs to be received.

In an implementation, the first reference value is an average value of quality of service levels of data information corresponding to all feedback information in the at least one piece of candidate feedback information that needs to be sent, or the first reference value is an average value of quality of service levels of data information corresponding to a first feedback information set in the at least one piece of candidate feedback information that needs to be sent, where the first feedback information set includes the first N pieces of feedback information, in descending order of quality of service levels of corresponding data information, in the at least one piece of candidate feedback information that needs to be sent, and N is a positive integer greater than or equal to 1; and the second reference value is an average value of quality of service levels of data information corresponding to all feedback information in the at least one piece of candidate feedback information that needs to be received, or the second reference value is an average value of quality of service levels of data information corresponding to a second feedback information set in the at least one piece of candidate feedback information that needs to be received, where the second feedback information set includes the first M pieces of feedback information, in descending order of quality of service levels of corresponding data information, in the at least one piece of candidate feedback information that needs to be received, and M is a positive integer greater than or equal to 1.

In an implementation, the at least one piece of candidate feedback information includes the at least one piece of candidate feedback information that needs to be sent and the at least one piece of candidate feedback information that needs to be received; and the processing unit 701 is specifically configured to determine, in the following manners, the at least one piece of to-be-sent feedback information or the at least one piece of to-be-received feedback information based on the first quantity of the at least one piece of candidate feedback information that needs to be sent and/or the second quantity of the at least one piece of candidate feedback information that needs to be received:

when a ratio of the second quantity of the at least one piece of candidate feedback information that needs to be received to the first quantity of the at least one piece of candidate feedback information that needs to be sent is greater than or equal to a first ratio threshold, determining the at least one piece of to-be-received feedback information, where the at least one piece of to-be-received feedback information belongs to the at least one piece of candidate feedback information that needs to be received; or when a ratio of the second quantity of the at least one piece of candidate feedback information that needs to be received to the first quantity of the at least one piece of candidate feedback information that needs to be sent is less than a first ratio threshold, determining the at least one piece of to-be-sent feedback information, where the at least one piece of to-be-sent feedback information belongs to the at least one piece of candidate feedback information that needs to be sent.

In an implementation, the processing unit 701 is specifically configured to determine, in the following manners, the at least one piece of to-be-sent feedback information or the at least one piece of to-be-received feedback information based on the type of the data corresponding to the at least one piece of candidate feedback information:

when the at least one piece of candidate feedback information that needs to be sent is first-type candidate feedback information, the at least one piece of candidate feedback information that needs to be received is second-type candidate feedback information, a type of data corresponding to the first-type candidate feedback information is unicast, and a type of data corresponding to the second-type candidate feedback information is groupcast/multicast, determining the at least one piece of to-be-sent feedback information, where the at least one piece of to-be-sent feedback information belongs to the first-type candidate feedback information;

when the at least one piece of candidate feedback information that needs to be sent is second-type candidate feedback information, and the at least one piece of candidate feedback information that needs to be received is first-type candidate feedback information, determining the at least one piece of to-be-received feedback information, where the at least one piece of to-be-received feedback information belongs to the first-type candidate feedback information; or when the at least one piece of candidate feedback information that needs to be sent includes first-type candidate feedback information and second-type candidate feedback information, determining the at least one piece of to-be-sent feedback information, where the at least one piece of to-be-sent feedback information belongs to the first-type candidate feedback information.

In an implementation, the processing unit 701 is specifically configured to determine, in the following manners, the at least one piece of to-be-sent feedback information or the at least one piece of to-be-received feedback information based on the type of the data corresponding to the at least one piece of candidate feedback information:

when the at least one piece of candidate feedback information that needs to be sent is third-type candidate feedback information, the at least one piece of candidate feedback information that needs to be received is fourth-type candidate feedback information, a type of data corresponding to the third-type candidate feedback information is a reservation type, and a type of data corresponding to the fourth-type candidate feedback information is a scheduling type, determining the at least one piece of to-be-sent feedback information, where the at least one piece of to-be-sent feedback information belongs to the third-type candidate feedback information;

when the at least one piece of candidate feedback information that needs to be sent is fourth-type candidate feedback information, and the at least one piece of candidate feedback information that needs to be received is third-type candidate feedback information, determining the at least one piece of to-be-received feedback information, where the at least one piece of to-be-received feedback information belongs to the third-type candidate feedback information; or when the at least one piece of candidate feedback information that needs to be sent includes third-type candidate feedback information and fourth-type candidate feedback information, determining the at least one piece of to-be-sent feedback information, where the at least one piece of to-be-sent feedback information belongs to the third-type candidate feedback information.

In an implementation, the processing unit 701 is specifically configured to determine, in the following manners, the at least one piece of to-be-sent feedback information or the at least one piece of to-be-received feedback information based on the type of the data corresponding to the at least one piece of candidate feedback information:

when the at least one piece of candidate feedback information that needs to be sent is fifth-type candidate feedback information, the at least one piece of candidate feedback information that needs to be received is sixth-type candidate feedback information, a type of data corresponding to the fifth-type candidate feedback information is feeding back only negative acknowledgement information on a feedback resource, and a type of data corresponding to the sixth-type candidate feedback information is feeding back acknowledgement information or the negative acknowledgement information on a feedback resource corresponding to the terminal device, determining the at least one piece of to-be-sent feedback information, where the at least one piece of to-be-sent feedback information belongs to the fifth-type candidate feedback information;

when the at least one piece of candidate feedback information that needs to be sent is sixth-type candidate feedback information, and the at least one piece of candidate feedback information that needs to be received is fifth-type candidate feedback information, determining the at least one piece of to-be-received feedback information, where the at least one piece of to-be-received feedback information belongs to the fifth-type candidate feedback information; or when the at least one piece of candidate feedback information that needs to be sent includes fifth-type candidate feedback information and sixth-type candidate feedback information, determining the at least one piece of to-be-sent feedback information, where the at least one piece of to-be-sent feedback information belongs to the fifth-type candidate feedback information.

In an implementation, the processing unit 701 is specifically configured to determine, in the following manners, the at least one piece of to-be-sent feedback information or the at least one piece of to-be-received feedback information based on the feedback period of the at least one piece of candidate feedback information:

when a first feedback period of the at least one piece of candidate feedback information that needs to be sent is longer than a second feedback period of the at least one piece of candidate feedback information that needs to be received, determining the at least one piece of to-be-sent feedback information, where the at least one piece of to-be-sent feedback information belongs to the at least one piece of candidate feedback information that needs to be sent;

when a first feedback period of the at least one piece of candidate feedback information that needs to be sent is shorter than or equal to a second feedback period of the at least one piece of candidate feedback information that needs to be received, determining the at least one piece of to-be-received feedback information, where the at least one piece of to-be-received feedback information belongs to the at least one piece of candidate feedback information that needs to be received; or when the at least one piece of candidate feedback information that needs to be sent includes first candidate feedback information and second candidate feedback information, and a feedback period of the first candidate feedback information is longer than a feedback period of the second candidate feedback information, determining the at least one piece of to-be-sent feedback information, where the at least one piece of to-be-sent feedback information belongs to the first candidate feedback information.

In an implementation, the at least one piece of candidate feedback information includes the at least one piece of candidate feedback information that needs to be sent; and the processing unit 701 is specifically configured to determine, in the following manner, the at least one piece of to-be-sent feedback information or the at least one piece of to-be-received feedback information based on the feedback type of the at least one piece of candidate feedback information:

when the at least one piece of candidate feedback information that needs to be sent includes seventh-type candidate feedback information and eighth-type candidate feedback information, a feedback type of the seventh-type candidate feedback information is an acknowledgement feedback, and a feedback type of the eighth-type candidate feedback information is a negative acknowledgement feedback, determining the at least one piece of to-be-sent feedback information, where the at least one piece of to-be-sent feedback information belongs to the eighth-type candidate feedback information.

It should be noted that in the embodiments of this application, division into the modules is an example and is merely logical function division, and may be other division during actual implementation. In addition, function units in the embodiments of this application may be integrated into one processing unit, or may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 8:
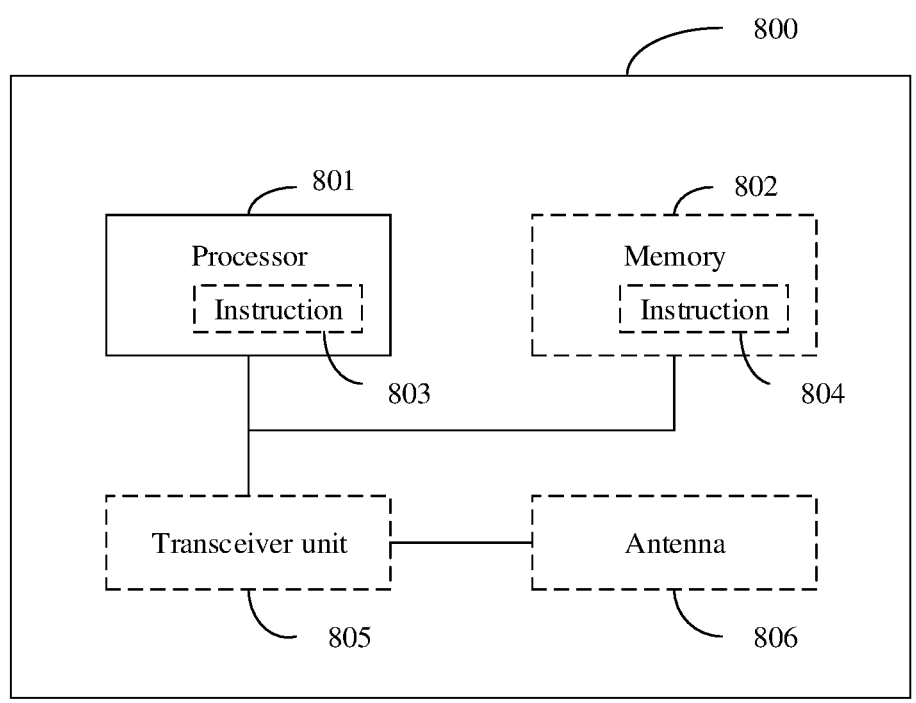
FIG. 8 is a schematic structural diagram of a feedback information transmission apparatus according to an embodiment of this application.

Based on a same concept as the foregoing feedback information transmission method, as shown in FIG. 8, the embodiments of this application further provide a schematic structural diagram of a feedback information transmission apparatus 800. The apparatus 800 may be configured to implement the method described in the foregoing method embodiments applied to a terminal device. For details, refer to the descriptions in the foregoing method embodiments. The apparatus 800 may be located in a terminal device, or may be the terminal device.

The apparatus 800 includes one or more processors 801. The processor 801 may be a general-purpose processor, a dedicated processor, or the like. For example, the processor may be a baseband processor or a central processing unit. The baseband processor may be configured to process a communication protocol and communication data. The central processing unit may be configured to control the communication apparatus (for example, a base station, a terminal, or a chip), execute a software program, and process data of the software program. The communication apparatus may include a transceiver unit that is configured to input (receive) and output (send) a signal. For example, the transceiver unit may be a transceiver, a radio frequency chip, or the like.

The apparatus 800 includes one or more processors 801, and the one or more processors 801 may implement the method of the terminal device in the foregoing embodiments.

Optionally, in addition to implementing the method in the foregoing embodiments, the processor 801 may further implement another function.

Optionally, in a design, the processor 801 may execute instructions, to enable the apparatus 800 to perform the method described in the foregoing method embodiments. All or some of the instructions, for example, instruction 803, may be stored in the processor. Alternatively, all or some of the instructions, for example, instruction 804, may be stored in the memory 802 coupled to the processor. Alternatively, the instructions 803 and 804 may be used together to enable the apparatus 800 to perform the method described in the foregoing method embodiments.

In still another possible design, the communication apparatus 800 may alternatively include a circuit, and the circuit may implement a function of the terminal device in the foregoing method embodiments.

In still another possible design, the apparatus 800 may include one or more memories 802, storing the instruction 804, and the instructions may be run on the processor, to enable the apparatus 800 to perform the method described in the foregoing method embodiments. Optionally, the memory may further store data. Optionally, the processor may alternatively store instructions and/or data. For example, the one or more memories 802 may store the correspondence described in the foregoing embodiments, or the related parameters or tables in the foregoing embodiments. The processor and the memory may be separately disposed, or may be integrated together.

In still another possible design, the apparatus 800 may further include a transceiver unit 805. The processor 801 may be referred to as a processing unit, to control an apparatus (a terminal or a base station). The transceiver unit 805 may be referred to as a transceiver machine, a transceiver circuit, a transceiver, or the like, and is configured to implement receiving and/or sending for the apparatus.

For example, if the apparatus 800 is a chip applied to the terminal device, or another combined device, component, or the like that has a function of the foregoing terminal device, the apparatus 800 may include the transceiver unit 805.

In still another possible design, the apparatus 800 may further include a transceiver unit 805 and an antenna 806. The processor 801 may be referred to as a processing unit, to control an apparatus (a terminal or a base station). The transceiver unit 805 may be referred to as a transceiver machine, a transceiver circuit, a transceiver, or the like, and is configured to implement a transceiver function of the apparatus by using the antenna 806.

For example, if the apparatus 800 is a terminal device, the apparatus 800 may include the transceiver unit 805 and an antenna 806.

Specifically, the processor 801 is configured to execute the instruction 803, and/or the instruction 804 in the memory 802, to enable the apparatus 800 to determine at least one piece of to-be-sent feedback information or at least one piece of to-be-received feedback information in at least one piece of candidate feedback information, where the at least one piece of candidate feedback information includes at least one piece of candidate feedback information that needs to be sent and/or at least one piece of candidate feedback information that needs to be received, and the at least one piece of candidate feedback information that needs to be sent and/or the at least one piece of candidate feedback information that needs to be received corresponds to a same time domain resource.

The transceiver unit 805 is configured to send the at least one piece of to-be-sent feedback information or receive the at least one piece of to-be-received feedback information.

The transceiver unit 805 is further configured to send the at least one piece of to-be-sent feedback information by using the antenna 806, or receive the at least one piece of to-be-received feedback information by using the antenna 806.

In an implementation, the at least one piece of candidate feedback information that needs to be sent and/or the at least one piece of candidate feedback information that needs to be received corresponds to a same first time domain resource.

The transceiver unit 805 is specifically configured to send the at least one piece of to-be-sent feedback information on a second time domain resource, or receive the at least one piece of to-be-received feedback information on the second time domain resource, where the second time domain resource is the same as the first time domain resource, the second time domain resource includes the first time domain resource, or the second time domain resource partially overlaps the first time domain resource.

Alternatively, the transceiver unit 805 is specifically configured to send the at least one piece of to-be-sent feedback information on a second time domain resource by using the antenna 806, or receive the at least one piece of to-be-received feedback information on the second time domain resource by using the antenna 806, where the second time domain resource is the same as the first time domain resource, the second time domain resource includes the first time domain resource, or the second time domain resource partially overlaps the first time domain resource.

In an implementation, the processor is specifically configured to execute the instruction 803, and/or the instruction 804 in the memory 802, to enable the apparatus 800 to determine the at least one piece of to-be-sent feedback information or the at least one piece of to-be-received feedback information in the at least one piece of candidate feedback information in the following manners:

determining the at least one piece of to-be-sent feedback information or the at least one piece of to-be-received feedback information based on a quality of service level of data information corresponding to the at least one piece of candidate feedback information;

determining the at least one piece of to-be-sent feedback information or the at least one piece of to-be-received feedback information based on a first quantity of the at least one piece of candidate feedback information that needs to be sent and/or a second quantity of the at least one piece of candidate feedback information that needs to be received;

determining the at least one piece of to-be-sent feedback information or the at least one piece of to-be-received feedback information based on a type of data corresponding to the at least one piece of candidate feedback information;

determining the at least one piece of to-be-sent feedback information or the at least one piece of to-be-received feedback information based on a feedback period of the at least one piece of candidate feedback information; or determining the at least one piece of to-be-sent feedback information or the at least one piece of to-be-received feedback information based on a feedback type of the at least one piece of candidate feedback information.

In an implementation, the at least one piece of candidate feedback information includes the at least one piece of candidate feedback information that needs to be sent and the at least one piece of candidate feedback information that needs to be received; and the processor 801 is specifically configured to execute the instruction 803, and/or the instruction 804 in the memory 802, to enable the apparatus 800 to determine, in the following manners, the at least one piece of to-be-sent feedback information or the at least one piece of to-be-received feedback information based on the quality of service level of the data information corresponding to the at least one piece of candidate feedback information:

when a first reference value of a quality of service level of data information corresponding to the at least one piece of candidate feedback information that needs to be sent is greater than a first priority threshold, determining the at least one piece of to-be-sent feedback information, where the at least one piece of to-be-sent feedback information belongs to the at least one piece of candidate feedback information that needs to be sent; or when a second reference value of a quality of service level of data information corresponding to the at least one piece of candidate feedback information that needs to be received is greater than a first priority threshold, determining the at least one piece of to-be-received feedback information, where the at least one piece of to-be-received feedback information belongs to the at least one piece of candidate feedback information that needs to be received.

In an implementation, the at least one piece of candidate feedback information includes the at least one piece of candidate feedback information that needs to be sent and the at least one piece of candidate feedback information that needs to be received; and the processor 801 is specifically configured to execute the instruction 803, and/or the instruction 804 in the memory 802, to enable the apparatus 800 to determine, in the following manners, the at least one piece of to-be-sent feedback information or the at least one piece of to-be-received feedback information based on the quality of service level of the data information corresponding to the at least one piece of candidate feedback information:

when a first reference value of a quality of service level of data information corresponding to the at least one piece of candidate feedback information that needs to be sent is greater than a second reference value of a quality of service level of data information corresponding to the at least one piece of candidate feedback information that needs to be received, determining the at least one piece of to-be-sent feedback information, where the at least one piece of to-be-sent feedback information belongs to the at least one piece of candidate feedback information that needs to be sent; or when a first reference value of a quality of service level of data information corresponding to the at least one piece of candidate feedback information that needs to be sent is less than or equal to a second reference value of a quality of service level of data information corresponding to the at least one piece of candidate feedback information that needs to be received, determining the at least one piece of to-be-received feedback information, where the at least one piece of to-be-received feedback information belongs to the at least one piece of candidate feedback information that needs to be received.

In an implementation, the first reference value is an average value of quality of service levels of data information corresponding to all feedback information in the at least one piece of candidate feedback information that needs to be sent, or the first reference value is an average value of quality of service levels of data information corresponding to a first feedback information set in the at least one piece of candidate feedback information that needs to be sent, where the first feedback information set includes the first N pieces of feedback information, in descending order of quality of service levels of corresponding data information, in the at least one piece of candidate feedback information that needs to be sent, and N is a positive integer greater than or equal to 1; and the second reference value is an average value of quality of service levels of data information corresponding to all feedback information in the at least one piece of candidate feedback information that needs to be received, or the second reference value is an average value of quality of service levels of data information corresponding to a second feedback information set in the at least one piece of candidate feedback information that needs to be received, where the second feedback information set includes the first M pieces of feedback information, in descending order of quality of service levels of corresponding data information, in the at least one piece of candidate feedback information that needs to be received, and M is a positive integer greater than or equal to 1.

In an implementation, the at least one piece of candidate feedback information includes the at least one piece of candidate feedback information that needs to be sent and the at least one piece of candidate feedback information that needs to be received; and the processor 801 is specifically configured to execute the instruction 803, and/or the instruction 804 in the memory 802, to enable the apparatus 800 to determine, in the following manners, the at least one piece of to-be-sent feedback information or the at least one piece of to-be-received feedback information based on the first quantity of the at least one piece of candidate feedback information that needs to be sent and/or the second quantity of the at least one piece of candidate feedback information that needs to be received:

when a ratio of the second quantity of the at least one piece of candidate feedback information that needs to be received to the first quantity of the at least one piece of candidate feedback information that needs to be sent is greater than or equal to a first ratio threshold, determining the at least one piece of to-be-received feedback information, where the at least one piece of to-be-received feedback information belongs to the at least one piece of candidate feedback information that needs to be received; or when a ratio of the second quantity of the at least one piece of candidate feedback information that needs to be received to the first quantity of the at least one piece of candidate feedback information that needs to be sent is less than a first ratio threshold, determining the at least one piece of to-be-sent feedback information, where the at least one piece of to-be-sent feedback information belongs to the at least one piece of candidate feedback information that needs to be sent.

In an implementation, the processor 801 is specifically configured to execute the instruction 803, and/or the instruction 804 in the memory 802, to enable the apparatus 800 to determine, in the following manners, the at least one piece of to-be-sent feedback information or the at least one piece of to-be-received feedback information based on the type of the data corresponding to the at least one piece of candidate feedback information:

when the at least one piece of candidate feedback information that needs to be sent is first-type candidate feedback information, the at least one piece of candidate feedback information that needs to be received is second-type candidate feedback information, a type of data corresponding to the first-type candidate feedback information is unicast, and a type of data corresponding to the second-type candidate feedback information is groupcast/multicast, determining the at least one piece of to-be-sent feedback information, where the at least one piece of to-be-sent feedback information belongs to the first-type candidate feedback information;

when the at least one piece of candidate feedback information that needs to be sent is second-type candidate feedback information, and the at least one piece of candidate feedback information that needs to be received is first-type candidate feedback information, determining the at least one piece of to-be-received feedback information, where the at least one piece of to-be-received feedback information belongs to the first-type candidate feedback information; or when the at least one piece of candidate feedback information that needs to be sent includes first-type candidate feedback information and second-type candidate feedback information, determining the at least one piece of to-be-sent feedback information, where the at least one piece of to-be-sent feedback information belongs to the first-type candidate feedback information.

In an implementation, the processor 801 is specifically configured to execute the instruction 803, and/or the instruction 804 in the memory 802, to enable the apparatus 800 to determine, in the following manners, the at least one piece of to-be-sent feedback information or the at least one piece of to-be-received feedback information based on the type of the data corresponding to the at least one piece of candidate feedback information:

when the at least one piece of candidate feedback information that needs to be sent is third-type candidate feedback information, the at least one piece of candidate feedback information that needs to be received is fourth-type candidate feedback information, a type of data corresponding to the third-type candidate feedback information is a reservation type, and a type of data corresponding to the fourth-type candidate feedback information is a scheduling type, determining the at least one piece of to-be-sent feedback information, where the at least one piece of to-be-sent feedback information belongs to the third-type candidate feedback information;

when the at least one piece of candidate feedback information that needs to be sent is fourth-type candidate feedback information, and the at least one piece of candidate feedback information that needs to be received is third-type candidate feedback information, determining the at least one piece of to-be-received feedback information, where the at least one piece of to-be-received feedback information belongs to the third-type candidate feedback information; or when the at least one piece of candidate feedback information that needs to be sent includes third-type candidate feedback information and fourth-type candidate feedback information, determining the at least one piece of to-be-sent feedback information, where the at least one piece of to-be-sent feedback information belongs to the third-type candidate feedback information.

In an implementation, the processor 801 is specifically configured to execute the instruction 803, and/or the instruction 804 in the memory 802, to enable the apparatus 800 to determine, in the following manners, the at least one piece of to-be-sent feedback information or the at least one piece of to-be-received feedback information based on the type of the data corresponding to the at least one piece of candidate feedback information:

when the at least one piece of candidate feedback information that needs to be sent is fifth-type candidate feedback information, the at least one piece of candidate feedback information that needs to be received is sixth-type candidate feedback information, a type of data corresponding to the fifth-type candidate feedback information is feeding back only negative acknowledgement information on a feedback resource, and a type of data corresponding to the sixth-type candidate feedback information is feeding back acknowledgement information or the negative acknowledgement information on a feedback resource corresponding to the terminal device, determining the at least one piece of to-be-sent feedback information, where the at least one piece of to-be-sent feedback information belongs to the fifth-type candidate feedback information;

when the at least one piece of candidate feedback information that needs to be sent is sixth-type candidate feedback information, and the at least one piece of candidate feedback information that needs to be received is fifth-type candidate feedback information, determining the at least one piece of to-be-received feedback information, where the at least one piece of to-be-received feedback information belongs to the fifth-type candidate feedback information; or when the at least one piece of candidate feedback information that needs to be sent includes fifth-type candidate feedback information and sixth-type candidate feedback information, determining the at least one piece of to-be-sent feedback information, where the at least one piece of to-be-sent feedback information belongs to the fifth-type candidate feedback information.

In an implementation, the processor 801 is specifically configured to execute the instruction 803, and/or the instruction 804 in the memory 802, to enable the apparatus 800 to determine, in the following manners, the at least one piece of to-be-sent feedback information or the at least one piece of to-be-received feedback information based on the feedback period of the at least one piece of candidate feedback information:

when a first feedback period of the at least one piece of candidate feedback information that needs to be sent is longer than a second feedback period of the at least one piece of candidate feedback information that needs to be received, determining the at least one piece of to-be-sent feedback information, where the at least one piece of to-be-sent feedback information belongs to the at least one piece of candidate feedback information that needs to be sent;

when a first feedback period of the at least one piece of candidate feedback information that needs to be sent is shorter than or equal to a second feedback period of the at least one piece of candidate feedback information that needs to be received, determining the at least one piece of to-be-received feedback information, where the at least one piece of to-be-received feedback information belongs to the at least one piece of candidate feedback information that needs to be received; or when the at least one piece of candidate feedback information that needs to be sent includes first candidate feedback information and second candidate feedback information, and a feedback period of the first candidate feedback information is longer than a feedback period of the second candidate feedback information, determining the at least one piece of to-be-sent feedback information, where the at least one piece of to-be-sent feedback information belongs to the first candidate feedback information.

In an implementation, the at least one piece of candidate feedback information includes the at least one piece of candidate feedback information that needs to be sent; and The processor 801 is specifically configured to execute the instruction 803, and/or the instruction 804 in the memory 802, to enable the apparatus 800 to determine, in the following manner, the at least one piece of to-be-sent feedback information or the at least one piece of to-be-received feedback information based on the feedback type of the at least one piece of candidate feedback information:

when the at least one piece of candidate feedback information that needs to be sent includes seventh-type candidate feedback information and eighth-type candidate feedback information, a feedback type of the seventh-type candidate feedback information is an acknowledgement feedback, and a feedback type of the eighth-type candidate feedback information is a negative acknowledgement feedback, determining the at least one piece of to-be-sent feedback information, where the at least one piece of to-be-sent feedback information belongs to the eighth-type candidate feedback information.

It should be noted that, the processor in the embodiments of this application may be an integrated circuit chip, and has a signal processing capability. In an implementation process, the steps in the foregoing method embodiments may be implemented by using a hardware integrated logic circuit in the processor, or by using instructions in a form of software. The processor may be a general-purpose processor, a digital signal processor (DSP), an application-specific integrated circuit (Application Specific Integrated Circuit, ASIC), a field programmable gate array (FPGA) or another programmable logic device, a discrete gate or transistor logic device, or a discrete hardware component. The method, steps, and logical block diagrams that are disclosed in the embodiments of this application may be implemented or performed. The general-purpose processor may be a microprocessor, or the processor may be any conventional processor or the like. The steps of the method disclosed with reference to the embodiments of this application may be directly performed and completed by using a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memories in the systems and method described in this specification include but are not limited to these memories and any memory of another suitable type.

An embodiment of this application further provides a computer-readable medium. The computer-readable medium stores a computer program. When the computer program is executed by a computer, the feedback information transmission method described in any one of the foregoing method embodiments applied to a terminal device is implemented.

An embodiment of this application further provides a computer program product. When the computer program product is executed by a computer, the feedback information transmission method described in any one of the foregoing method embodiments applied to a terminal device is implemented.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedure or functions according to the embodiments of this application are completely or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the one or more computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (Solid State Disk, SSD)), or the like.

An embodiment of this application further provides a processing apparatus, including a processor and an interface. The processor is configured to perform the feedback information transmission method described in any one of the foregoing method embodiments applied to a terminal device.

It should be understood that the processing apparatus may be a chip. The processor may be implemented by hardware, or may be implemented by software. When the processor is implemented by the hardware, the processor may be a logic circuit, an integrated circuit, or the like. When the processor is implemented by the software, the processor may be a general-purpose processor. The general-purpose processor is implemented by reading software code stored in a memory. The memory may be integrated into the processor, or may be located outside the processor and exist independently.

A person of ordinary skill in the art may be aware that, the units and steps in the examples described with reference to the embodiments disclosed herein may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces, and indirect couplings or communication connections between the apparatuses or units may be electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions in the embodiments of this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in a computer-readable medium. The computer-readable medium includes a computer storage medium and a communication medium, where the communication medium includes any medium that facilitates transmission of a computer program from one place to another. The storage medium may be any available medium accessible by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and is accessible by a computer. In addition, any connection may be appropriately defined as a computer-readable medium. For example, if software is transmitted from a website, a server, or another remote source through a coaxial cable, an optical fiber/cable, a twisted pair, a digital subscriber line (DSL) or wireless technologies such as infrared, radio, and microwave, the coaxial cable, optical fiber/cable, twisted pair, DSL, or the wireless technologies such as infrared, radio, and microwave are included in fixation of a medium to which they belong. A disk and a disc used in this application include a compact disc (CD), a laser disc, an optical disc, a digital versatile disc (DVD), a floppy disk, and a Blu-ray disc. The disk usually copies data in a magnetic manner, but the disc copies data optically through a laser. The foregoing combination shall also be included in the protection scope of the computer-readable medium.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A method, performed by a terminal device or a chip in a terminal device, the method comprising:
    determining at least one piece of to-be-sent feedback information in a plurality of pieces of candidate feedback information that are to-be-sent, wherein the plurality of pieces of candidate feedback information that are to-be-sent overlap on a time domain resource, and a quantity of the at least one piece of to-be-sent feedback information is less than a quantity of the plurality of pieces of candidate feedback information that are to-be-sent; and
    sending the at least one piece of to-be-sent feedback information; and
    wherein determining the at least one piece of to-be-sent feedback information in the plurality of pieces of candidate feedback information comprises:
        when a quantity of the plurality of pieces of candidate feedback information that are to be sent is greater than or equal to a first threshold, determining the at least one piece of to-be-sent feedback information, wherein the at least one piece of to-be-sent feedback information belongs to the plurality of pieces of candidate feedback information that are to be sent; and
    wherein a quantity of the at least one piece of to-be-sent feedback information does not exceed a transmission capability of the terminal device, and the transmission capability comprises a transmission power limit.

2. The method according to claim 1, wherein the time domain resource is a first time domain resource; and
    the sending the at least one piece of to-be-sent feedback information comprises:
        sending, by the terminal device, the at least one piece of to-be-sent feedback information on a second time domain resource, wherein the second time domain resource is the same as the first time domain resource, the second time domain resource comprises the first time domain resource, or the second time domain resource partially overlaps the first time domain resource.

3. The method according to claim 1, wherein the first threshold is determined by the terminal device based on the transmission capability of the terminal device, and the transmission capability further comprises a quantity limit on feedback information simultaneously transmitted.

4. The method according to claim 1, wherein the at least one piece of to-be-sent feedback information is physical sidelink feedback channel (PSFCH) information.

5. The method according to claim 1, wherein the plurality of pieces of candidate feedback information comprises feedback information of a sidelink and feedback information of an uplink/a downlink between the terminal device and a network device.

6. An apparatus, comprising:
    one or more processors; and
    a memory, wherein the memory stores a computer program, and when executing the computer program stored in the memory, the one or more processors execute operations comprising:
    determining at least one piece of to-be-sent feedback information in a plurality of pieces of candidate feedback information that are to be sent, wherein the plurality of pieces of candidate feedback information that are to be sent overlap on a time domain resource, and a quantity of the at least one piece of to-be-sent feedback information is less than a quantity of the plurality of pieces of candidate feedback information that are to-be-sent;
    sending the at least one piece of to-be-sent feedback information; and
    wherein determining the at least one piece of to-be-sent feedback information in the plurality of pieces of candidate feedback information comprises:
        when a quantity of the plurality of pieces of candidate feedback information that are to be sent is greater than or equal to a first threshold, determining the at least one piece of to-be-sent feedback information, wherein the at least one piece of to-be-sent feedback information belongs to the plurality of pieces of candidate feedback information that are to be sent; and
    wherein a quantity of the at least one piece of to-be-sent feedback information does not exceed a transmission capability of the apparatus, and the transmission capability comprises a transmission power limit.

7. The apparatus according to claim 6, wherein the time domain resource is a first time domain resource; and
    the one or more processors further execute operations comprising:
        sending the at least one piece of to-be-sent feedback information on a second time domain resource, wherein the second time domain resource is the same as the first time domain resource, the second time domain resource comprises the first time domain resource, or the second time domain resource partially overlaps the first time domain resource.

8. The apparatus according to claim 6, wherein the first threshold is determined based on the transmission capability of the apparatus, and the transmission capability further comprises a quantity limit on feedback information simultaneously transmitted.

9. The apparatus according to claim 6, wherein the at least one piece of to-be-sent feedback information is physical sidelink feedback channel (PSFCH) information.

10. The apparatus according to claim 6, wherein the plurality of pieces of candidate feedback information comprises feedback information of a sidelink and feedback information of an uplink/a downlink between the apparatus and a network device.

* * * * *